(12) United States Patent
Yan

(10) Patent No.: US 11,741,441 B2
(45) Date of Patent: *Aug. 29, 2023

(54) SYSTEMS AND METHODS FOR STREAMLINING CREDIT AND/OR DEBIT CARD TRANSACTIONS UTILIZING BLOCKCHAIN SUPPORTED CREDIT TOKENS AND/OR DEBIT TOKENS

(71) Applicant: TraDove, Inc., Palo Alto, CA (US)

(72) Inventor: Jun Yan, Palo Alto, CA (US)

(73) Assignee: TraDove, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,772

(22) Filed: Mar. 1, 2022

(65) Prior Publication Data
US 2022/0292468 A1 Sep. 15, 2022

Related U.S. Application Data

(63) Continuation of application No. 16/920,340, filed on Jul. 2, 2020, now Pat. No. 11,263,604.

(60) Provisional application No. 63/042,555, filed on Jun. 22, 2020.

(51) Int. Cl.
*G06Q 20/00* (2012.01)
*G06Q 20/06* (2012.01)
*G06Q 20/36* (2012.01)
*H04L 9/06* (2006.01)
*G06Q 20/38* (2012.01)
*G06Q 20/40* (2012.01)
*H04L 9/00* (2022.01)

(52) U.S. Cl.
CPC .......... *G06Q 20/065* (2013.01); *G06Q 20/36* (2013.01); *G06Q 20/363* (2013.01); *G06Q 20/385* (2013.01); *G06Q 20/401* (2013.01); *G06Q 20/4037* (2013.01); *H04L 9/0637* (2013.01); *G06Q 2220/00* (2013.01); *H04L 9/50* (2022.05); *H04L 2209/56* (2013.01)

(58) Field of Classification Search
CPC .... G06Q 20/065; G06Q 20/36; G06Q 20/363; G06Q 20/385; G06Q 20/401; G06Q 20/4037; H04L 9/0637
USPC ........................................................ 235/379
See application file for complete search history.

(56) References Cited

U.S. PATENT DOCUMENTS

| | | | |
|---|---|---|---|
| 10,762,478 B1 | 9/2020 | Maeng | |
| 10,762,506 B1 | 9/2020 | Cash et al. | |
| 10,929,842 B1 | 2/2021 | Arvanaghi et al. | |
| 11,263,604 B2 * | 3/2022 | Yan | H04L 9/0637 |
| 2008/0208725 A1 | 8/2008 | Hoy et al. | |
| 2019/0034888 A1 | 1/2019 | Grassadonia et al. | |

(Continued)

FOREIGN PATENT DOCUMENTS

WO WO 2020014580 A1 1/2020

OTHER PUBLICATIONS

Godfrey-Welch et al., "Blockchain in Payment Card Systems," 2018, SMU Data Science Review, vol. 1, No. 1, Article 3, pp. 1-43.

(Continued)

*Primary Examiner* — Daniel A Hess
(74) *Attorney, Agent, or Firm* — Sheppard Mullin Richter & Hampton LLP

(57) ABSTRACT

Systems and methods are provided for processing credit token and debit token based transactions in a blockchain supported network.

29 Claims, 23 Drawing Sheets

(56) References Cited

U.S. PATENT DOCUMENTS

| | | |
|---|---|---|
| 2019/0034936 A1 | 1/2019 | Nolan et al. |
| 2019/0114608 A1 | 4/2019 | Nelms |
| 2019/0180266 A1 | 6/2019 | Sidhu et al. |
| 2019/0228409 A1 | 7/2019 | Madisetti et al. |
| 2019/0311336 A1 | 10/2019 | Kim et al. |
| 2019/0311357 A1 | 10/2019 | Madisetti et al. |
| 2019/0333030 A1 | 10/2019 | Ramasamy et al. |
| 2019/0347651 A1 | 11/2019 | Moreno |
| 2020/0005290 A1* | 1/2020 | Madisetti .............. H04L 9/3239 |
| 2020/0005299 A1 | 1/2020 | Castinado et al. |
| 2020/0042960 A1 | 2/2020 | Cook et al. |
| 2020/0042982 A1 | 2/2020 | Snow |
| 2020/0134583 A1 | 4/2020 | Hu et al. |
| 2020/0152005 A1 | 5/2020 | Higgins et al. |
| 2020/0184553 A1 | 6/2020 | Serrano et al. |
| 2020/0279249 A1 | 9/2020 | Ta |
| 2020/0311724 A1 | 10/2020 | Dunjic et al. |
| 2020/0327775 A1 | 10/2020 | Larimer |
| 2020/0334667 A1 | 10/2020 | Naim |
| 2020/0349638 A1 | 11/2020 | Raiz |
| 2020/0358614 A1 | 11/2020 | Fiske |
| 2021/0081946 A1 | 3/2021 | Opondo et al. |

OTHER PUBLICATIONS

International Search Report for International Application No. PCT/US2021/038493, dated Sep. 24, 2021, 10 pages.

* cited by examiner

SYSTEMS AND METHODS FOR STREAMLINING CREDIT AND/OR DEBIT CARD TRANSACTIONS UTILIZING BLOCKCHAIN SUPPORTED CREDIT TOKENS AND/OR DEBIT TOKENS

CROSS REFERENCE TO RELATED APPLICATIONS

This application is a continuation application of U.S. patent application Ser. No. 16/920,340, filed Jul. 2, 2020, which claims the benefit under 35 U.S.C. § 119(e) of the U.S. Provisional Patent Application No. 63/042,555, filed Jun. 22, 2020, the contents of which are hereby incorporated by reference in its entirety.

TECHNICAL FIELD

This disclosure relates to blockchain supported transaction environments, and more specifically some embodiments disclosed herein relate to systems and methods for providing novel payment card (e.g., credit card, debit card, check card, gift card, etc.) solutions utilizing novel tokens (e.g., credit tokens, debit tokens, check tokens, gift tokens, etc.) in blockchain supported transactions on a blockchain supported network to achieve intelligent enhancements over conventional systems and methods.

BACKGROUND

Payment card usage is ubiquitous among those who regularly participate in modern commerce. Credit cards and debit cards are among the most popular payment cards. A credit card is a type of electronic payment card that allows charges to be made against the cardholder's line of credit instead of the cardholder's cash deposits. A debit card is a type of electronic payment card that allows charges to be made against the cardholder's deposit account (e.g., a savings account, a checking account). Unlike credit cards, which are not tied to cash deposits, a debit card can only be used if the account holder has money in the bank account to which the debit card corresponds.

While payment card usage appears to be a simple process to the cardholder (who simply slides, taps, inserts his/her card into the point-of-sale device ("POS device") at the merchant, or enters his/her payment card details into his/her computer for an online purchase, or otherwise presents his/her payment card details to the merchant), what goes on behind the scenes to complete a card based transaction is a highly sophisticated, costly and complex process that requires extensive coordination among many entities in order to be successful.

For example, a common payment card based transaction may involve coordination between the cardholder, the merchant, the acquiring bank (i.e., the merchant's bank), the issuing bank (i.e., the bank that issued the card to the cardholder), the acquiring processor (i.e., the entity providing a service, software, or device that allows merchants to accept cards for payment, e.g., the POS device), and the card network (i.e., the entity(-ies) operating the network that processes card based payments and govern interchange fees).

Because, in the traditional scenario, the card network provider (e.g., Visa®, Mastercard®, American Express®, etc.) exercises ultimate control over the conventional payment card based transaction process, the card network imposes fees for facilitating such processing. The commercial community has become complacent with the current framework because the infrastructure is already in place, the system is highly complex, and because the framework controlled by large entities whose revenues depend on the system staying in place and staying in their control. Thus, the conventional system was adopted worldwide and continues to be adopted by commercial participants with little-to-no substantial challenge. Within the current framework, various fees are imposed by entities that are in a position to control one or more steps in the processes carried out in a payment card based transaction (e.g., authentication, authorization, clearing, settlement, management of accounts, etc.). For example, issuing banks may impose interchange fees, acquiring banks (or their processors) may impose processing fees, and card networks may impose added processing fees for coordinating steps between the acquiring banks and issuing banks involved. Many of the steps in the conventional framework, and much of the computational burden to perform such steps, are either unnecessary or may be reduced substantially by implementing the frameworks, systems and methods provided in the present disclosure. Similarly, by implementing the technology of the present disclosure, fees associated with the old and overly complex framework may be reduced (e.g., in the case of issuing bank fees) or entirely eliminated (e.g., in the case of the card network fees such as Visa®, Discover®, American Express®, or MasterCard® related fees and processing fees). In short, because of the many advantages provided by the technologies of the present disclosure, the traditional framework is in far less demand than it has been since its inception. As described herein, far more elegant framework providing more efficient and less expensive solutions may be adopted with ease, often with enhanced privacy and/or security, thereby providing a viable solution that cuts out unnecessary middlemen (e.g., Visa®, Mastercard®, Discover®, American Express® and related processors) to lower costs and lightening the burden on consumers and merchants worldwide.

The payment card solutions of the present disclosure provide a fundamentally different and monumental alternative to the traditional process. With the technology of the present disclosure, payment card based transactions can be completed (authorized, authenticated, validated, cleared, and settled) without contacting or coordinating with a card network for a great majority of transactions (and eventually all transactions). With the payment card solutions of the present disclosure, the payment card transaction process may be more efficient (eliminating several steps and middlemen in the conventional process) for transactions meeting certain criteria, and various fees associated with the conventional card payment transaction processes may be reduced or avoided. Moreover, the flexibility that the technology of the present disclosure provides to participants is virtually limitless. Embodiments of the disclosure will be discussed in further detail herein.

SUMMARY

A claimed solution rooted in computer technology overcomes problems specifically arising in the realm of computer technology—namely an excessively onerous and overly redundant validation, clearance and settlement processes upon which payment card transactions remain contingent.

In embodiment of the systems, methods, and frameworks disclosed herein, the technology of the present disclosure may include hardware (e.g., one or more processors; and one or more memory devices storing instructions which, when executed by the one or more processors, cause the system to perform operations disclosed herein) and/or one or more components and/or one or more steps, including: receiving (in some instances from a first network participant), a request for token credit; approving, upon satisfaction of a creditworthiness requirement, a token credit line for the first network participant; receiving, collecting, storing, comparing, and/or distributing biometric information (e.g., fingerprint information, retinal information, facial feature information, voice information, other biometric features) utilizing a blockchain (e.g., a blockchain hosted in whole or in part by a financial institution (e.g., an issuing bank), and/or a consortium of financial institutions) for verification to provide additional authentication and/or fraud prevention; minting (e.g., upon approving the token credit line for the first network participant, or on-demand (such as in real time or near real-time in connection with a proposed transaction)), a number of credit tokens equivalent to or up to a token credit line limit associated with the approved token credit line; depositing one or more of the minted credit tokens into a digital wallet of the first network participant; issuing a token based payment card to the first network participant, wherein the token based payment card is linked to first network participant's digital wallet and may be used by the network participant to transact with a second network participant using the credit tokens as a payment medium; allowing the second network participant to exchange the credit tokens for fiat currency with one or more of: a an entity that minted the credit tokens and issued such tokens to the first network participant, an entity that is different than the entity that minted the credit tokens and issued such tokens to the first network participant; wherein each transaction (e.g., each transaction performed in accordance with the token movement technologies disclosed herein) is validated, processed and/or recorded by a blockchain hosted by at least one of: a financial institution and a consortium of financial institutions.

Some embodiments of the present technology may also include monitoring first network participant's use of the credit tokens (e.g., periodically or continuously checking a usage status and/or a physical location of a token issued to the first network participant, which may involve periodically or continuously evaluating the digital wallet of the first network participant).

Some embodiments of the present technology may also include deferring, upon a first network participant's use of one or more of the credit tokens, an interest fee for such usage until a predetermined grace period has elapsed.

Some embodiments of the present technology may include monitoring a lost/stolen status of first network participant's digital wallet; burning (i.e., deleting), upon determining that the status of the first network participant's digital wallet is lost/stolen, all of the unused credit tokens earlier deposited in the first network participant's digital wallet; minting (i.e., creating), after burning all of the unused credit tokens earlier deposited in the first network participant's digital wallet, replacement credit tokens to replace each of the unused credit tokens earlier deposited in the first network participant's digital wallet; depositing the replacement credit tokens in a replacement digital wallet of the first network participant. In some embodiments, the digital wallet of the first network participant is linked to a single token based payment card and not linked to any other payment cards. In some embodiments, the digital wallet of the first network participant is linked to a plurality of payment cards, the plurality of payment cards including the issued token based payment card. In some embodiments, the token based payment card is configured to operate as both token based debit card and a token based credit card. In some embodiments, the plurality of payment cards includes at least one token based credit card, and at least one token based debit card. In some embodiments, the first network participant's digital wallet is configured to transfer and receive one or more of: entity specific tokens, entity agnostic tokens, tokens associated with a first jurisdiction, and tokens associated with a second jurisdiction.

Some embodiments of the present technology may include allowing the second network participant to execute a payment to a third network participant using the credit tokens received from the first network participant. In some embodiments, the one or more minted credit tokens are configured with one or more spending incentives defined by credit token payback terms. In some embodiments, the spending incentives include one or more of: a first interest rate applicable during an incentive period, and a second interest rate applicable after an incentive period; a third interest rate applicable to unspent credit tokens; and/or a fourth interest rate applicable to returned tokens. Any of the foregoing interest rates may be any predefined percentage, including a static positive percentage, a static zero percentage, a dynamic positive percentage that may increase or decrease on the basis of some predefined criteria, a dynamic zero percentage that may increase or decrease on the basis of some predefined criteria.

In some embodiments, the spending incentives include one or more of: a first interest rate applicable after a credit token is used by the first network participant for a purchase within a predetermined timeframe; a second interest rate applicable after a credit token is used by the first network participant for a cash advance within a predetermined timeframe; and/or a third interest rate applicable after a credit token is used by the first network participant for a balance transfer within a predetermined timeframe.

In some embodiments, the one or more minted credit tokens are jurisdiction specific credit tokens; wherein the jurisdiction specific credit tokens are exchangeable for local fiat currency, and are exchangeable for foreign currency at a predetermined exchange rate.

In some embodiments, the digital wallet of the first network participant is configured to select a payment card among a plurality of payment cards for use in a proposed transaction, wherein the automatic selection is based on one or more of: a user selection, a predefined preference of the first network participant, and a recommendation from the second network participant. In some embodiments, the token based payment card is configured to operate as both token based debit card and a token based credit card.

Some embodiments of the present technology may also include receiving, from the first network participant, a bill payment for a prior usage of the credit tokens; and/or replenishing the digital wallet of the first network participant with additional credit tokens corresponding to the amount of the bill payment, minted credit tokens into a digital wallet of the first network participant.

In embodiment of the systems, methods, and frameworks disclosed herein, the technology of the present disclosure may include hardware (e.g., one or more processors; and one or more memory devices storing instructions which, when executed by the one or more processors, cause the system to perform operations disclosed herein) and/or one or more components and/or one or more steps, including: acquiring, from a payment card provided by a first network participant to a second network participant, first bank information (or first blockchain information, e.g., a blockchain IP address), wherein the first bank information comprises details that identify one or more of a first bank (or a blockchain hosted by a first bank), an address of a first blockchain (which may be hosted in whole or in part by the first bank, or an agent of the first bank), and a first digital wallet (e.g., via a wallet address), wherein the wallet address is associated with a first digital wallet of the first network participant, and wherein the first digital wallet of the first network participant is associated with a first account held by the first network participant with the first bank; determining whether the identity of the first bank is the same as the identity of a second bank, wherein the second bank is a bank with which the second network participant holds a second account, and further wherein a second digital wallet of the second network participant is associated with the second account; transmitting, upon determining that the first bank and the second bank are a single bank, a request to validate that the payment card can be used for a proposed transaction, wherein the proposed transaction, if executed, would require a designated amount of credit tokens to be transferred from the first digital wallet to the second digital wallet; wherein the request to validate is transmitted to a blockchain hosted by at least one of: the single bank, and a bank consortium of which the single bank is a member; receiving (e.g., from the blockchain, and/or from the bank or agent hosting the blockchain) a validation indication, wherein the validation indication specifies whether or not the payment card is validated for the proposed transaction; causing (e.g., via the blockchain), if the validation indication specifies that the payment card is validated for the proposed transaction, at least one of: the designated amount of credit tokens to be transferred from the first digital wallet to the second digital wallet; and the designated amount of credit tokens to be transferred from the first digital wallet to the first bank, and a corresponding amount of fiat currency to be deposited into the second account by the first bank.

Some embodiments of the present technology may also include transmitting, upon determining that the first bank and the second bank are separate banks, a request to a blockchain to validate that the payment card can be used for the proposed transaction, wherein the second participant is registered with the first bank for validation and/or fund reception purposes, and wherein the blockchain is hosted by at least one of: the first bank, a bank consortium of which the first bank is a member, and a bank consortium of which at least one of the first bank and the second bank is a member; receiving (e.g., from the blockchain) a validation indication, wherein the validation indication specifies whether or not the payment card is validated for the proposed transaction; causing (e.g., via the blockchain), if the validation indication specifies that the payment card is validated for the proposed transaction, at least one of: the designated amount of credit tokens to be transferred from the first digital wallet to the second digital wallet, wherein the transferred credit tokens are exchangeable for fiat-currency at a predetermined exchange rate at one or more of the first bank and/or the second bank; and the designated amount of credit tokens to be transferred from the first digital wallet to the first bank, and a corresponding amount of fiat currency to be deposited into the second account by the first bank.

In some embodiments, the designated amount of tokens transferred from the first digital wallet to the second digital wallet comprises an amount of credit tokens.

Some embodiments of the present technology may also include reflecting, upon receiving a transfer indication from the first bank, an adjusted token balance in one or more of: the digital wallet of the first network participant and the digital wallet of the second network participant. In some embodiments, the payment card provided by a first network participant to a second network participant is selected (by the first network participant, based on a selection and/or recommendation generated by either its own UNode and/or the UNode of the second network participant) among a plurality of payment cards held in the first digital wallet, wherein the selection is based on one or more of: an interest rate applicable to credit tokens associated with one or more of the plurality of payment cards; the entity that minted the credit tokens associated with one or more of the plurality of payment cards; a reward or incentive applicable to the spending of credit tokens associated with one or more of the plurality of payment cards; a balance of available credit tokens associated with one or more of the plurality of payment cards; the impact on the cardholder's FICO score (or other credibility score) that may occur by using one blockchain based payment card relative to the others.

In some embodiments, the payment card provided by a first network participant to a second network participant is configured to store jurisdiction specific credit tokens; wherein the jurisdiction specific credit tokens are exchangeable for local fiat currency, and are exchangeable for foreign currency at a predetermined exchange rate.

In some embodiments, the designated amount of tokens transferred from the first digital wallet to the second digital wallet comprises an amount of credit tokens. Some embodiments of the present technology may also include causing, responsive to a selection by the second network participant, one or more of the credit tokens to be transferred from the second digital wallet to the first bank for exchange; and causing, responsive to a selection by the second network participant, second bank information to be transmitted to the first bank, wherein the second bank information comprises details that identify the second bank and a second digital wallet address associated with the second digital wallet of the second network participant, wherein the second digital wallet of the second network participant is associated with the second account held by the second network participant with the second bank; receiving, after causing the one or more digital tokens to be transferred from the second digital wallet to the first bank for exchange, an exchange indication confirming that the one or more digital tokens transferred from the second digital wallet to the first bank have been exchanged for fiat currency; and/or reflecting, upon receiving the exchange indication from the first bank, an adjusted digital token balance in a digital wallet of the second network participant.

In some embodiments, the first bank information comprises a validation blockchain IP address associated with a blockchain node associated with the first network participant. In some embodiments, the validation indication results from a one or more of a consensus operation. In some embodiments, the validation indication results from one or more of a proof-of-authority consensus operation, a proof-of-history consensus operation, and a proof-of-work consensus operation, a proof-of-two consensus operation and a proof-of-stake consensus operation.

Some embodiments of the present technology may also include performing, prior to transmitting the request to validate to the blockchain, a pre-validation check for use of the payment card in a proposed transaction, wherein the pre-validation is based on an account balance associated with a the payment card and known to the digital wallet of the first network participant, wherein the digital wallet of the first network participant is stored in a node of the first network participant.

In embodiment of the systems, methods, and frameworks disclosed herein, the technology of the present disclosure may include hardware (e.g., one or more processors; and one or more memory devices storing instructions which, when executed by the one or more processors, cause the system to perform operations disclosed herein) and/or one or more components and/or one or more steps, including: acquiring, from a transaction code or other transaction ID (RFID, IOT, or other code or ID number) provided by a second network participant to a first network participant, a transaction amount and a digital wallet ID, wherein the transaction amount designates an amount of credit tokens required for a proposed transaction to be completed, and the digital wallet ID comprises an address associated with a digital wallet of the second network participant, wherein the digital wallet of the second network participant is linked to a second account held by the second network participant with the second bank; and/or determining whether the identity of the first bank is the same as the identity of a second bank, wherein the second bank is a bank with which the second network participant holds a second account, and further wherein a second digital wallet of the second network participant is associated with the second account; and/or performing a pre-validation operation with a node controlled by the first network participant, wherein the pre-validation operation determines if sufficient funds exist for the payment card to be used for a proposed transaction (e.g., without making a separate validation request to a blockchain); transmitting, upon passing the pre-validation operation successfully and/ or upon determining that the first bank and the second bank are a single bank, a request to validate that the payment card can be used for the proposed transaction, wherein the proposed transaction, if executed, would require a designated amount of credit tokens to be transferred from the first digital wallet to the second digital wallet; wherein the request to validate is transmitted to a blockchain hosted by at least one of: the single bank, or a bank consortium of which the single bank is a member; causing, upon receiving a validation indication, at least one of: the designated amount of credit tokens to be transferred from the first digital wallet to the second digital wallet; and the designated amount of credit tokens to be transferred from the first digital wallet to the first bank (e.g., together with an indication that the corresponding amount of fiat currency should be deposited in the second account, wherein the indication may include one or more details about the second account (e.g., account number, routing number, etc.) that the first digital wallet may obtain from the second digital wallet).

In some embodiments, in the event that the designated amount of credit tokens are transferred from the first digital wallet to the second digital wallet, the second network participant may exchange the credit tokens with the first bank and/or the second bank and the corresponding amount of fiat currency (at a predetermined exchange rate) may then be deposited into the second account. In the case where the second network participant exchanges the credit tokens with the first bank, the first bank may either deposit the corresponding amount of fiat currency directly into the second account or may cause (in accordance with an arrangement between the first bank and the second bank) the second bank to deposit the corresponding amount of fiat currency directly into the second account, followed by an accounting settlement between the first and second bank in accordance with their arrangement.

In some embodiments, in the event that the designated amount of credit tokens are transferred from the first digital wallet to the first bank (for example, at the request of the second network participant), the first network participant may transfer the designated amount of credit tokens to the first bank together with an indication that the corresponding amount of fiat currency (at a predetermined exchange rate) should then be deposited into the second account (held by the second bank). The first bank may either deposit the corresponding amount of fiat currency directly into the second account or may cause (in accordance with an arrangement between the first bank and the second bank) the second bank to deposit the corresponding amount of fiat currency directly into the second account, followed by an accounting settlement between the first and second bank in accordance with their arrangement.

Some embodiments of the present technology may also include receiving the validation indication through the node from the blockchain hosted by at least one of: the single bank, or a bank consortium of which the first bank and/or the second bank is a member, wherein the validation indication specifies whether or not a payment card of the first network participant is validated for the proposed transaction, and wherein the validation indication is received upon determining that the digital wallet associated with the payment card of the first network participant holds an amount of tokens greater than or equal to the amount of credit tokens required for the proposed transaction and designated by the transaction code, and further wherein the payment card is associated with a first account held by the first network participant with a first bank.

In some embodiments, the payment card is selected among a plurality of payment cards maintained in one or more digital wallets of the first network participant. In some embodiments, the payment card is selected based on information obtained from the transaction code, wherein the information obtained from the transaction code comprises one or more of: (i) an entity-agnostic token amount required to complete the proposed transaction, (ii) an entity-specific token amount required complete the proposed transaction and (iii) the second network participant's preferred form of payment the proposed transaction.

Some embodiments of the present technology may also include reflecting, upon receiving a transfer indication from the first bank (or the blockchain hosted in whole or in part by the first bank), an adjusted digital token balance in one or more of the digital wallet of the first network participant and the digital wallet of the second network participant. In some embodiments, where the first bank and the second bank are the same bank (i.e., a single bank), the transfer indication from the blockchain hosted in whole or in part by such single bank may occur in real time or near real time.

In some embodiments, the credit tokens are exchangeable for fiat-currency at a predetermined exchange rate. In some embodiments, the payment card provided by a first network participant to a second network participant is configured to store jurisdiction specific credit tokens; wherein the jurisdiction specific credit tokens are exchangeable for local fiat currency, and are exchangeable for foreign currency at a predetermined exchange rate. In some embodiments, the credit tokens are usable as a medium of exchange in subsequent transactions involving the second network participant.

In some embodiments, the payment card provided by a first network participant to a second network participant is selected among a plurality of payment cards held in the first digital wallet, wherein the selection is based on one or more of: an interest rate applicable to credit tokens associated with one or more of the plurality of payment cards; the entity that minted the credit tokens associated with one or more of the plurality of payment cards; a reward or incentive applicable to the spending of credit tokens associated with one or more of the plurality of payment cards; a balance of available credit tokens associated with one or more of the plurality of payment cards; the impact on the cardholder's FICO score (or other credibility score) that may occur by using one blockchain based payment card relative to the others.

In some embodiments, the validation indication results from a one or more of a consensus operation. In some embodiments, the validation indication results from one or more of a proof-of-authority consensus operation, a proof-of-history consensus operation, and a proof-of-work consensus operation, a proof-of-two consensus operation and a proof-of-stake consensus operation. In some embodiments, the designated amount of tokens transferred from the first digital wallet to the second digital wallet comprises an amount of credit tokens. Some embodiments of the present technology may also include reflecting, upon receiving a transfer indication from the blockchain, an adjusted token balance in one or more of: the digital wallet of the first network participant and the digital wallet of the second network participant.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Figure 1:
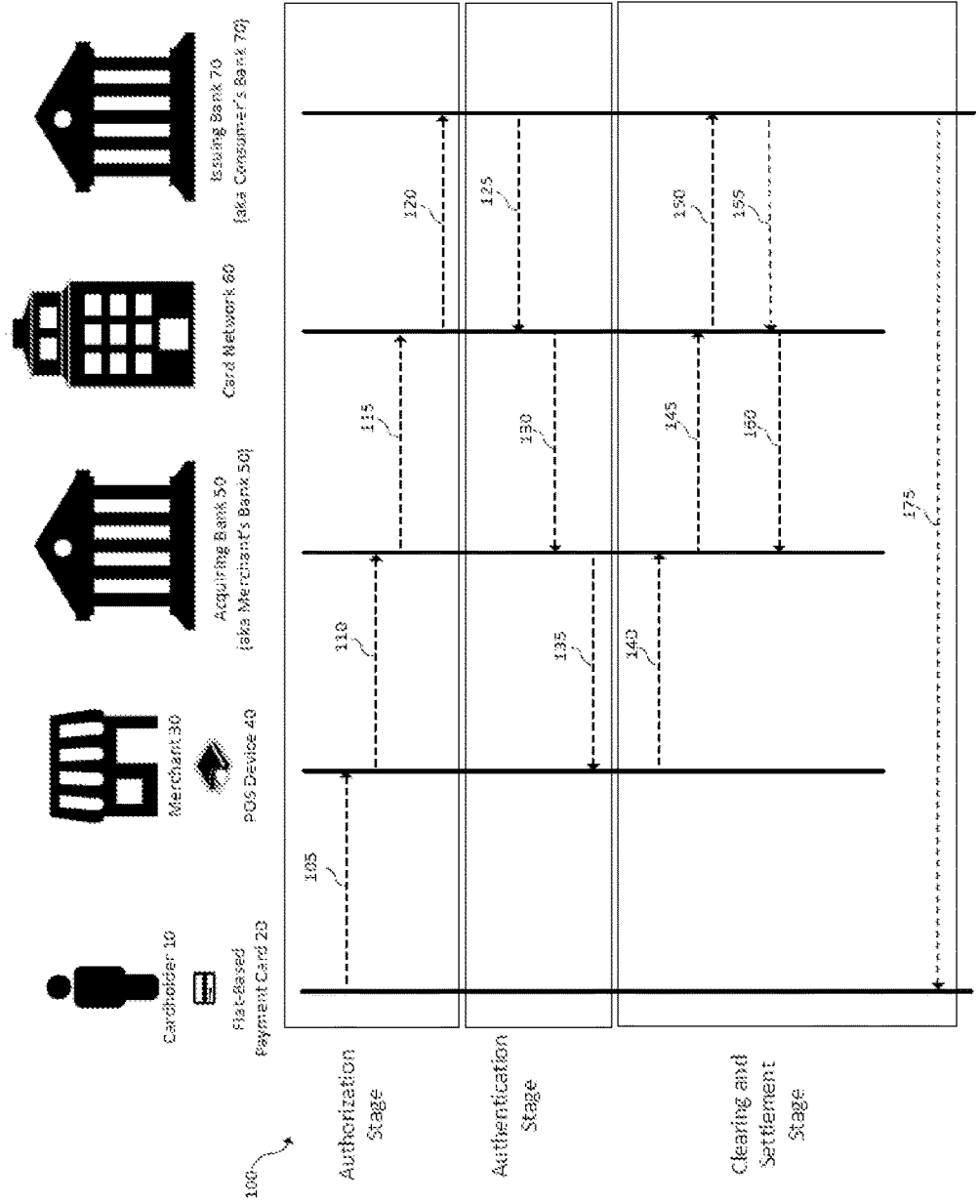
FIG. 1 illustrates elements and entities, and further depicts a communication flow between such entities and elements in order to complete an example credit card transaction in a conventional environment.

To fully appreciate the improvements provided by the frameworks, systems, and methods of the present disclosure, a brief discussion of the complexities of the conventional payment card framework is warranted. FIG. 1 illustrates such elements and entities, and further depicts a communication flow between such entities and elements in order to complete an example credit card transaction in a conventional setting. After discussing the conventional communication flow in FIG. 1, example communication flows in accordance with embodiments of the present disclosure will be discussed with reference to FIGS. 3A-3D, FIG. 4A and FIGS. 5-7.

Referring to FIG. 1, in a conventional transaction environment the entities and elements involved may include: a cardholder 10 possessing a payment card 20; a merchant 30 possessing a point-of-sale device 40; an acquiring bank 50 (aka merchant's bank 50) where merchant 30 holds an account (e.g., a bank account where deposits and/or withdrawals may be made); a card network 60 coordinating and governing various communications between the other entities and elements; and an issuing bank 70 which issued the payment card 20 to the cardholder 10, and where cardholder 10 holds an account (e.g., a credit or debit account where deposits and/or withdrawals may be made against a credit line, against an already deposited amount of fiat funds, or against a combination of both). These entities and elements engage with one another, directly or indirectly, to accomplish an electronic and/or physical exchange to complete a payment card transaction (e.g., a credit card purchase).

As shown in FIG. 1, when cardholder 10 inserts, taps, slides, or otherwise provides his payment card 20 to the merchant 30 (e.g. via the POS device 40, or by inputting his card information into a website), the merchant 30 (or the merchant 30's processor) collects payment card 20 information and then passes that payment card 20 information on to the credit card network 60 (e.g., Visa®, Master®, Amex®, Discover®, etc.) who will in turn pass to cardholder 10's issuing bank 70 for authorization. Issuing bank 70 will send authorization results to credit card network 60, who then sends the authorization results to merchant 30 (or merchant 30's processor) and/or merchant 30's POS device 40. Once authorized, cardholder 10 can confirm the transaction, for example, by signing a confirmation receipt. Thereafter, within a certain required period (e.g., daily), merchant 30 will then send all the completed transaction records during the period to a processor, who will in turn send the relevant information from such completed transactions to credit card network 60. Credit card network 60 will communicate with issuing bank 70 to deliver owed funds. Credit card network 60 will then collect owed funds from issuing bank 70 after deducting related fees which it shares with issuing bank 70. Credit card network 60 will then send the funds to the processor who will then disperse the received funds to merchant 30 bank account (held by acquiring bank 50) after deducting its own fees. Issuing bank 70 will then post the transaction information to cardholder 10 account. Cardholder 10 receives the statement and pays the bill.

At step 105, cardholder 10 presents his/her payment card 20 to the merchant 30 for payment, normally by either inserting, sliding, or tapping his/her payment card 20 into, through, or on a reading zone of a POS device 40. POS device 40 acquires the payment card 20 details as the cardholder 10 presents the payment card 20 to the POS device 40. After acquiring the payment card 20 details, at step 110 the POS device 40 sends one or more such details to the acquiring bank 50 (or the acquiring bank 50's acquiring processor). At step 115, acquiring bank 50 transmits one or more payment card 20 details to the card network 60. The card network 60 clears the payment and, at step 120, requests payment authorization from issuing bank 70 (consumers bank 70). In general, the payment authorization request that card network 60 sends to issuing bank 70 includes one or more payment card 20 details such as, e.g., payment card number, payment card expiration date, billing address (for address verification system validation), payment card security code (e.g., CVV), and/or payment amount.

Upon receiving the payment card 20 details from card network 60, the issuing bank 70 verifies the validity of cardholder 10's payment card 20 using fraud protection tools such as the address verification service and/or card security codes such as CVV, CVV2, CVC2, CID, etc. the issuing bank 70 validates the payment card 20 number, checks the amount of available funds, matches the billing address to the one on file and validates CVV number. Issuing bank 70 approves or declines the transaction based on the aforementioned validation operations, and then, at step 125, sends a message indicating the same to the card network 60. Thereafter, at step 130, card network 60 passes the message to the acquiring bank 50. And finally, at step 135, acquiring bank 50 passes the message to the POS device 40 of merchant 30. Usually the POS device 40 will present an "approved" or "declined" message that the cardholder can view on a display of POS device 40. Once merchant 30 receives the authorization, issuing bank 70 places a hold in the amount of the purchase on cardholder 10's account. Merchant 30 generally provides cardholder 10 with a receipt to complete the sale, which the merchant 30 may require that the cardholder 10 sign (or to provide other indicia) to confirm the occurrence of the transaction. Merchant 30's POS device 40 collects all approved authorizations for a given period of time (e.g. for entire day), which are later sent in a batch for further processing.

At the end of the given time (e.g. the end of the day), at step 140 merchant 30 sends, the batch of approved authorizations to acquiring bank 50 (or acquiring bank 50s acquiring processor). At step 145 acquiring bank 50 (or acquiring bank 50s acquiring processor) routes the batched information to card network 60 for settlement. At step 150 card network 60 forwards each approved transaction to the appropriate issuing bank 70 for each transaction in the batch. Usually within 24 to 48 hours of the transaction, at step 155, issuing bank 70 withholds an interchange fee and then transfers the remaining funds to the card network 60. The card network 60 then, at step 160, distributes funds to the acquiring bank 50. Acquiring bank 50 then disperses received funds into merchant 30's account after deducting its own fees. At step 175, issuing bank 70 posts the transaction information to cardholder 10 account. Cardholder 10 receives the statement and pays the bill.

With reference to FIG. 1, steps 105, 110, 115, and 120 are often collectively referred to as the "authorization stage", steps 125, 130, and 135 are often collectively referred to as the "authentication stage", steps 140, 145, 150, 155, 160, and 175 are often collectively referred to as the "clearing and settlement stage."

Embodiments of the present disclosure include systems and methods for providing participants in a blockchain supported transaction network with one or more digital wallets configured to host one or more token based payment cards and/or to host, reflect, transfer and/or receive credit tokens, debit tokens, and/or other forms of tokens on behalf of the network participant (unless otherwise specified by the context of an example, for brevity the term "credit tokens" will be used throughout to refer to all of the foregoing types of tokens, individually and collectively). Credit tokens may be minted by a banking institution (or by an agent of a bank consortium) participating in the blockchain supported transaction network, and may be used as the medium of exchange in blockchain supported transactions in accordance with one or more embodiments of the present disclosure. Credit tokens may be associated with a token based payment card (which may be a physical card, an electronic card (e.g., an application on a smartphone, a selectable item within an app on a smartphone, and the like), or a physical card with an electronic counterpart).

A payer network participant (i.e., the network participant desiring to pay credit tokens to another network participant in connection with a proposed transaction) may utilize its digital wallet to (i) receive and confirm a request for credit tokens from a payee network participant (defined below) in connection with a proposed transaction, and/or (ii) generate and/or provide a payer code associated with a token based payment card hosted therein to a payee network participant (either in response to a request for credit tokens, or independent of a request for credit tokens), and/or (iii) scan, read, or otherwise receive one or more of a transaction code, a wallet address, a wallet ID, a payee identification code, or other code associated with the payee and/or the proposed transaction and/or (iv) execute a transfer of tokens, directly or indirectly, into the digital wallet of a payee network participant as a medium of exchange (either in response to a request for credit tokens and/or a payer code, or independent of a request for credit tokens and/or the payer code). The payer network participant may utilize a token based payment card to engage in such a transaction.

A payee network participant (i.e., the network participant desiring to receive credit tokens from the payer network participant in connection with a proposed transaction) may utilize its digital wallet to (i) send a request for credit tokens to a payer network participant in connection with a proposed transaction, and/or (ii) generate and/or provide a payee code associated with a proposed transaction to a payer network participant (either together with a request for credit tokens, or independent of a request for credit tokens), and/or (iii) scan, read, or otherwise receive one or more of a wallet address, a wallet ID, a payer identification code, or other code associated with the payer and/or the proposed transaction, and/or (iv) receive credit tokens that are addressed to and/or transferred for the benefit of the payee network participant (being received either in connection with a request for credit tokens and/or a payee code, or independent of a request for credit tokens and/or a payee code).

Credit tokens may be configured to be (i) traceable, (ii) programmable (e.g., to be bank specific, bank agnostic, to have an associated interest rate triggered by one or more events, or to be associated with different repayment plans (such as certain payments in certain portions by different payment milestones or dates)), (iii) pegged to fiat currency and/or exchangeable for fiat currency at a predetermined rate from either the payer's banking institution, the payee's banking institution, or any other institution which, through agreement or other arrangement, is associated with the payer's banking institution, the payee's banking institution, or both (e.g., through an agreement or other arrangement establishing a bank consortium), (iv) linked to a network participant's bank account with the banking institution, and/or (v) linked or otherwise associated with a token based payment card (e.g., a token based credit card, a token based debit card, a token based check card, a token based gift card, etc.) that may be hosted in the network participant's digital wallet (which may be loaded into a smartphone, desktop, server, netbook, tablet, PDA, computing terminal, and/or other computing device), and/or (vi) used by any number of network participants in any number of transactions before ultimately being exchanged for fiat currency.

Validation and/or clearance and settlement of payments made with credit tokens, including those transactions involving the use of a token based payment card to which such credit tokens may be linked, may occur in real-time or near-real time on account of, inter alia, one or more blockchain(s) hosted by one or more of the aforementioned banking institutions (or a consortium of banking institutions) performing the validation, processing and recording of the transaction. The blockchain may maintain concurrent knowledge of network participants' token holdings (and/or fiat holdings), biometric information (e.g., fingerprint information, retinal information, facial feature information, voice information, other biometric features) and provide for prompt validation, processing, and recording and more streamlined benefits over traditional credit card transactions, as explained further herein.

The interactions between payer and payee network participants and their associated financial institutions to complete transactions in accordance with example embodiments of the present disclosure may depend on the scenario undertaken. Examples of such scenarios may include (1) payee-initiated token based payment card transactions, and (2) payer-initiated token based payment card transactions.

Before discussing such scenarios, however, a discussion of exemplary blockchain transacting architectures (FIGS. 2A-2C) configured to enable one or more of the features disclosed herein is provided.

Figure 2A:
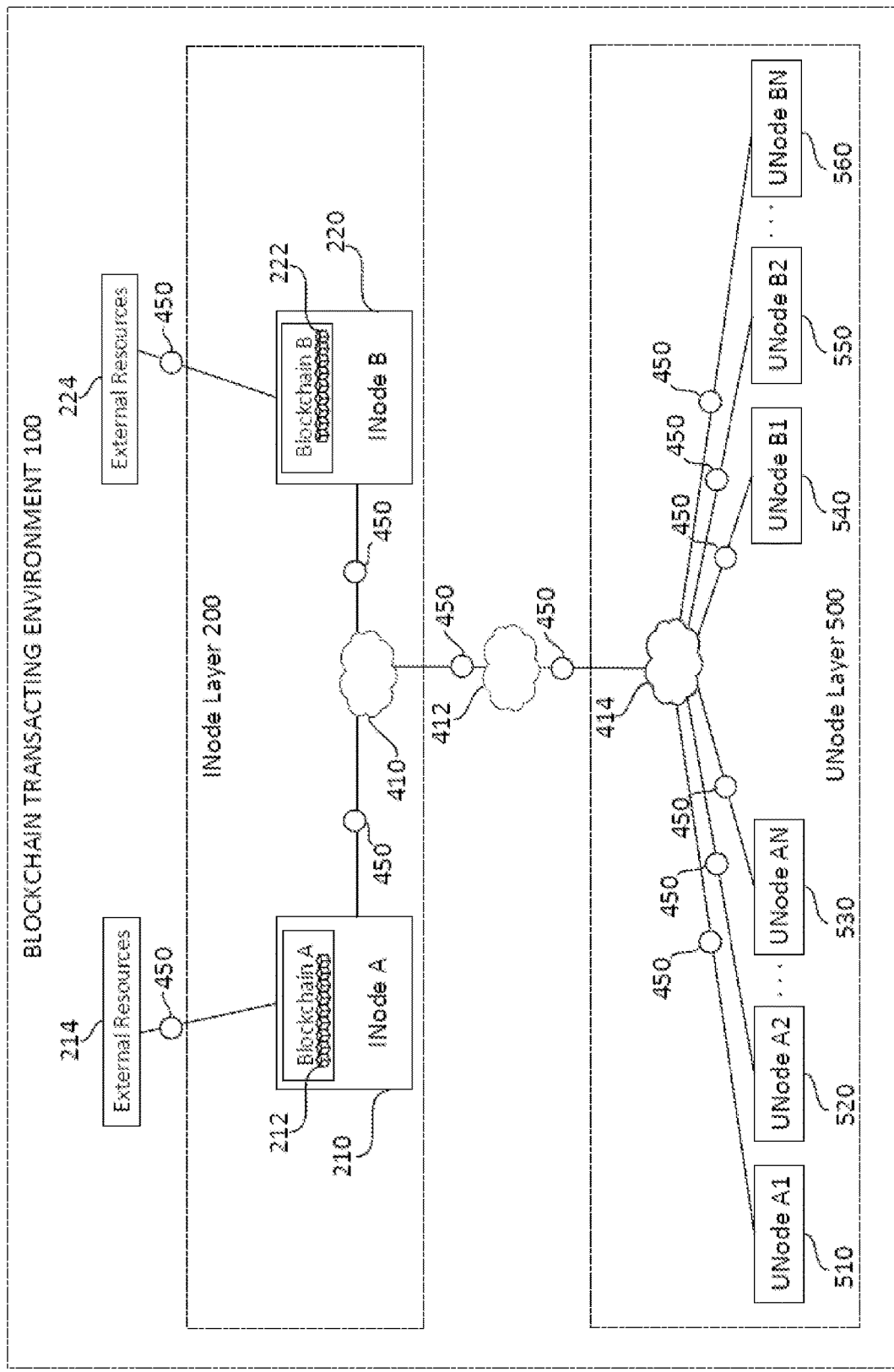
FIG. 2A illustrates an example blockchain transacting environment, without a consortium of financial institutions (described herein with reference to an INode), in which one or more embodiments of the present disclosure may be implemented.

FIG. 2A is a diagram illustrating an example blockchain transacting environment 100 in which one or more embodiments of the present disclosure may be implemented. Blockchain transacting environment 100 may include a plurality of nodes in communication with one another over one or more networks 410, 412, and/or 414 via communication links 450. A "node" refers to any device that participates in a blockchain network. A node may host all or part of a blockchain, or no portion of a blockchain at all. However, all nodes have access to at least one other node that hosts all or part of a blockchain for purposed of validation, processing, and/or recording of transactions.

A node can comprise or be coupled with any active electronic device, such as, by way of example, laptop or desktop computers, smartphones, servers, tablets, netbooks, or even printers and other simple electronic devices. Nodes are coupled to or equipped with wired or wireless communication components allowing them to connect to and communicate with other nodes, such as, by way of example, communication with other nodes over one or more networks 410, 412, and/or 414 (e.g., over the Internet using an Ethernet, Wi-Fi, or Cellular connection, for example).

Communication links 450 may connect nodes and/or other resources within blockchain transacting environment 100 to one or more networks 410, 412, and/or 414, and thereby to each other. Communication links 450 may be dynamically reconfigurable such that new nodes and/or other resources may be connected to or removed from the blockchain transacting environment 100 as the network evolves with new and/or different participants, and new and/or different resources. Communication links 450 may include any type of link. For example, one or more links 450 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), optical (such as for example Synchronous Optical Network (SONET) or Synchronous Digital Hierarchy (SDH)) links, or any one or more of an ad hoc network, an intranet, an extranet, a VPN, a LAN, a WLAN, a WAN, a WWAN, a MAN, a portion of the Internet, a portion of the PSTN, a cellular technology-based network link, a satellite communications technology-based network link, another link 450, or a combination of two or more such links 450. Links 450 need not be the same throughout blockchain transacting environment 100. Indeed, one or more first links 450 may differ in one or more respects from one or more second links 450. Communication over links 450 may include any request to send or receive any type of information accessible within blockchain transacting environment 100.

Networks 410, 412, and/or 414 may include any type of communication network. As an example and not by way of limitation, one or more portions of network 400 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these.

As further shown in FIG. 2A, the nodes of blockchain transacting environment 100 include multiple user nodes (UNode A1 510, UNode A2 520, . . . UNode AN 530 and UNode B1 540, UNode B2 550, . . . UNode BN 560) communicatively coupled with one or more identity nodes, INodeA 210, INodeB 220, the INodes being further communicatively coupled with one or more external resources 214, 224.

An INode (i.e., an "identity node") of INode layer 200 is a node that is associated with a network participant operating as (1) a centralized identity verification/account management entity with which, optionally, other network participants may hold accounts, be members, or otherwise be registered, and/or (2) a financial institution such as, a bank, a credit union, etc. (e.g., Chase Bank, Wells Fargo) with which, optionally, other network participants may hold accounts, be members, or otherwise be registered, and/or (3) a network of one or more centralized identity verification/account management entities and/or one or more financial institutions; and/or (4) a network of one or more identity verification/account management entities and/or one or more financial institutions.

An INode may, alone or together with other INodes host a blockchain. For example, as depicted in FIG. 2A, INode_A 210 hosts blockchain_A 212, and INode_B 220 hosts blockchain_B 222. In some examples, INode_A 210 may maintain a blockchain in connection with any transaction involving the INode_A 210 and/or any UNode for which INode_A 210 holds an account (e.g., transactions involving any one or more of UNode_A1 510, UNode_A2 520, . . . UNode_AN 530). Similarly, INode_B 220 may maintain a blockchain in connection with any transaction involving the INode_B 220 and/or any UNode for which INode_B 220 holds an account (e.g., transactions involving any one or more of UNode_B1 540, UNode_B2 550, . . . UNode_BN 560).

Figure 2B:
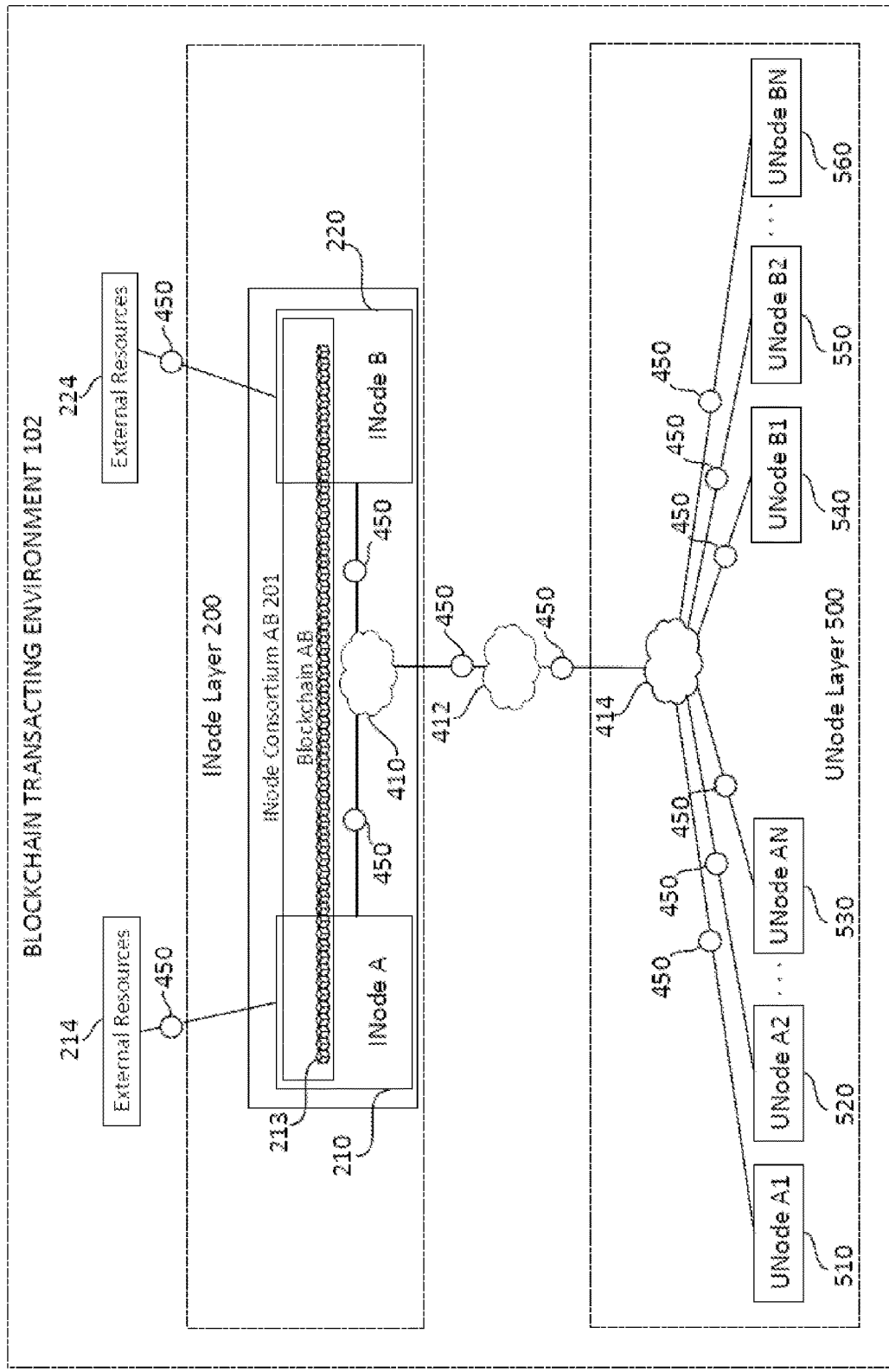
FIG. 2B illustrates an example blockchain transacting environment, including a consortium of financial institutions (described herein with reference to an INode), in which one or more embodiments of the present disclosure may be implemented.

Additionally or alternatively, a group of INodes may form an INode Consortium. An INode Consortium may maintain a blockchain in connection with any transaction involving any one or more of the INodes within the group and/or any UNode for which any one or more of the INode holds an account. That is, instead of or in addition to INode_A 210 and INode_B 220 hosting separate blockchains (blockchain_A 212 and blockchain_B 222), INode_A 210 and INode_B 220 may coordinate and arrange to host a single blockchain in connection with any transaction involving either INode_A or INode_B and/or any of their respective members (e.g., transactions involving any one or more of UNode_A1 510, UNode_A2 520, . . . UNode_AN 530, UNode_B1 540, UNode_B2 550, . . . UNode_BN 560). Such a scenario is illustrated in FIG. 2B (discussed below). Similarly, any number of INodes may form a consortium that coordinates and arranges to host a single blockchain in connection with transactions involving any of the INodes within the consortium and/or any of their respective member UNodes. That is, a given blockchain transacting environment may include multiple INodes and/or INode consortiums. In some embodiments, a single INode may be party to multiple consortiums FIG. 2C (discussed below) depicts such a scenario. It should also be appreciated from the present disclosure that a given blockchain transacting environment may include one or more INodes operating on their own (hosting their own blockchains), and may at the same time include other INodes operating as an INode consortium (together hosting a single blockchain).

A UNode (i.e., a "user node") of UNode layer 500 is a node that is associated with a network participant (e.g., a business, an organization, an institution, a person, an entity, or other user) within the blockchain transacting environment. Individual UNodes 500 may be embodied in one or more computer systems associated with individual network participants, where network participants are entities registered with blockchain transacting environment 100, and who may, upon satisfying requirements, participate in transactions with other network participants on a transaction platform supported by the blockchain transacting environment 100 (e.g., potential payers and potential payees).

For example, each INode depicted in the INode layer 200 of FIG. 2A may comprise or be embodied in one or more computer systems associated with a financial institution (e.g., a bank), and each UNode depicted in the UNode layer 500 of FIG. 2A may comprise or be embodied in one or more computer systems associated with a payer and/or payee on the blockchain transacting environment 100.

Entities associated with UNodes may hold accounts with, be members of, or otherwise be registered with the entities associated with one or more INodes. For example, UNodes may comprise one or more digital wallets owned by the network participant associated with the given UNode. The digital wallet may include one or more of a token based credit card and/or account, a token based debit account or card, a fiat based credit account, a fiat based debit account, and/or a hybrid account where a hybrid account may operate as any combination of the foregoing. A digital wallet may be entity-specific or entity-agnostic. An entity-specific digital wallet is configured to hold credit and/or debit tokens minted by a specific entity only. An entity-agnostic digital wallet is configured to hold credit and/or debit tokens minted by any number of entities. For example, a token based credit account in a UNode's entity-agnostic digital wallet may hold credit tokens, including either or both entity-specific credit tokens minted by different entities and/or entity agnostic credit tokens. Similarly, a token based debit account in a UNode's entity-agnostic digital wallet may hold debit tokens, including either or both entity-specific debit tokens minted by different entities and/or entity agnostic debit tokens. An entity associated with a UNode may hold bank accounts with several different banks operating in the blockchain transacting environment 100 (corresponding to several different INode's operating in the blockchain transacting environment 100). In some embodiments, a digital wallet of a UNode may thus be configured to hold credit tokens and/or debit tokens, some of which may be entity-specific to one bank (associated with one INode), others of which is entity-specific to another bank (associated with another INode), others of which may be consortium-specific to a group of banks (associated with a group of INodes), and others of which may be entity-agnostic, and others of which may be in the central bank currency-specific (i.e., having designations of currency issued by central banks—e.g., US Dollar USD, European Euro, etc.).

In some embodiments, either or both a digital wallet and/or the tokens hosted therein may be geo-specific (i.e., geofenced tokens only useable to make payments to participants in a specific geographical zone or for goods in a specific geographical zone) or geo-agnostic (i.e., non-geofenced tokens useable to make payments to participants in any geographical zone or for goods in any geographical zone). In some embodiments, either or both a digital wallet and/or the tokens hosted therein may be industry-specific (i.e., industry designated tokens only useable to make payments to participants in a specific industry or for goods in a specific industry) or industry-agnostic (i.e., non-industry designated tokens useable to make payments to participants in a specific industry or for goods in any industry). In some embodiments, either or both a digital wallet and/or the tokens hosted therein may be recipient-specific (i.e., recipient designated tokens only useable to make payments to specific recipients (e.g., specific merchants)) or recipient-agnostic (i.e., recipient designated tokens useable to make payments to any recipients (e.g., any merchant)).

In some embodiments, a UNode may provide access to one digital wallet for each token based payment card held by the cardholder. In other embodiments, a UNode may provide access to one digital wallet that maintains multiple token based payment card(s) held by the cardholder. In other embodiments, a UNode may provide access to multiple digital wallets, each of which may maintain one or more token based payment cards held by the cardholder.

In some embodiments, a token may operate as both a credit token and a debit token, depending on the balance of tokens in the cardholder's account. That is, if a user has a checking account with a reserve line (i.e., a credit line that gets accessed whenever the account holder spends more funds than have been deposited into the checking account), and also have a token based payment card in accordance with one or more embodiments of the present disclosure, a given token available via the cardholder's account may be configured to operate as a debit token (e.g., with no interest applied) until the cardholder's account balance reaches zero, and then, if not already spent by that point, the token may be configured to operate as a credit token (e.g., with an applicable interest rate) as the reserve line is accessed to complete a purchase. Accordingly, the tokens themselves may be considered hybrid as they can be configured to operate as either or both credit tokens and debit tokens, contingent on a predefined parameter of any type (e.g., the account holder's account balance).

The UNode's digital wallet can be configured to provide management functionality, alone or in coordination with other resources within blockchain transacting environment 100, such as accessing, transferring, converting, sending, receiving, releasing, exchanging, depositing, withdrawing, requesting, moving, securing or otherwise operating on cryptocurrency funds (e.g., tokens) and/or fiat funds (e.g., US dollars) upon request. A UNode's digital wallet may further be configured to execute code to provide balance reporting after one or more transactions has occurred involving currency or tokens managed by the given digital wallet of a network participant, which may be accessible or viewable via a user device or other device within the blockchain transacting environment 100. In some embodiments, a UNode's balance may be reported by the UNode itself, by the blockchain, and/or by the one or more INodes hosting the blockchain.

In some embodiments a digital wallet may be configured to store, transmit, receive, exchange, and/or scan one or more of a user identification object (e.g., a photo, a name, an avatar, a thumbnail, or other user ID object associated with the owner of the digital wallet); a wallet address (sometimes referred to herein as a Wallet ID); digital tokens (e.g., credit tokens, debit tokens, and check tokens—which may be issued by a central bank or an issuing bank; gift tokens—which may be issued by a merchant, an issuing bank, an acquiring bank, or otherwise); a transaction history; token based payment cards, fiat based payment cards; hybrid token-fiat based payment cards (capable of carrying tokens and/or access to a fiat credit line); biometric information (e.g., fingerprint information, retinal information, facial feature information, voice information, other biometric features) associated with the owner of the digital wallet or the digital wallet of the other party to a transaction. In some embodiments, the digital wallet application may utilize biometric information to further require authentication credentials (e.g., a facial feature, a voice feature, a fingerprint feature, etc.) before a user is able to access certain features of the digital wallet application (e.g., to initiate a transfer of tokens, to exchange tokens for fiat currency, etc.). Digital wallet application may utilize biometric information alone or together with other authentication credentials (e.g., PIN numbers, passcodes entered via an input interface) to provide enhanced security at the application level, prior to making further capacity functionality available to the user through the digital wallet app. In some embodiments, digital wallet app may prompt the user to provide authentication credentials at various stages or events—e.g., after a certain period of time has elapsed with no input from the user, periodically after a certain period of time has elapsed with any amount of activity, with each attempted token transfer request and/or deposit receipt (or any other attempted token movement).

In some embodiments, the digital wallet may further be configured to facilitate back-up (e.g., periodic back-up, on demand back-up, or one-time back-up) for later restoration by a given network participant as needed (e.g., if the given network loses their digital wallet (e.g., loses their UNode device such as their smart phone)). Moreover, the host of a UNode's digital wallet (whether the UNode itself or an INode associated with the UNode) may be able to cancel, replace, and/or restore a digital wallet (including token holdings therein) in the event that a digital wallet of a network participant (e.g., a payer or a payee) is lost, stolen, damaged, corrupted, or otherwise becomes unusable.

In some embodiments, the digital wallet and/or the payment cards hosted or embodied within such digital wallets may be linked to multiple accounts and/or multiple network participants (i.e., shared accounts between network participants with commonly shared finances 0 e.g., spouses). In some such embodiments, issuing bank's INode may host the one or more digital wallets and may link multiple cards to each digital wallet. An instance of the shared digital wallet (s) and/or token based payment card(s) may be viewable from the cardholders' respective UNode(s), but the tokens are not actually carried by such UNodes. Instead the issuing bank INode hosts the actual tokens.

Alternatively, in some embodiments where shared digital wallet(s) and/or shared token based card(s) are desired, the multiple entities desiring the shared arrangement may designate a primary holder of the digital wallets and/or the token based payment cards, and a secondary holder of the digital wallets and/or the token based payment cards. The primary holder's UNode may host the actual digital wallet and/or the token based payment cards, while the secondary holder's UNode may only access an instance of the actual digital wallet and may initiate token transfers to payees indirectly (e.g., by communicating with the primary holder's UNode to cause the primary holder's digital wallet to transfer the designated amount of tokens to, for example, the digital wallet of the payee network participant with whom the secondary holder desires to transact).

Entities associated with INodes may maintain accounts for, biometrics information for, memberships of, registration information for, and/or other information for the entities associated with one or more UNodes. In addition to the aforementioned features, an INode may be configured to extend a token based credit account, a token based debit account, a fiat based credit account, a fiat based debit account, and/or a hybrid account where a hybrid account may operate as any combination of the foregoing. An INode may maintain a blockchain in connection with any transaction involving the INode and/or any UNode for which the INode holds an account. Additionally or alternatively, a group of INodes (i.e., an INode Consortium) may maintain a blockchain in connection with any transaction involving any one or more of the INodes within the group and/or any UNode for which any one or more of the INode holds an account.

With respect to a token based credit account, an INode may extend a token based credit line to the entity associated with the UNode holding the token based credit account. In connection with the token based credit account, the entity associated with the INode may also issue a token based payment card to the entity associated with the token based credit account. The token based payment card may comprise a token based credit card providing the entity associated with the UNode access to the token based credit line. The payment card is linked to a digital wallet of the UNode associated with the cardholder, wherein the digital wallet (and the tokens deposited therein) is hosted by either or both the UNode associated with the cardholder and/or the INode associated with the issuing bank.

An INode may fill a UNode's digital wallet with, or otherwise give a UNode's digital wallet access to, credit tokens (or debit tokens, as the case may be). Credit tokens and/or debit tokens may be entity-specific (i.e., credit tokens or debit tokens specifically associated with the financial institution who minted the credit tokens or debit tokens), entity-agnostic (i.e., credit tokens or debit tokens not specifically associated with the financial institution who minted the credit tokens or debit tokens), or a combination of both. For example, if Wells Fargo® was a bank associated with a first INode, and JP Morgan Chase® was associated with a second INode, the first INode could mint, issue, and burn Wells Fargo Credit Tokens and the second INode could mint, issue, and burn JP Morgan Chase® Credit Tokens. Alternatively or additionally, the first and second INode could both mint, issue, and burn entity-agnostic (aka "generic") credit tokens and/or debit tokens.

An INode may provide credit tokens to a UNode contingent on a number of predefined factors. For example, an INode may deposit a number of credit tokens into a UNode's digital wallet based on the credit limit for which the UNode applied for and qualified (e.g., based on creditworthiness or some other factor). Credit tokens may be pegged to fiat currency at a predetermined ratio. The value of one credit token may correspond to the value of one US dollar in the United States (or to other forms of fiat currency throughout the world). In examples where credit tokens are pegged to fiat currency, the credit tokens may take on a value of a fractional fiat currency value such that an INode may deposit a number of credit tokens into a UNode digital wallet where the amount of tokens comprises a fractional component (e.g., depositing 5,250.50 Credit Tokens, depositing 5,250.524 Credit Tokens, etc.). The INode may issue to a UNode an electronic and/or physical token based payment card (that is linked to the UNode's digital wallet(s), which is/are held by UNode or hosted by UNode's issuing bank) that the entity associated with the UNode may use to transact with other UNodes over the blockchain transacting environment 100 (providing the entity associated with the UNode the ability to initiate a payment to the other UNode with credit tokens and/or debit tokens instead of fiat currency). The token based payment card can be in the form of digital wallet itself (e.g., on smart phone) or in the form of a physical/plastic chip card linked to digital wallet hosted by the UNode and the corresponding account hosted by the INode (or hosted by the UNode's issuing bank (i.e. the INode corresponding to the UNode's bank account)). The token based payment card may be a credit token based payment card, a debit based payment card, a prepaid token based payment card, or may be a hybrid token based payment card (i.e., a single card configured to operate as any combination of the foregoing).

In connection with issued credit tokens, the entity associated with the INode may elect to only charge interest to entity associated with the UNode after the entity associated with the UNode elects to use/spend the credit tokens in a transaction. In some instances, the INode may elect to only charge interest to the entity associated with the UNode if the used/spent credit tokens are not paid back (in either fiat currency or in credit tokens) within a particular grace period (e.g., one month grace period). In the event the entity associated with the UNode would like to pay off all or a portion of the credit token balance it has incurred, entity associated with the UNode may transmit a payment to the INode in the form of either or both credit tokens and/or fiat currency corresponding to the value of the credit tokens previously spent. In some embodiments, upon paying off all or a portion of its credit token balance by making a payment to the INode, the INode may replenish the digital wallet with all or a portion of new credit tokens for the cardholder 21's use.

In some embodiments, an INode may, in response to receiving fiat currency and/or credit token from a UNode as payment for credit tokens previously spent, the INode may replenish the UNode's digital wallet with a corresponding number of credit tokens. Thus, if the UNode pays off his credit token balance with fiat currency and/or credit tokens in full, the INode will replenish the UNode's digital wallet with credit tokens up to the credit limit.

In another example, an INode may deposit a number of credit tokens into a UNode's digital wallet in exchange for an amount of fiat currency from the UNode. Said differently, the entity associated with the UNode can purchase credit tokens from the entity associated with the INode. In this way, the entity associated with the UNode may transact with another UNode over the blockchain transacting environment 100 using a token based payment card (providing the entity associated with the UNode the ability to initiate a payment to the other UNode with credit tokens instead of fiat currency).

Equipped with a token based payment card from an INode, an entity associated with the UNode the ability to initiate a payment to the other UNode with credit tokens instead of fiat currency. This may be preferable for a number of reasons. First, utilizing a token based payment card may enable the UNode to transact with another UNode in a manner preferred by the other UNode. For instance, among other reasons, the other UNode may prefer to be paid in credit tokens rather than fiat currency because the fees incurred when receiving payments in the form of credit tokens (if any) may be less than the fees incurred when receiving payments in the form of fiat currency. In another example, among other reasons, the other UNode may prefer to be paid in credit tokens rather than fiat currency because validation (e.g., authentication and authorization) within the blockchain transacting environment is more secure than in the traditional credit card networking environment. In another example, among other reasons, the other UNode may prefer to be paid in credit tokens rather than fiat currency because clearing and settlement within the blockchain transacting environment occurs more quickly/efficiently than in the traditional credit card networking environment. Those of skill in the art will recognize that there are many additional reasons why a particular UNode may prefer to be paid in credit tokens than in fiat currency.

There may also be many reasons why a particular UNode a prefer to pay other UNodes using credit tokens rather than fiat currency. For example, among other reasons, the UNode may be able to spend credit tokens at a far lower interest rate than with his/her traditional credit line of fiat currency (e.g., on account of lower transaction fees applicable to merchants). For example, among other reasons, the UNode may be able to obtain greater rewards (e.g., sky miles, reward points, cash back, tokens back, etc.) than the rewards those available from using his/her traditional credit line of fiat currency (e.g., on account of lower transaction fees applicable to merchants). In another example, among other reasons, in the event that the payer UNode needs to seek a refund from the payee UNode for any reason (e.g., to return a product), the refunding of credit tokens to the payer UNode's digital wallet (and/or to the payer's account at issuing bank that is linked to the payer UNode's digital wallet) may be much quicker than the refunding of an amount of fiat currency access to the payer's traditional credit line of fiat currency.

On account of the flexibility provided by using the credit tokens of the present disclosure in a blockchain transacting environment such as blockchain transacting environment 100, direct communications and/or transfers may occur between a UNode and an INode, even where, in a particular scenario, the given UNode does not hold an account with the INode. Taking the example above wherein a payer UNode (e.g., a token based card holder) seeks a refund of credit tokens from the payee UNode (e.g., a merchant), the payee UNode may transfer credit tokens directly to the payer UNode's financial institution (i.e., the "issuing bank") by transferring credit tokens from the payee's UNode directly to the INode with whom the payer UNode holds an account. Following the transfer, the receiving INode may replenish the payer UNode's account with the amount of credit tokens received from the payee INode, or alternatively the receiving INode may refund the credit tokens directly into the Unode's wallet.

Moreover, a UNode with credit token holdings utilize credit tokens with great flexibility. A UNode may easily exchange credit tokens for fiat currency, at a predetermined exchange rate, with the INode that minted and issued the credit tokens (or another INode who has agreed to do so) for a variety of reasons. For example, in the case where an INode deposits a number of credit tokens into a UNode's digital wallet based on the credit limit for which the UNode applied for and qualified with the INode (e.g., based on creditworthiness or some other factors), the UNode may thereafter exchange such credit tokens for fiat currency with the INode, thereby taking a cash advance utilizing the credit tokens. In such an example, the INode may charge a higher interest rate for credit tokens used for a cash advance than those used for a standard purchase. In another example, in the case where an INode deposits a number of credit tokens into a UNode's digital wallet in exchange for an amount of fiat currency from the UNode (i.e., where the entity associated with the UNode purchases credit tokens from the entity associated with the INode), the UNode can similarly cash out any unused credit tokens that it originally bought from the INode (e.g., the issuing bank). In other examples, a UNode may utilize the credit tokens to pay off any principal or interest payments in connection with one or more of its accounts with an INode.

As noted, on account of the flexibility provided by using the credit tokens of the present disclosure in a blockchain transacting environment such as blockchain transacting environment 100, direct communications and/or transfers may occur between any two or more INodes within the blockchain transacting environment, between any two or more UNodes within the blockchain transacting environment, and/or between any one or more UNodes and any one or more INodes within the blockchain transacting environment (even where, in a particular scenario, the given UNode does not hold an account with the INode)

Consequently, within the blockchain transacting environment, a token based cardholder associated with a UNode may pay a merchant (or other token based cardholder) associated with a UNode in credit tokens. The payee UNode (e.g., the merchant) can send the credit tokens it received from the payer UNode (e.g., the token based cardholder)

directly to the INode associated with the financial institution that issued the credit tokens to the payer UNode (i.e., the issuing bank). The INode can then send fiat currency directly to the INode associated with the payee UNode's bank account (which in some embodiments may be associated with the same financial institution as the payer UNode, or which may be associated with a different financial institution altogether) who may then either deposit fiat funds corresponding to the amount of credit tokens received into the payee UNode's bank account or, as may be desired in some cases, deposit an amount of credit tokens into the digital wallet of the payee UNode (such tokens may be the same tokens received, or may be freshly minted tokens of any type (e.g., entity agnostic, entity specific, etc.). This scenario provides enhanced benefits for use of token based payment cards domestically (i.e., within the same country in which the token based payment card was issued).

Alternatively, the payee UNode can also send received credit tokens to the INode associated with its own bank account, and such INode can then send different credit tokens to the INode associated with the financial institution who minted the credit tokens, and collect fiat currency from such INodes in exchange for such credit tokens, and then distribute the fiat currency into to payee UNode's account. This scenario may be more useful in scenarios where credit tokens are entity-specific (e.g., a Chase bank credit token, a Well Fargo credit token, etc.) rather than generic. This scenario provides enhanced benefits for use of token based payment cards in foreign countries (i.e., for transactions in a different country than the country within which the token based payment card was issued).

Moreover, in all such scenarios, if the device serving the UNode (and therefore a digital wallet) is lost or stolen, the technology of the present disclosure allows for prompt restoration of the digital wallets upon replacement of the device serving the UNode. This is made possible because (1) the UNode's bank (i.e., the financial institution associated with the INode where the UNode holds an account) carries the balance and the transaction history is apparent from the blockchain hosted in whole or in part by the INode, and (2) the UNode's bank (i.e., the financial institution associated with the INode where the UNode holds an account) is configured with the ability to mint, issue, and burn tokens. Thus, upon verifying the lost/stolen nature of a particular digital wallet, the issuing bank (via its INode) may burn the "lost" credit tokens and/or debit tokens, mint new replacement credit tokens and/or debit tokens, and issue the same to the entity associated with the UNode by filling the UNode's digital wallet with the replacement credit tokens and/or debit tokens.

Moreover, in some embodiments, the digital wallets hosted on UNodes (and/or INodes) within the blockchain transacting environment and/or the electronic token based payment cards issued by INodes for transacting within the blockchain transacting environment, may be configured to have no expiration date (i.e., being perpetually active).

These features, among others, provide a more efficient mechanism for money transfers that incur fewer fees and require fewer parties than traditional transaction platforms, the same being particularly useful in the context of domestic payment card based transactions, as well as in foreign payment card based transactions.

In some embodiments, in addition to the aforementioned features of UNodes and INodes, in some embodiments, (i) a UNode may optionally include any one or more of the features, components, and capabilities of a UNode 500 described in U.S. application Ser. No. 16/820,661, which is incorporated herein by reference in its entirety, and/or (ii) INode may optionally include any one or more of the features, components, and capabilities of an INode 200 described in U.S. application Ser. No. 16/820,661, which is incorporated herein by reference in its entirety.

In addition to the aforementioned features of the nodes and blockchains of the illustrated examples, the blockchain validating the transactions contemplated herein may optionally be distributed among the INodes and/or UNodes as described in U.S. application Ser. No. 16/820,661, which is incorporated herein by reference in its entirety.

FIG. 2B is a diagram illustrating another example blockchain transacting environment 102 in which one or more embodiments of the present disclosure may be implemented. The example blockchain transacting environment 102 of FIG. 2B is similar to the example blockchain transacting environment 100 of FIG. 2A (with like numerals denoting like elements), except that in the blockchain transacting environment 102 of FIG. 2B, INode_A 210 and INode_B 220 do not host separate blockchains (e.g., Blockchain A and Blockchain B of FIG. 2A), but instead host one or more portions of the same blockchain—blockchain AB. In the example blockchain transacting environment 102 of FIG. 2B, INode_A 210 and INode_B 220 have formed an INode Consortium 201 such that—for purposes of validation, processing, and recording—the consortium of INodes may operate in concert with one another, building upon and utilizing the same blockchain (and sharing the benefit of each other's resources, such as external resources 214, 224, with one another) to increase efficiency.

Figure 2C:
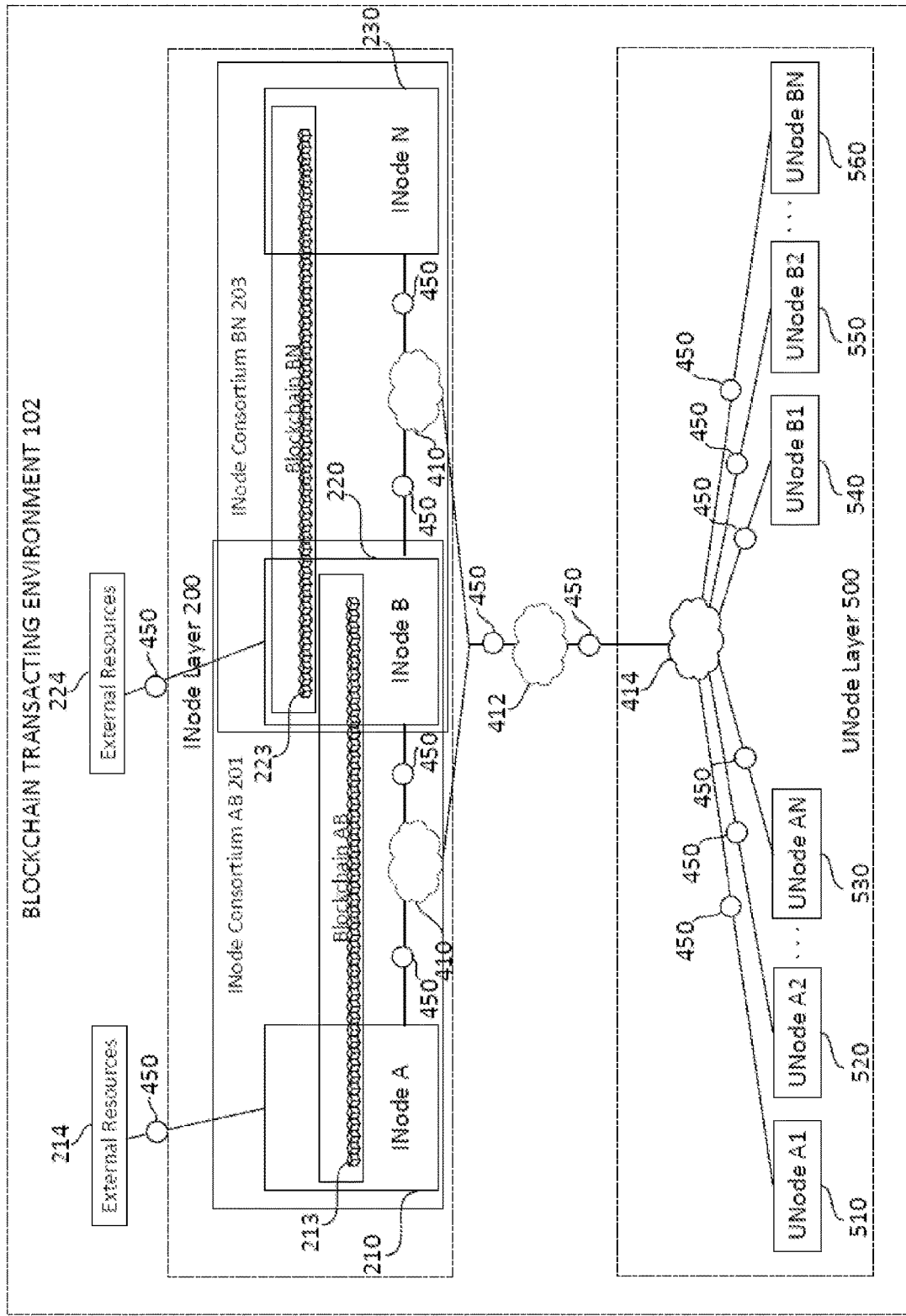
FIG. 2C illustrates an example blockchain transacting environment, including multiple INode consortiums, in which one or more embodiments of the present disclosure may be implemented. In some embodiments illustrated in FIG. 2C, some INode(s) may be part of the same and/or different INode Consortiums as other INode(s).

Although not depicted in FIGS. 2A-2B, INode Layer 200 may include any "N" number of INodes (depicted in FIG. 2C). Referring to FIG. 2B, INode Consortium AB 201 may be made up of any two or more INodes participating within the blockchain transacting environment. The two or more INodes may together host a shared blockchain. In addition to hosting a shared blockchain such as blockchain AB 213 in FIG. 2B, individual INodes of a consortium may also, optionally, host their own individual blockchains. Further still, an INode may be part of multiple consortiums within the same blockchain transacting environment 102.

FIG. 2C is a diagram illustrating the example blockchain transacting environment 102, but in this depiction including two consortiums formed between two subsets of three INodes. As shown, INode A 210 and INode B 220 belong to INode Consortium AB 201. Similarly, INode B 220 and INode N 230 belong to INode Consortium BN 203. As shown, INode B belongs to two distinct INode consortiums—INode Consortium AB 201 and INode Consortium BN 203. It should be appreciated based on FIGS. 2A-2C and the description herein, that any given INode operating within blockchain transacting environment 100 and/or 102 may belong to one consortium, multiple consortiums, or no consortium at all.

Figure 2D:
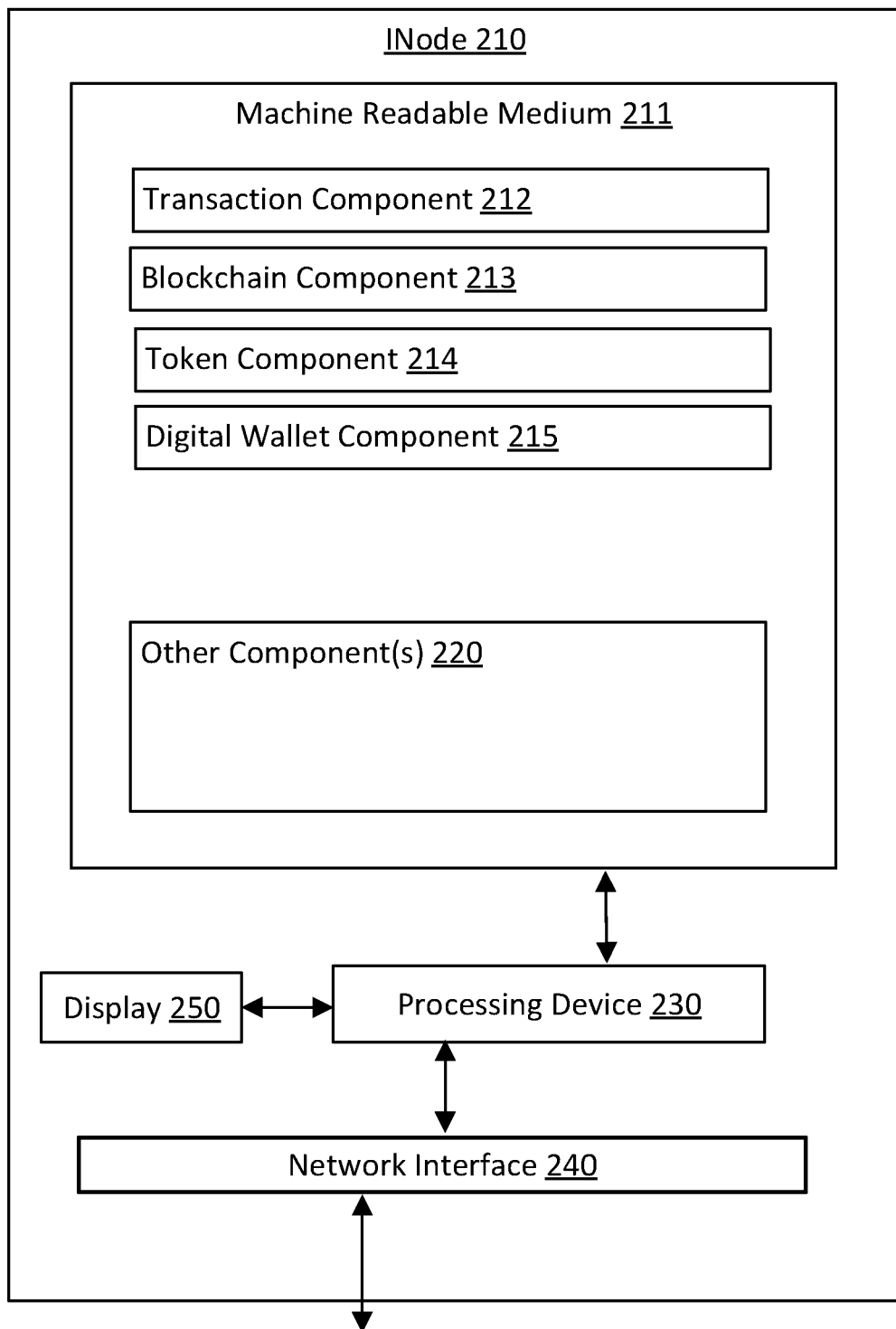
FIG. 2D illustrates an example architecture of components of an INode in accordance with one or more embodiments of the present disclosure.

FIG. 2D illustrates an example architecture of various components of an individual INode (e.g., INode 210) in accordance with one or more embodiments of the present disclosure. In some embodiments, INode 210 may include a machine readable medium 211 having instructions stored thereon, which, when executed by one or more processors, cause one or more of the disclosed features to be effectuated. The machine readable medium may have machine readable code comprising a transaction component 212, blockchain component 213, token component 214, digital wallet component 215, and/or one or more other component(s) 220 configured to provide other INode functionalities described herein.

Transaction component 212 may be configured to obtain one or more transaction details in connection with a proposed transaction (e.g., a token based payment card based transaction), and cause (alone or together with blockchain component 213), the proposed transaction to be validated utilizing a blockchain hosted in whole or in part by the INode 210 (or by an INode consortium of which INode 210 may be a part).

Blockchain component 213 may be configured to validate, process, and/or record (alone or together with transaction component 212) a proposed transaction based on account balance information held in the blockchain in connection with one or more participants to the proposed transaction.

Blockchain component 213 may (alone or together any other INode component and/or UNode component) be configured to authenticate a user using stored or otherwise accessible authentication information (e.g., biometric information, PIN numbers, Wallet ID). Blockchain component 213 may (alone or together any other INode component and/or UNode component) be configured to receive, collect, store, compare, and/or distribute biometric information (e.g., fingerprint information, retinal information, facial feature information, voice information, other biometric features) for one or more users to enable verification comparisons to enable such authentication. In such embodiments, authentication information may enhance privacy and detect/prevent attempted fraudulent activity. It should be noted that biometrics information for network participants may be stored (i) directly within the blockchain such that authentication initiated by blockchain component 213 (or another INode component and/or UNode component) may be performed by and/or based on the information stored in the blockchain, and/or (ii) locally within an INode such that authentication initiated by blockchain component 213 (or another INode component and/or UNode component) may be performed by and/or based on the information stored in the INode (iii) locally within a UNode such that authentication initiated by blockchain component 213 (or another INode component and/or UNode component) may be performed by and/or based on the information stored in the UNode.

Blockchain component 213 may be further configured to host and/or add blocks to a blockchain maintaining (i) a record of one or more transactions validated and/or processed by the blockchain and/or completed by the associated parties to such transactions, and/or (ii) corresponding account balances of one or more parties to such transactions. In some embodiments, blockchain component 213 may be configured to build and/or host its own blockchain (e.g., a private blockchain holding a record of transactions and account balances of the members of the bank associated with the INode). In some embodiments, blockchain component 213 may be configured to build and/or host a blockchain together with a number of other INodes whose associated banking institutions have formed a bank consortium (aka an INode consortium) to enable extended validation, processing, and recording capabilities for a greater number of transactions (e.g., a private blockchain distributed across any number of INode computing devices of banking institutions within the consortium, where the private blockchain holds a record of transactions and account balances of the members of each of the banking institutions within the consortium) between a greater number of participants. In some embodiments, blockchain component 213 may be configured to build and/or host its own blockchain for one purpose, and may also be configured to build and/or host a blockchain together with a number of other INodes whose associated banking institutions have formed a bank consortium for another purpose.

In some embodiments, even where an INode is only responsible for hosting a portion of a blockchain hosted in its entirety by an INode consortium, one or more (or all) of the INodes in an INode consortium may maintain a copy of the entire blockchain (which may be updated on a periodic or continuous basis). In this way, and as explained further herein, a proposed transaction (involving a cardholder that is an account holding member with at least one banking institution that is a member of the consortium) may be validated, processed, and/or recorded by the blockchain hosted in whole or in part by any INode within the consortium, not just the INode corresponding to the banking institution with whom the cardholder holds a bank account.

Token Component 214 may be configured to monitor and/or manage blockchain based tokens of any type (e.g., credit tokens, debit tokens, gift tokens, check tokens, hybrid tokens, etc.), including one or more of: storing tokens, minting new tokens, burning previously minted tokens, restoring lost tokens, locking tokens, depositing tokens into one or more digital wallets, withdrawing tokens from one or more digital wallets, receiving a transfer of tokens, associating tokens with a blockchain based payment card, associating tokens with a deposit account, associating tokens with a credit line, configuring tokens with one or more features (e.g., limitations on how or when such tokens may be used (for spending, cashing out, balance transfers, cash advances, etc.), interest rates applicable to such tokens depending on such uses and when such uses occur, etc.), performing any of the foregoing on behalf of another network participant (e.g., a UNode, and INode, etc.), and/or otherwise managing and/or monitor blockchain based tokens.

For example, a network participant associated with a UNode may wish to wire cash (fiat currency) into an INode controlled account in exchange for the INode minting and depositing a number of debit tokens into the digital wallet of the given UNode (at a predetermined rate of exchange, e.g., 1 coin deposited for each $1 USD wired). In another example, a network participant associated with a UNode may apply to open a credit line with a bank associated with an INode, and upon approval of, e.g., a 1000 token credit line, INode may mint and deposit a number of credit tokens into the digital wallet of the given UNode (at a predetermined rate of exchange, e.g., 1 coin deposited for each $1 USD wired). In another example, a network participant associated with a UNode may wish to receive a cash wire (of fiat currency) from an INode controlled account in exchange for releasing to the INode a number of tokens that the UNode has acquired and/or otherwise secured in their digital wallet (again, at the predetermined rate of exchange, e.g., 1 coin deposited for each $1 USD wired). Token component 214 facilitates the foregoing, among many other processes as will be appreciated from the present disclosure, alone or together with one or more components of INode 210 (e.g., digital wallet component 215), and/or one or more components of appropriate UNodes.

Digital wallet component 215 may be configured to host one or more digital wallets linked to one or more accounts of the bank associated with INode 210. Additionally, although unnecessary in many embodiments where individual UNodes host their own digital wallets, digital wallet component 215 may be also configured to host one or more digital wallets of UNodes of network participant's that have accounts with the bank associated with INode 210. In embodiments where digital wallet component 215 is configured to host one or more digital wallets of a UNode, the digital wallet component 215 may be further configured to provide or otherwise cause such information to be displayed or made available in some form on a display of the corresponding UNode. Indeed, in some embodiments, the UNode may have a mobile app or desktop app provides an interactive view of the digital wallet and can be used by the UNode in similar fashion as though the UNode were hosting the digital wallet itself. When token movements occur in such scenarios, however, the INode 210 will ultimately instigate and facilitate the movement of tokens between wallets on the back-end (instead of the UNode instigating and facilitating the movement of tokens between wallets on the client side, which occurs when the UNode hosts its own digital wallet instead of or in addition to the INode).

Digital wallet component 215 may be configured to (alone or together with one or more components of INode 210 and/or one or more components of appropriate UNodes) move tokens and/or fiat currency between digital wallets and linked accounts pursuant to proposed transactions or requested exchanges. For example, digital wallet may be configured to effectuate a release or transfer of tokens from one digital wallet into another digital wallet, effectuating an exchange of tokens for cash, effectuating deposits, withdrawals, and so on in connection with digital wallets and/or the accounts linked thereto (e.g., deposit accounts, credit accounts, check accounts, etc.).

In some embodiments, a digital wallet on an INode and/or a UNode may comprise a mobile (e.g., iOS or Android based) or desktop (e.g., PC or Mac based) app that stores one or more token based payment cards (token based credit cards, token based debit cards, token based check cards, token based gift cards). Token based payment cards may (i) be linked to accounts held at different issuing banks (ii) comprise or have access to one or more entity-specific or entity-agnostic tokens of any type (credit, debit, check, gift, hybrid, etc.) with any currency designation (US, European, Chinese, Canadian, etc.). A digital wallet stores the various tokens it receives from other digital wallets (e.g., facilitated by respective digital wallet components) and may be utilized to pay or otherwise transfer tokens to other network participants (including other banks such as issuing banks) A digital wallet component may be configured to operate a digital wallet application configured to store, pay and/or receive different digital currencies issued by various central banks, and further to store a user identification object (e.g., a photo, a name, an avatar, a thumbnail, or other user ID object associated with the owner of the digital wallet), a wallet address (sometimes referred to herein as a Wallet ID). The digital wallet application may, as described further herein, intelligently select the best payment method (e.g., select among a plurality of optional token based payment cards and/or fiat based payment cards) for a given transaction. A digital wallet can further be configured to receive receipts, enter data, provide confirmations (e.g., signatures), scan codes, and/or receive feedbacks as to whether or not a payment for a proposed transaction was successful or failed.

Digital wallet component 215 may (alone or together any other INode component and/or UNode component) be configured to authenticate a user using stored or otherwise accessible authentication information (e.g., biometric information, PIN numbers, Wallet ID). Digital wallet component 215 may (alone or together any other INode component and/or UNode component) be configured to receive, collect, store, compare, and/or distribute biometric information (e.g., fingerprint information, retinal information, facial feature information, voice information, other biometric features) for one or more users to enable verification comparisons to enable such authentication. In such embodiments, authentication information may enhance privacy and detect/prevent attempted fraudulent activity. It should be noted that biometrics information for network participants may be stored (i) directly within the blockchain such that authentication initiated by digital wallet component 215 (or another INode component and/or UNode component) may be performed by and/or based on the information stored in the blockchain, and/or (ii) locally within an INode such that authentication initiated by digital wallet component 215 (or another INode component and/or UNode component) may be performed by and/or based on the information stored in the INode (iii) locally within a UNode such that authentication initiated by digital wallet component 215 (or another INode component and/or UNode component) may be performed by and/or based on the information stored in the UNode.

In some embodiments, digital wallet component 215 may further be configured to facilitate back-up (e.g., periodic back-up, on demand back-up, or one-time back-up) for later restoration of such digital wallet by the associated network participant as needed (e.g., if the given network loses their smartphone hosting the digital wallet app (e.g., loses their UNode)).

Other component(s) 215 of INode 210 may be configured to implement various other features desirable in the given environment. For example, in some contexts it will be desirable for the INode to communicate to relevant UNodes various updates concerning completion of a transaction or other metrics associated with a given transaction. For example, INode 200 may communicate and/or facilitate updates to the token or fiat balances in respective digital wallets during or after a transaction has been completed, or communicate and/or facilitate transaction details and/or statistics for/to each UNode that participated in a particular transaction. For example, the reward points earned based on the transaction, the status of the validation, processing, and/or recording of the transaction, INode 200 may communicate (to UNodes that are parties to a certain transaction) the date/time the transaction was completed, etc.

In some embodiments, though not required in any given implementation, an INode of the present disclosure may include any one or more features disclosed herein, be configured to cause the execution of any one or more features disclosed herein, and/or be configured with any one or more of the features and functionality discussed with respect to INodes in U.S. application Ser. Nos. 16/820,661 and 16/388,237, which are incorporated herein by reference in their entirety.

Figure 2E:
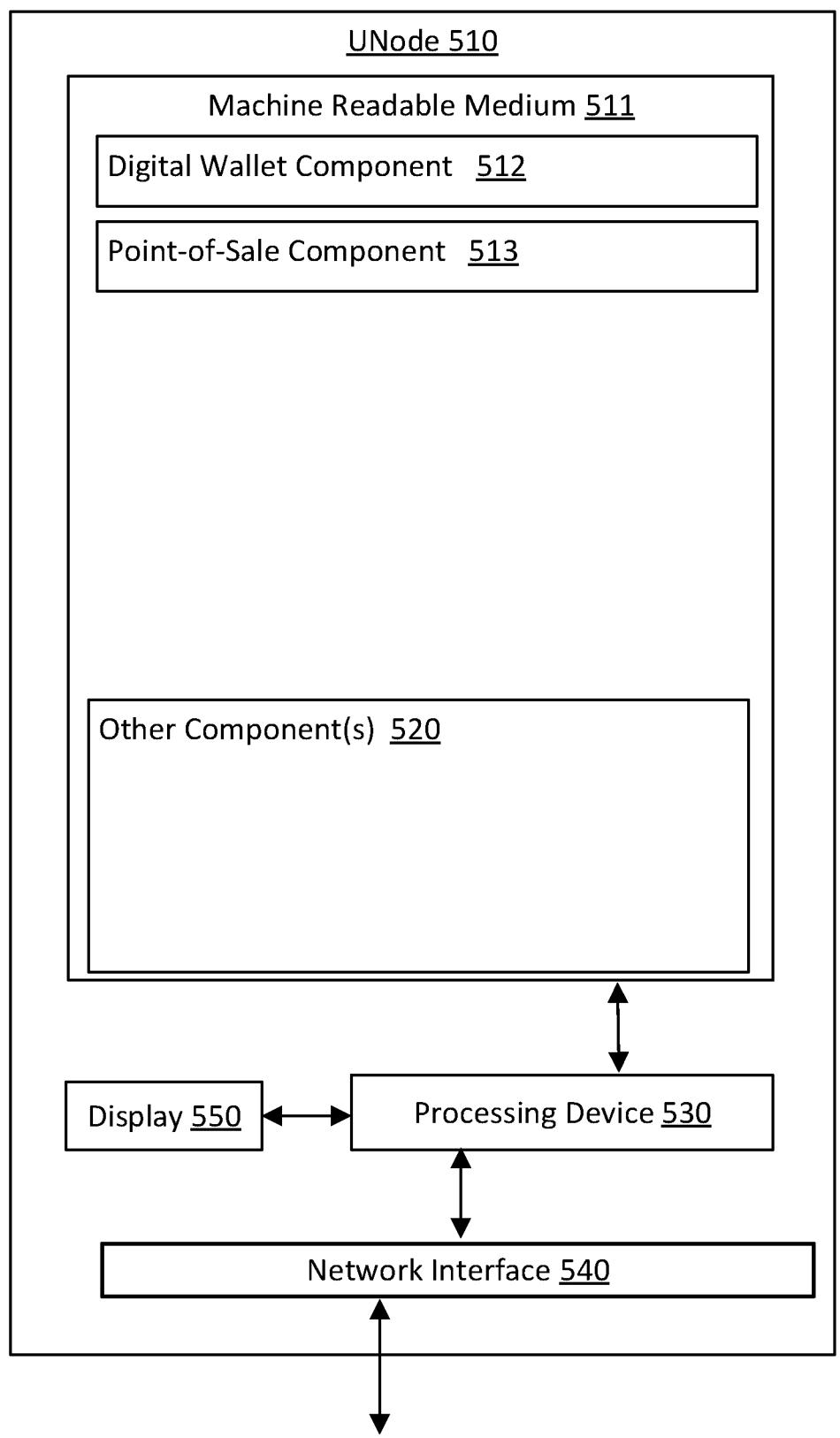
FIG. 2E illustrates an example architecture of components of a UNode in accordance with one or more embodiments of the present disclosure.

FIG. 2E illustrates an example architecture of components of a UNode in accordance with one or more embodiments of the present disclosure. Example UNode 510 may include a machine readable medium 511 having instructions stored thereon, which, when executed by one or more processors, cause one or more of the disclosed features to be effectuated. The machine readable medium may have machine readable code comprising a digital wallet component 512, a Point-of-Sale component 513, and one or more other component(s) 520 configured to provide other UNode functionalities described herein.

Digital wallet component 512 may be configured to maintains and secures, alone or in coordination with other resources within blockchain transaction environment 100, a digital wallet owned by the network participant and associated with the given UNode. The digital wallet may include a network participant's token holdings (which may, in some instances, have been sourced from token based loans).

Digital wallet component 512 can be configured to provide management functionality, alone or in coordination with other resources within blockchain networking environment 100, such as transferring, converting, sending, receiving, releasing, exchanging, depositing, withdrawing, moving, securing or otherwise operating on cryptocurrency funds and/or fiat funds upon request. For example, digital wallet component 512 may be configured to (alone or together with one or more components of UNode 510 and/or one or more components of an associated INode) transfer tokens from the digital wallet of UNode 510 into a digital wallet of another UNode as part of a transaction, and/or receive tokens into the digital wallet of UNode 510 from another UNode's digital wallet as part of a transaction, and/or redeem tokens for cash with appropriate INodes, and/or receive tokens from appropriate INodes in exchange for cash and/or as part of a token based credit line (which may, in some embodiments, be connected to a token based loan, as described in U.S. application Ser. No. 16/820,661, which is incorporated by reference herein in its entirety). A digital wallet hosted by digital wallet component 512 of a Unode 510 may be configured to effectuate a release or transfer of tokens into another digital wallet, effectuate an exchange of tokens for cash, effectuate an exchange of cash for tokens, effectuate a deposit of tokens, effectuate a withdrawal of tokens, and so on in connection with one or more digital wallets and/or the accounts linked thereto (e.g., deposit accounts, credit accounts, check accounts, etc.).

In some embodiments, a digital wallet may comprise a mobile (e.g., iOS or Android based) or desktop (e.g., PC or Mac based) app that stores one or more token based payment cards (token based credit cards, token based debit cards, token based check cards, token based gift cards). Token based payment cards may (i) be linked to accounts held at different issuing banks (ii) comprise or have access to one or more entity-specific or entity-agnostic tokens of any type (credit, debit, check, gift, hybrid, etc.) with any currency designation (US, European, Chinese, Canadian, etc.). A digital wallet stores the various tokens it receives from other digital wallets (e.g., facilitated by respective digital wallet components) and may be utilized to pay or otherwise transfer tokens to other network participants (including other banks such as issuing banks) A digital wallet component 512 may be configured to operate a digital wallet application configured to store, pay and/or receive different digital currencies issued by various central banks, and further to store a user identification object (e.g., a photo, a name, an avatar, a thumbnail, or other user ID object associated with the owner of the digital wallet), a wallet address (sometimes referred to herein as a Wallet ID). The digital wallet application may, as described further herein, intelligently select the best payment method (e.g., select among a plurality of optional token based payment cards and/or fiat based payment cards) for a given transaction. A digital wallet can further be configured to receive receipts, enter data, provide confirmations (e.g., signatures), scan or sync codes, and/or receive feedbacks as to whether or not a payment for a proposed transaction was successful or failed.

Digital wallet component 512 may (alone or together any other INode component and/or UNode component) be configured to authenticate a user using stored or otherwise accessible authentication information (e.g., biometric information, PIN numbers, Wallet ID). Digital wallet component 512 may (alone or together any other INode component and/or UNode component) be configured to confirm a transaction using stored or otherwise accessible authentication information (e.g., biometric information, PIN numbers, Wallet ID). Digital wallet component 512 may (alone or together any other INode component and/or UNode component) be configured to scan, read, receive, collect, store, compare, and/or distribute biometric information (e.g., fingerprint information, retinal information, facial feature information, voice information, other biometric features) for one or more users to enable verification comparisons to enable such authentication. In such embodiments, authentication information may enhance privacy and detect/prevent attempted fraudulent activity. It should be noted that biometrics information for network participants may be stored (i) directly within the blockchain such that authentication initiated by digital wallet component 512 (or another INode component and/or UNode component) may be performed by and/or based on the information stored in the blockchain, and/or (ii) locally within an INode such that authentication initiated by digital wallet component 512 (or another INode component and/or UNode component) may be performed by and/or based on the information stored in the INode (iii) locally within a UNode such that authentication initiated by digital wallet component 512 (or another INode component and/or UNode component) may be performed by and/or based on the information stored in the UNode.

Digital wallet component 512 may be configured to include or be operatively coupled with Bluetooth® or other TOT communication capabilities to enable syncing with or otherwise reading information from other digital wallets held in other UNodes and/or INodes of a blockchain transacting network.

Digital wallet component 512 may be configured to execute code to lock tokens, or allow an associated INode to lock tokens, in an amount sufficient to support a proposed transaction, etc. In some embodiments, digital wallet component 512 may further be configured to execute code that causes the system to refund, release, receive, transfer, lock, and/or send an amount of tokens to another network participant's digital wallet. In some embodiments, digital wallet component 512 may further be configured to execute code to provide balance reporting after one or more transactions has occurred involving tokens managed by the digital wallet component 512, which may be accessible or viewable via a user device or other device within the blockchain networking environment. In some embodiments, digital wallet component 512 may further be configured to facilitate back-up (e.g., periodic back-up, on demand back-up, or one-time back-up) for later restoration by the associated network participant as needed (e.g., if the given network loses their smartphone hosting the digital wallet app (e.g., loses their UNode)).

In some embodiments, though not required in any given implementation, a UNode of the present disclosure may include any one or more features disclosed herein, be configured to cause the execution of any one or more features disclosed herein, and/or be configured with any one or more of the features and functionality discussed with respect to UNodes in U.S. application Ser. Nos. 16/820,661 and 16/388,237, which are incorporated herein by reference in their entirety.

Point-of-Sale component 513 may be configured to provide all or part of the point of sale interactions and information acquisition necessary for a token based cardholder to accomplish a transaction using tokens in his/her digital wallet as a medium. For example, in a payee initiated transaction (discussed further herein), the payee's POS component 513 may be configured to obtain token based payment card details from a prospective payer to initiate such a transaction. In some embodiments, POS component 513 may be communicatively coupled with a separate/standalone POS device, e.g., a physical credit card reader, a handheld code scanner, a chip reader, a Bluetooth® enabled reader, an RFID enabled reader, or any distinct IOT communications device) and may obtain needed transaction details (e.g., the payer's digital wallet ID, amount of the transaction, goods sought to be purchased, etc.) from such separate standalone POS device to initiate a transaction. In some embodiments, POS component 513 may further be configured to scan, receive, collect, store, compare, and/or distribute biometric information (e.g., fingerprint information, retinal information, facial feature information, voice information, other biometric features) associated with the payee and/or payer to authenticate the parties to the proposed transaction. The POS component 513 may further be configured to scan, receive, or otherwise obtain payee and/or payer biometrics to provide confirmation (e.g., in lieu of a written signature) for any given transaction. for one or more users to enable verification comparisons to enable such authentication. In some embodiments, POS component 513 may embody or be configured to enable the UNode or components thereof to operate as an integrated POS device to obtain needed token based payment card details (e.g., the payer's digital wallet ID, etc.). For example, POS component 513 may engage a camera or other image scanner (on the device hosting the payee's UNode) to scan a barcode, QR code, serial number, Wallet ID number and/or any other number or code from which it may obtain the needed transaction details. In the foregoing examples, a digital wallet hosted by the payer's UNode may be utilized to generate and/or provide a scannable, readable, or otherwise receivable code for the payee to scan, read, or otherwise receive for purposes of initiating a proposed transaction. For brevity and simplicity of the disclosure herein, use of the term POS device should be understood to refer to either and both a separate/standalone POS device and/or an integrated POS device.

In a payer initiated transaction (discussed further herein), the payer's POS component 513 may be configured to obtain needed transaction details from a prospective payee (e.g., a merchant) to initiate such a transaction on behalf of the merchant. In some embodiments, POS component 513 of a payer's UNode may (alone or together with digital wallet component 512) may engage a camera or other image scanner (on the device hosting the payer's UNode) to scan a barcode, QR code, serial number, Wallet ID number, or any other number or code from which it may obtain the needed transaction details (e.g., the Wallet ID number where tokens should be sent, the amount of tokens to be sent, etc.). In the foregoing examples, a digital wallet hosted by the payee's UNode may be utilized to generate and/or provide a scannable, readable, or otherwise receivable code for the payer to scan, read, or otherwise receive for purposes of initiating a proposed transaction. The codes generated by the payee are often referred to herein as transaction codes.

POS component 513 may (alone or together any other INode component and/or UNode component) be configured to authenticate a user using stored or otherwise accessible authentication information (e.g., biometric information, PIN numbers, Wallet ID). POS component 513 may (alone or together with any other INode component and/or UNode component) be configured to confirm a transaction using stored or otherwise accessible authentication information (e.g., biometric information, PIN numbers, Wallet ID). POS component 513 may (alone or together with any other INode component and/or UNode component) be configured to scan, read, receive, collect, store, compare, and/or distribute biometric information (e.g., fingerprint information, retinal information, facial feature information, voice information, other biometric features) for one or more users to enable verification comparisons to enable such authentication. In such embodiments, authentication information may enhance privacy and detect/prevent attempted fraudulent activity. It should be noted that biometrics information for network participants may be stored (i) directly within the blockchain such that authentication initiated by POS component 513 (or another INode component and/or UNode component) may be performed by and/or based on the information stored in the blockchain, and/or (ii) locally within an INode such that authentication initiated by POS component 513 (or another INode component and/or UNode component) may be performed by and/or based on the information stored in the INode (iii) locally within a UNode such that authentication initiated by POS component 513 (or another INode component and/or UNode component) may be performed by and/or based on the information stored in the UNode.

In some embodiments, the payer's UNode and/or the payee's UNode may obtain the needed transaction details, wallet ID, user profile information, and/or any other desired and permitted information via a communication occurring over a Bluetooth®, Zigbee®, Wi-Fi®, RFID, cellular (2G, 3G, 4G, 5G, etc.), or any other communication protocol or Internet of Things ("IOT") mechanism. Moreover, in some embodiments, the payer's UNode and/or the payee's UNode may utilize any one or more such protocols or connections to synchronize with each other, including for purposes of reflecting updated token balances, reflecting transaction details in respective digital wallets, sharing or confirming validation/processing/recording responses received from a corresponding blockchain with one another, sharing or confirming any other relevant information regarding a given transaction with which both payer and payee were involved (e.g., the date/time the transaction was complete, the amount and/or types of tokens transferred pursuant to such transactions, etc.).

Figure 3A:
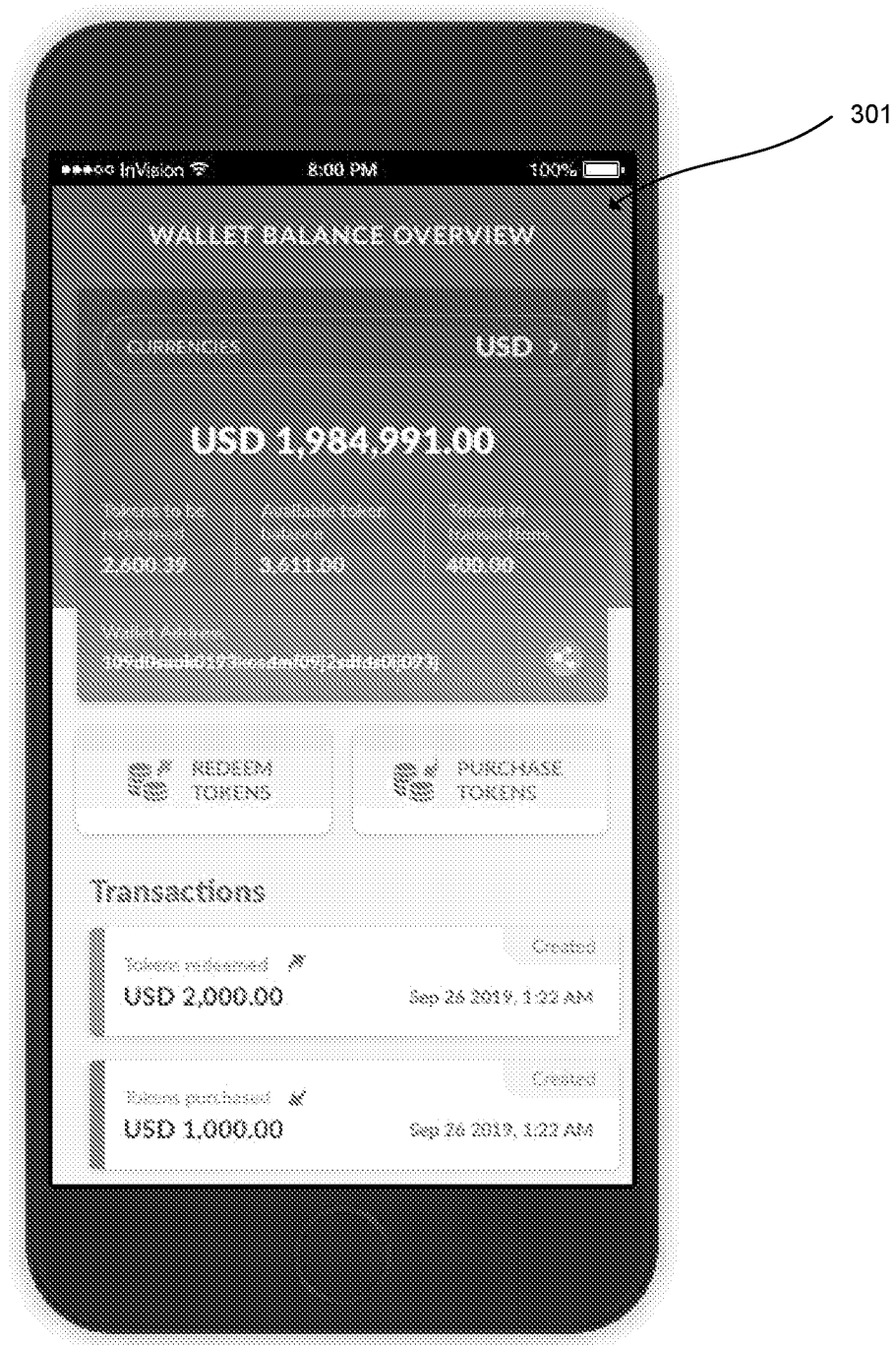
FIG. 3A illustrates an example interactive interface of an example mobile application based digital wallet, as may be presented via a display of a node (e.g., a UNode), in accordance with one or more embodiments of the present disclosure.

FIG. 3A illustrates an example interactive interface of an example mobile application based digital wallet, as may be presented via a display of a node (e.g., a UNode), in accordance with one or more embodiments of the present disclosure. As shown, in some embodiments a digital wallet application may include a wallet balance overview page 301 presenting for display a user's current token balance, a user's current fiat balance, amount of tokens to be redeemed, amounts of tokens involved in pending transactions, amount of tokens available for use through the digital wallet, the user's wallet address (also referred to herein as the digital wallet ID), and a snapshot of recent transactions including exchanges between the user and the issuing bank in connection with exchanging tokens for fiat currency and purchasing tokens with fiat currency. As may be further seen, such an example wallet balance overview page may provide interactive options wherein a user may select one or more buttons to engage one or more functions available through their digital wallet application. For example a user may select the "Redeem tokens" button to exchange tokens for fiat currency. Similarly, a user may select the "Purchase tokens" button to change fiat currency or tokens.

Figure 3B:
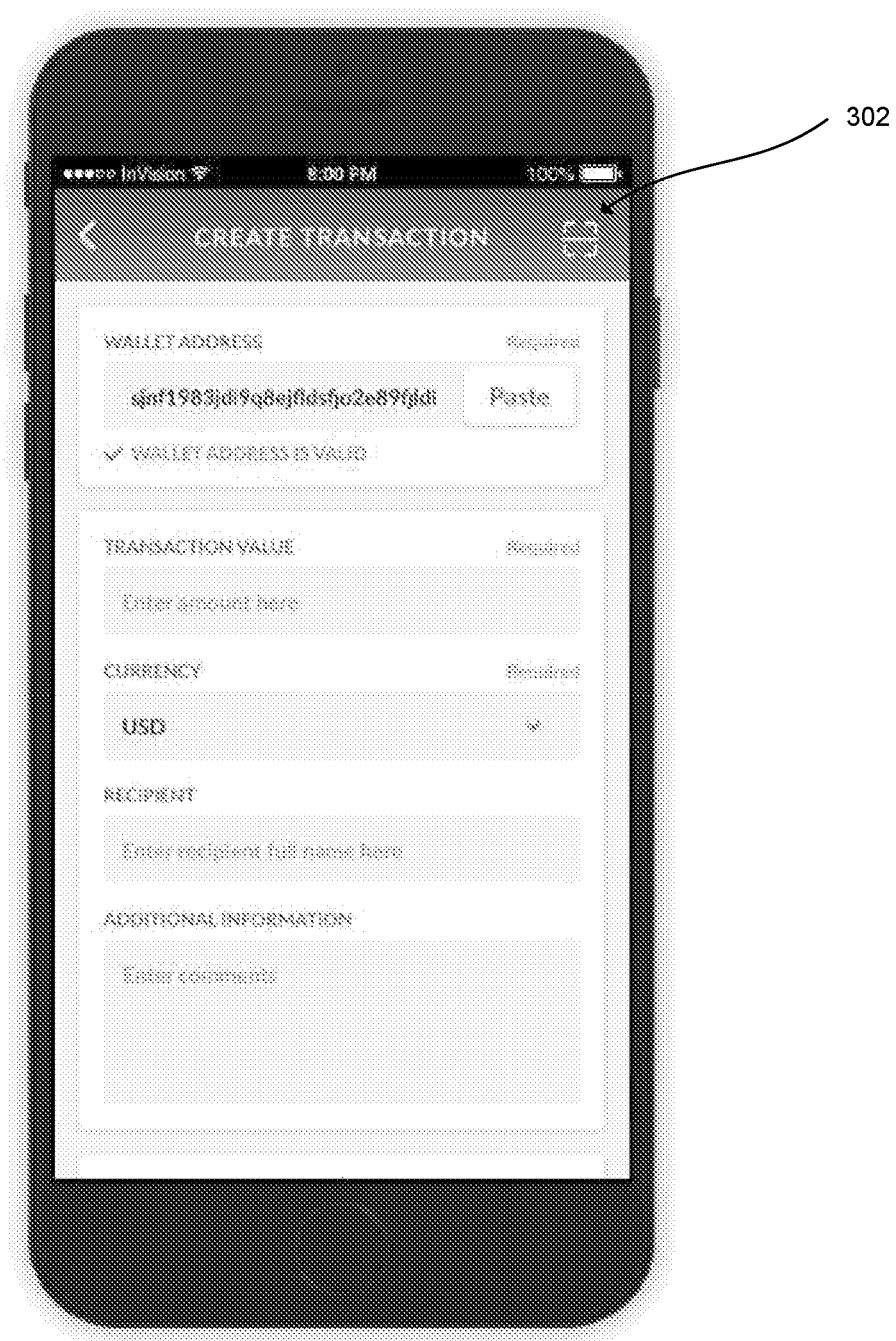
FIG. 3B illustrates another example interactive interface of an example mobile application based digital wallet, as may be presented via a display of a node (e.g., a UNode), in accordance with one or more embodiments of the present disclosure.

FIG. 3B illustrates another example interactive interface of an example mobile application based digital wallet, as may be presented via a display of a node (e.g., a UNode), in accordance with one or more embodiments of the present disclosure. As shown, in some embodiments a digital wallet application may include a create transaction page 302 presenting the user with one or more fields wherein the user may enter details for a given transaction. As shown, the create transaction page 302 may include a wallet address field wherein a user may enter the wallet ID of the person or entity they wish to send tokens as payment for goods, services, or other offerings. A user may enter the appropriate wallet ID manually, or may utilize POS component 513 to obtain the wallet ID from the other party to the proposed transaction, including by any mechanism referred to herein (e.g., scanning a QR code, receiving payment card details transmitted between payer and payee UNode devices over any communication protocol (e.g., Bluetooth®), or through any TOT mechanism, etc.). As further shown, the user may enter into appropriate fields the transaction value, the type of currency associated with the tokens to be sent, the recipient's name, and any other additional information. Similarly, as will be appreciated upon review of the present disclosure, the user may also utilize POS component 513 to obtain one or more such details from the other party to the proposed transaction including by any mechanism referred to herein (e.g., scanning a QR code, receiving payment card details transmitted between payer and payee UNode devices over any communication protocol (e.g., Bluetooth®), or through any TOT mechanism, etc.). For example, upon a payer's scanning of a transaction code presented by the payee, the wallet address, transaction value, currency, recipient name, and other additional information may be prefilled within the create transaction page.

Figure 3C:
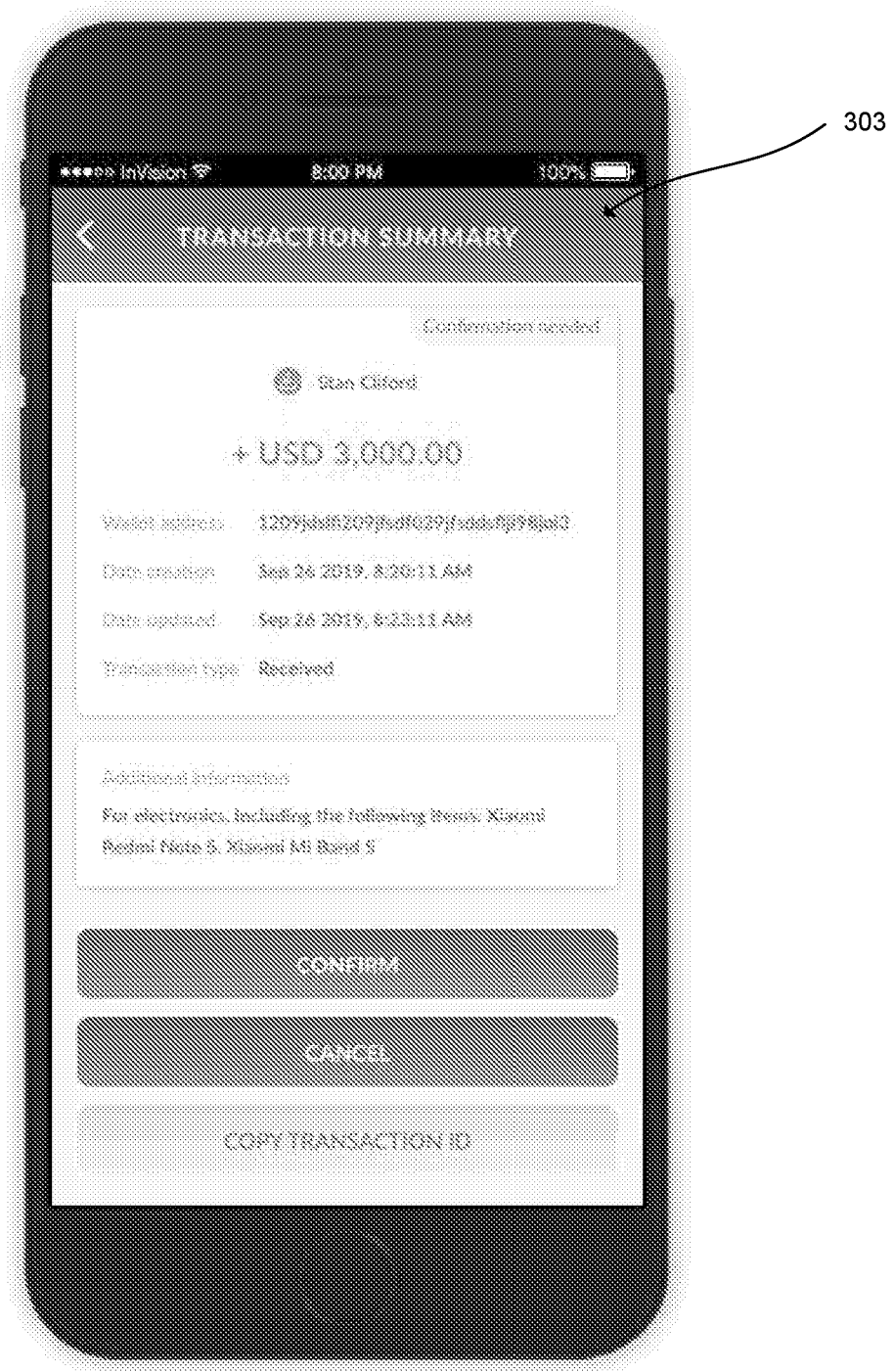
FIG. 3C illustrates another example interactive interface of an example mobile application based digital wallet, as may be presented via a display of a node (e.g., a UNode), in accordance with one or more embodiments of the present disclosure.

FIG. 3C illustrates another example interactive interface of an example mobile application based digital wallet, as may be presented via a display of a node (e.g., a UNode), in accordance with one or more embodiments of the present disclosure. As shown, in some embodiments a digital wallet application may include a transaction summary page 303 (which in some instances may be reached after entry of appropriate information in the create transaction page 302 discussed with reference to FIG. 3B) presenting a summary of the details for a proposed transaction. In some embodiments, the payer and/or payee may be prompted to confirm or cancel the proposed transaction by making appropriate selections via the digital wallet application interface.

Figure 3D:
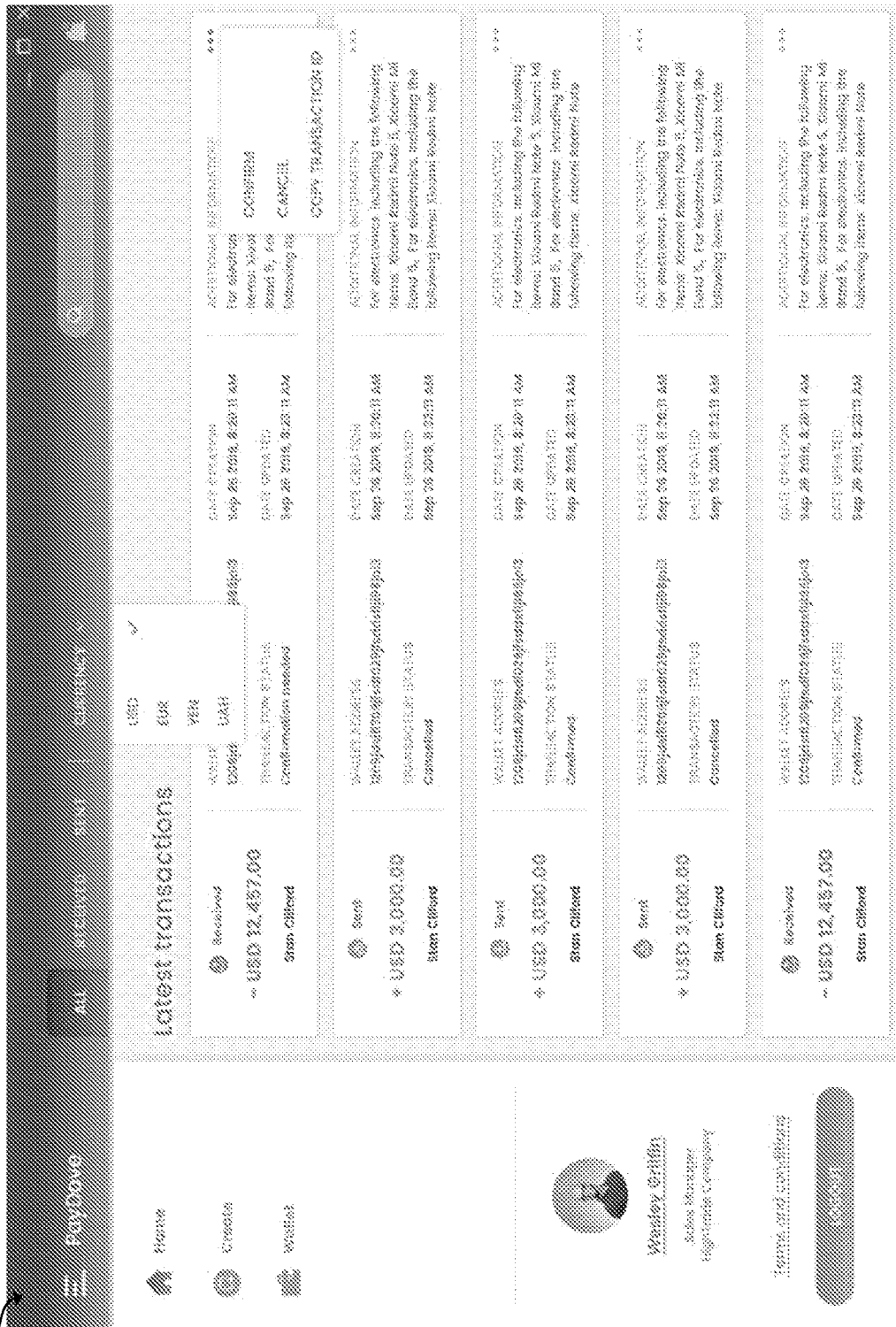
FIG. 3D illustrates an example interactive interface of an example web application based digital wallet, as may be presented via a display of a node (e.g., a UNode), in accordance with one or more embodiments of the present disclosure.

FIG. 3D illustrates an example interactive interface of an example web application dashboard including a digital wallet, as may be presented via a display of a node (e.g., a UNode), in accordance with one or more embodiments of the present disclosure. As shown, in some embodiments, an example web application dashboard 304 may include an overview of recent transactions in connection with a user's digital wallet. Any transaction details may be presented or removed from view in connection with the overview page of the web application dashboard 304. For instance, as shown in the example illustrated in FIG. 3D, the overview of recent transactions includes: the amount of each associated transaction, the wallet address used in connection with the transaction, the transaction status associated with the transaction, the date of creation and date updated in connection with the transaction, additional information associated with the transaction (which may include an identification of the goods, services, or other offerings purchased pursuant to the proposed transaction), a received or sent indicator associated with the transaction, and/or the name of the other party with whom the user was transacting.

Figure 3E:
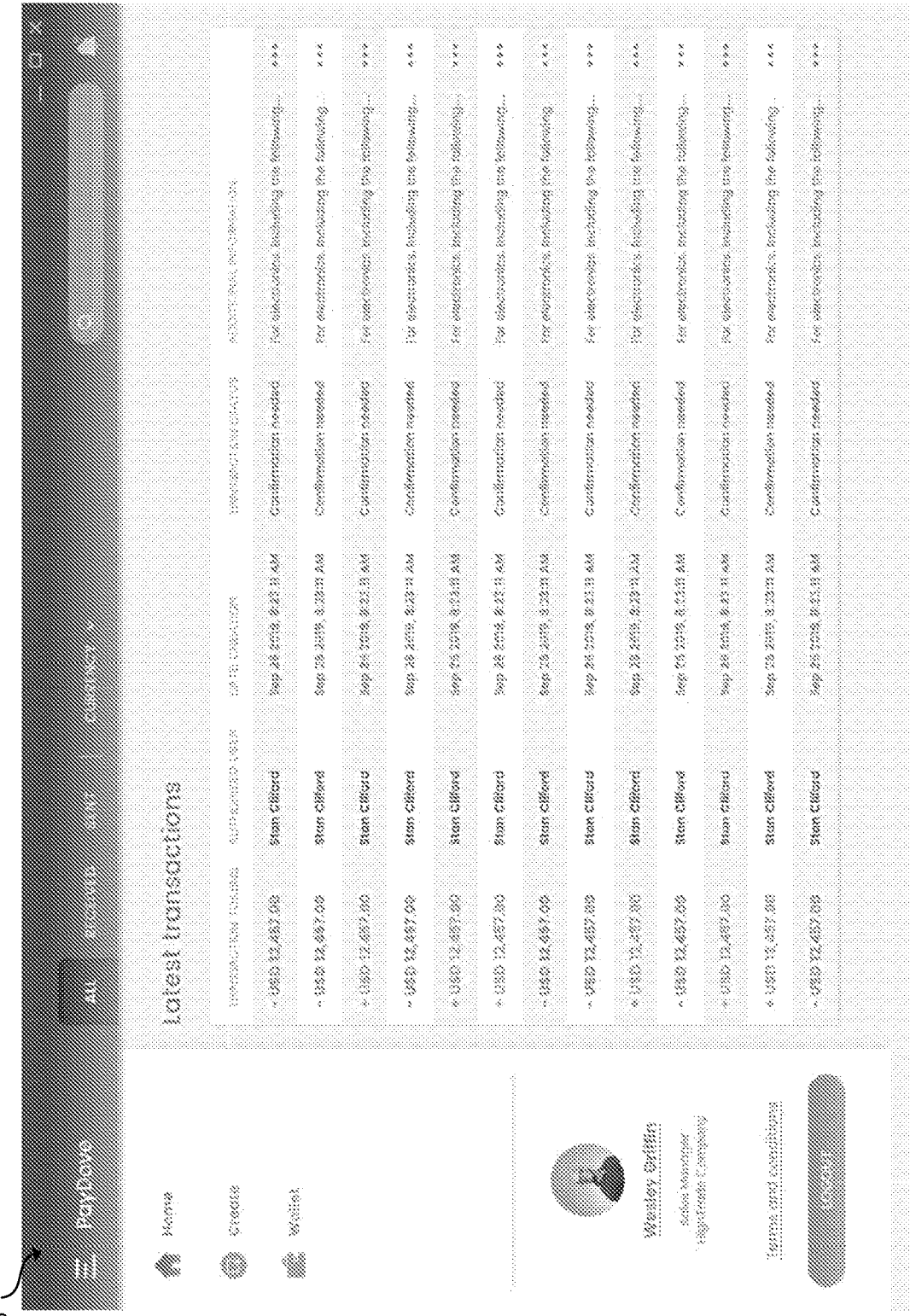
FIG. 3E illustrates an example interactive interface of an example web application dashboard including a digital wallet, as may be presented via a display of a node (e.g., a UNode), in accordance with one or more embodiments of the present disclosure.

FIG. 3E illustrates an example interactive interface of an example web application dashboard including a digital wallet, as may be presented via a display of a node (e.g., a UNode), in accordance with one or more embodiments of the present disclosure. As noted above in connection with FIG. 3D, as shown in FIG. 3E the overview of recent transactions displayed through the web application dashboard 305 may remove certain information from immediate viewing. For instance, in FIG. 3E, the recent transactions shown within the window do not display the wallet ID address of the other party with whom the user was transacting.

Figure 3F:
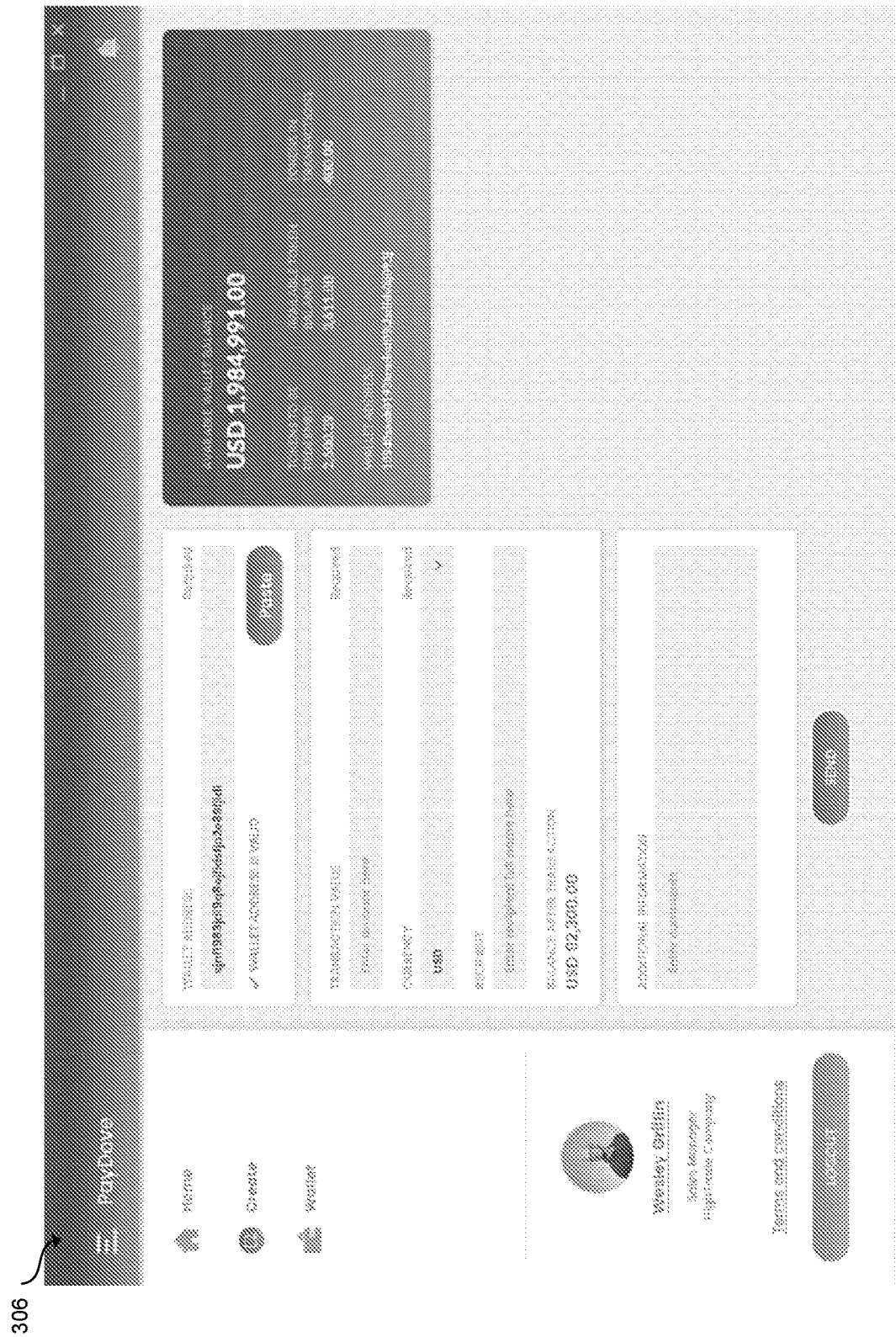
FIG. 3F illustrates an example interactive interface of an example web application dashboard including a digital wallet, as may be presented via a display of a node (e.g., a UNode), in accordance with one or more embodiments of the present disclosure.

FIG. 3F illustrates an example interactive interface of an example web application dashboard including a digital wallet, as may be presented via a display of a node (e.g., a UNode), in accordance with one or more embodiments of the present disclosure. Similar to the create transaction page 302 referred to in connection with the mobile digital wallet application shown in FIG. 3B, the example web application dashboard 306 illustrated in FIG. 3F may be utilized to create a transaction in accordance with the present disclosure. In some embodiments, the dashboard 306 presents the user with one or more fields wherein the user may enter details for a given transaction. As shown, such fields may include a wallet address field wherein a user may enter the wallet ID of the person or entity they wish to send tokens as payment for goods, services, or other offerings. A user may enter the appropriate wallet ID manually, or may utilize POS component 513 to obtain the wallet ID from the other party to the proposed transaction, including by any mechanism referred to herein (e.g., scanning a QR code, receiving payment card details transmitted between payer and payee UNode devices over any communication protocol (e.g., Bluetooth®), or through any IOT mechanism, etc.). As further shown, the user may enter into appropriate fields the transaction value, the type of currency associated with the tokens to be sent, the recipient's name, and any other additional information. Similarly, as will be appreciated upon review of the present disclosure, the user may also utilize POS component 513 to obtain one or more such details from the other party to the proposed transaction including by any mechanism referred to herein (e.g., scanning a QR code, receiving payment card details transmitted between payer and payee UNode devices over any communication protocol (e.g., Bluetooth®), or through any IOT mechanism, etc.). For example, upon a payer's scanning of a transaction code presented by the payee, the wallet address, transaction value, currency, recipient name, and other additional information may be prefilled within the create transaction page.

Figure 3G:
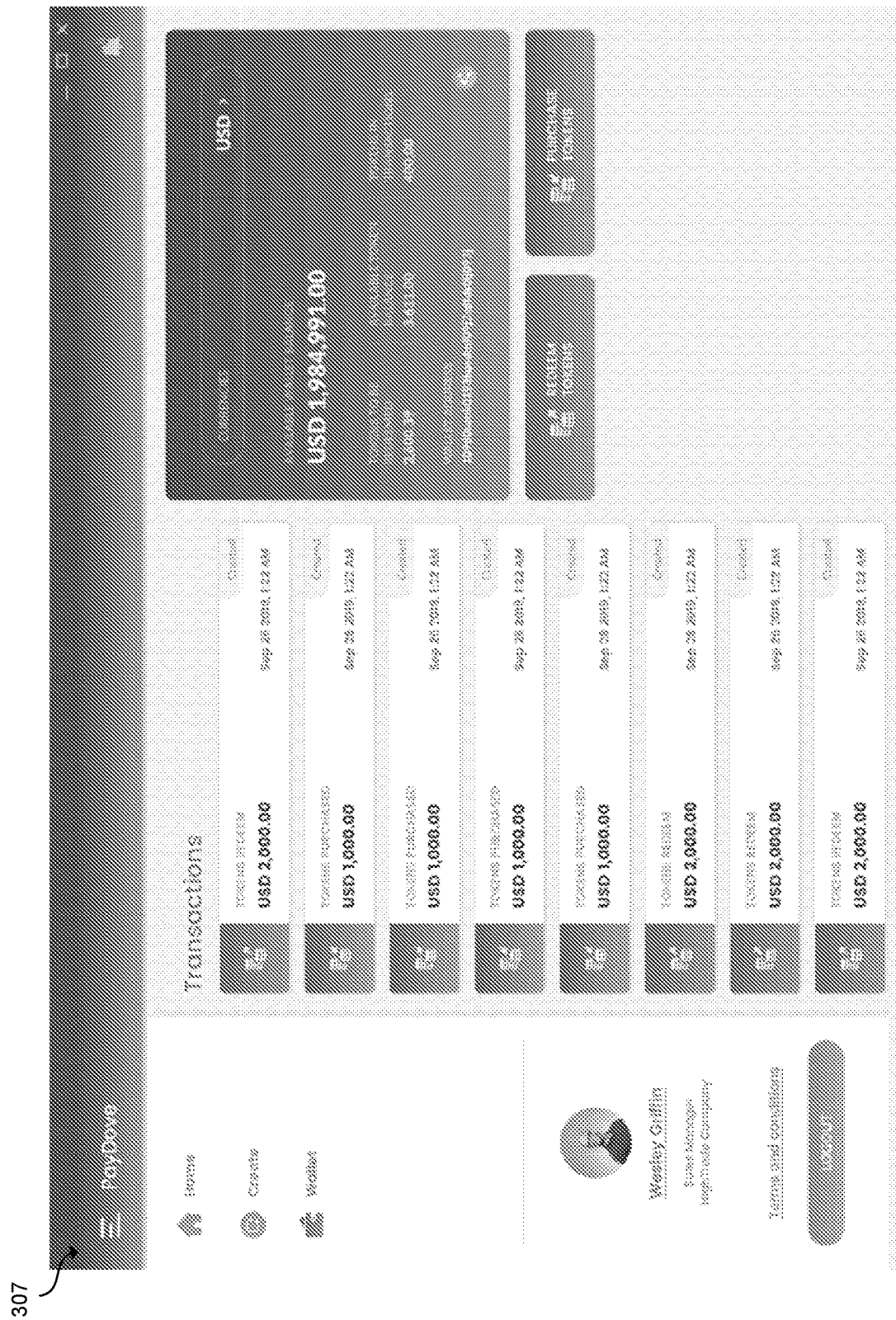
FIG. 3G illustrates an example interactive interface of an example web application dashboard including a digital wallet, as may be presented via a display of a node (e.g., a UNode), in accordance with one or more embodiments of the present disclosure.

FIG. 3G illustrates an example interactive interface of an example web application dashboard including a digital wallet, as may be presented via a display of a node (e.g., a UNode), in accordance with one or more embodiments of the present disclosure. Similar to the wallet balance overview page 301 referred to in connection with the mobile digital wallet application shown in FIG. 3A, the example web application dashboard 307 illustrated in FIG. 3G may be utilized to provide a wallet balance overview page in accordance with the present disclosure. As shown, the web application dashboard 307 may include the same or similar information as discussed earlier in connection with the wallet balance overview page 301 depicted in FIG. 3A.

The technology of the present disclosure provides blockchain based payment card solutions which allow for a simpler, faster, less expensive and more secure mechanism for authorization, authentication, clearing and settlement than the procedure illustrated in FIG. 1. Various examples are described below in connection embodiments of the present disclosure (FIGS. 3A-7), including example use cases involving: (1) payee-initiated token based payment card transactions, and (2) payer-initiated token based payment card transactions. In each such scenario (1) and (2), the interaction between the payer, the payee, and their respective banking institutions, may differ based on (a) which entity hosts the actual credit tokens and/or the digital wallets maintaining such tokens, (b) whether the payer's bank hosts the relevant blockchain, the payee's bank hosts the relevant blockchain, or a consortium of banks hosts the relevant blockchain, the consortium of banks including either or both the payer's bank and/or the payee's bank; (c) whether the payee is a registered member (but not a bank account holder) of the payer's bank (e.g., for purposes of validation, processing, and/or recording via the hosted blockchain, and/or for purposes of token exchanging, transferring, and/or cashing purposes), or the payer is a registered member (but not a bank account holder) of the payee's bank (e.g., for purposes of validation, processing, and/or recording via the hosted blockchain, and/or for purposes of token exchanging, transferring, and/or cashing purposes); (d) whether the payer's bank and the payee's bank are the same bank or different banks; (e) whether the payer's bank and/or the payee's bank are domiciled in a country that is different than the country in which the transaction is taking place, and/or (f) whether the tokens are entity-specific or entity-agnostic. For clarity of the description herein, the entity that hosts a token is the entity that stores the code that embodies the token itself, and/or that has control over the transfer of the token from its storage location into another (e.g., into the storage location associated with another account or digital wallet) in connection with a particular transaction.

(1) Payee-Initiated Token Based Payment Card Transactions

Figure 4A:
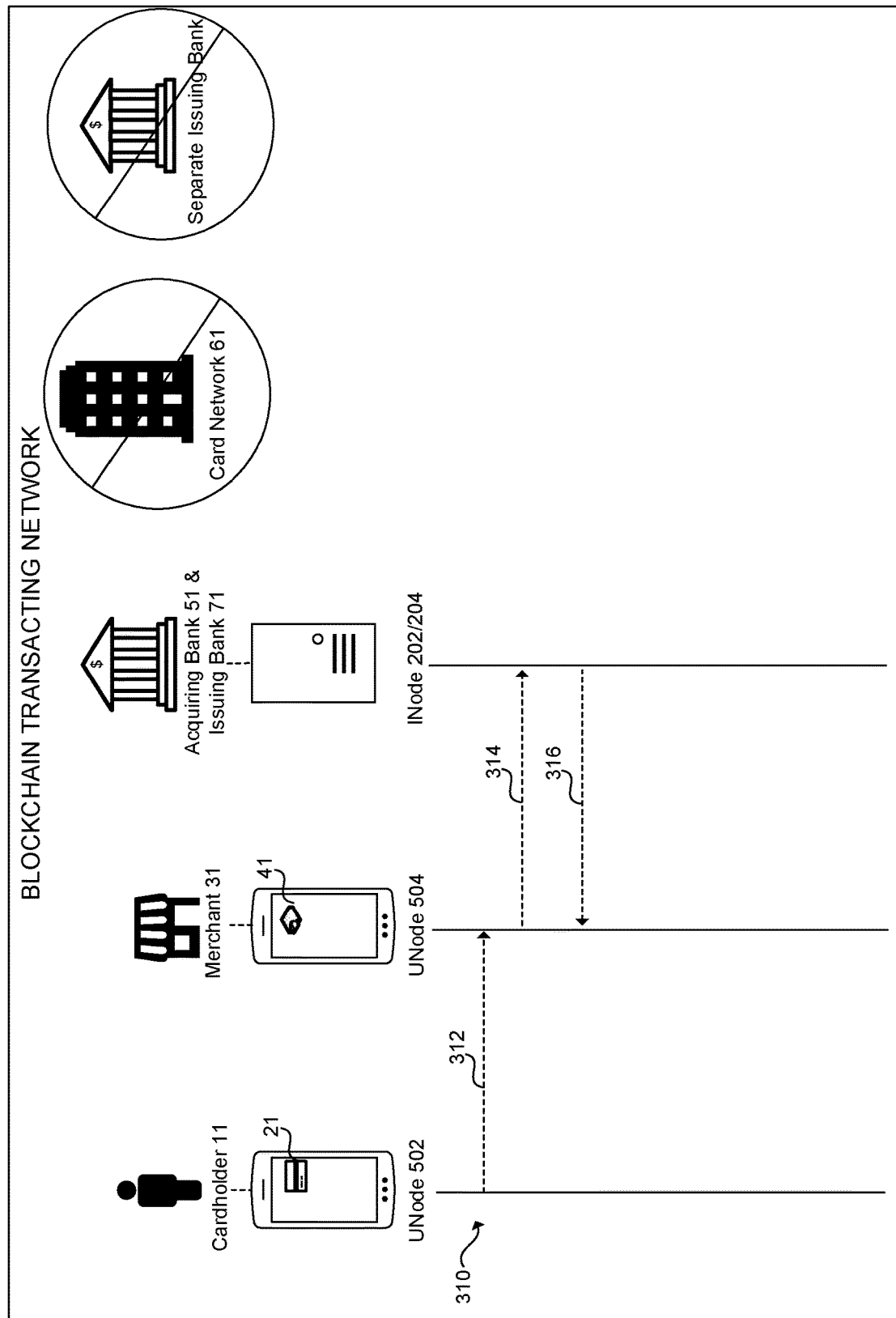
FIG. 4A illustrates elements and entities involved in an example payee-initiated token based payment card transactions, enabled by the blockchain transacting environment architectures (illustrated in FIGS. 2A-2C) in accordance with one or more embodiments of the present disclosure. In the depicted embodiment, the payee and payer hold bank accounts with the same bank.

FIG. 4A illustrates elements and entities involved in an example payee-initiated token based payment card transactions, enabled by the blockchain transacting environment architectures (illustrated in FIGS. 2A-2C) in accordance with one or more embodiments of the present disclosure. FIG. 4A further depicts an example communication flow between such entities and elements in order to complete such a transaction in accordance with one or more embodiments of the present disclosure. As described in more detail below, the process flow depicted in FIG. 4A may be carried out in scenarios where: (i) the payee (e.g., the merchant 31 in the depicted example) initiates (hence, payee initiated) a credit token transfer by obtaining token based payment card details from the payer (e.g., the cardholder 11 in the depicted example) and communicating directly with the blockchain hosted in whole or in part by the payer's bank (e.g., the cardholder 11's bank, i.e., issuing bank 71 in the depicted example) to validate the use of the token based payment card for the proposed transaction, and (ii) it is determined that, for the given transaction, the payer's bank (e.g., the cardholder 11's bank, i.e., issuing bank 71 in the depicted example) is the same bank as the payee's bank (e.g., the merchant 31's bank, i.e., acquiring bank 51 in the depicted example).

As shown, the elements and entities involved include cardholder 11 who possesses token based payment card 21, merchant 31 who possesses POS device 41, acquiring bank 51 and issuing bank 71 (which in this example are the same bank). Significantly, this entire process flow is accomplished without communicating with a card network (e.g., card network 60, depicted in FIG. 1), and only involves a single bank.

As further shown in FIG. 4A, each of cardholder 11, the token based payment card 21, merchant 31, POS device 41, and acquiring bank 51/issuing bank 71 are associated with a node of a blockchain transacting environment such as blockchain transacting environment 100 introduced in FIG. 2A-C.

Cardholder 11 is a network participant on the blockchain network who possesses one or more computing devices operating as a node of the blockchain network (UNode 502), and which may further have access to, or even embody, cardholder 11's token based payment card 21. Indeed, in some embodiments, token based payment card 21 may be embodied, in whole or in part, on the node (e.g., as an electronic payment card, or an electronic counterpart to a physical payment card). In some embodiments, the payment card may comprise a QR code, a barcode, a number, a mobile app, a Bluetooth® component/module or other IOT component/module, or any other electronic or physical object that may be linked to the cardholder 11's digital wallet (which may be hosted by cardholder 11's UNode 502 and/or issuing bank 71's INode 204).

Merchant 31 is a network participant on the blockchain network who possesses one or more computing devices operating as a node of the blockchain network, and which may further have access to, or even embody, merchant 31's point-of-sale device 41. Indeed, in some embodiments, POS device 41 may be embodied, in whole or in part, within merchant 31's node. In some embodiments, the POS device 41 may be a card reader linked to the merchant 31's digital wallet (which may be hosted by the cardholder's UNode 504 and/or the acquiring bank 51's INode 202) in or otherwise connected to UNode 504. In some embodiments, the POS device 41 may be a scanner (e.g., a QR scanner or bar code scanner) linked to the merchant 31's digital wallet (which may be hosted by the UNode 504 and/or the acquiring bank 51's INode 202). In some embodiments, POS device 41 may comprise one or more Bluetooth component/module and/or an IOT component/module that can send and receive payer, payee, and/or transaction information between the payer and payee UNodes. In some embodiments a digital wallet is an electronic wallet stored in a computing device (e.g., a computer, or server) associated with the UNode holding the bank account linked thereto. Acquiring bank 51/issuing bank 71 is a network participant on the blockchain network who also possesses one or more computing devices operating as a node of the blockchain network.

In FIG. 4A, the node associated with cardholder 11 and token based payment card 21 is referred to as UNode 502. The node associated with merchant 31 and POS device 41 is referred to as UNode 504. The node associated with acquiring bank 51/issuing bank 71 is referred to as INode 202/204. The communication flow depicts a flow of information occurring between entities and/or elements of the blockchain network (via the blockchain network), in the course of completing a blockchain based payment card transaction over the blockchain network. During the course of completing a blockchain based payment card transaction over the blockchain network, one or more elements of the blockchain network (e.g., UNode 502, Unode 504, INode 202/204) may operate on information it receives from another element or entity of the network, and then communicate such information (or information derived therefrom or reflecting determinations made thereon) to another element or entity of the network.

At step 312, cardholder 11 presents his/her token based payment card 21 to the merchant 31 for payment. POS device 41 acquires the token based payment card 21 details as the cardholder 11 presents the token based payment card 21 to the POS device 41 (e.g., by inserting the token based payment card 21 into the POS device 41, sliding it through a reading section of the POS device 41, or by making the token based payment card 21 available to be scanned or otherwise read by a device communicatively coupled with UNode 504 (such as by utilizing Bluetooth®, IOT, or other wireless syncing mechanism), where the same may be considered a POS device 41 for purposes of this disclosure). Said differently, UNode 502 presents token based payment card 21 details to UNode 504, for the purpose of transacting with UNode 504 using cardholder 11's account associated with token based payment card 21 to support the transaction. Once the details of the token based payment card 21 have been received, UNode 504 may, on the basis of those details, determine whether the merchant 31 and cardholder 11 share the same bank. That is, it may be determined that the issuing bank 71 (i.e, the bank that issued the blockchain based credit card 21 to cardholder 11, and with whom cardholder 11 holds an account) and the acquiring bank 51 (i.e., the bank with whom merchant 31 holds an account, the account wherein deposits may be made in connection with a payment card based transaction) are in fact the same bank. Upon determining that acquiring bank 51 and issuing bank 71 are the same bank, UNode 504 may, at step 314, transmit the token based payment card 21 details to the acquiring bank 51/issuing bank 71. Because the blockchain hosted in whole or in part by acquiring bank 51/issuing bank 71 has full access and visibility into the cardholder 11's account and the merchant 31's account, the blockchain hosted by in whole or in part acquiring bank 51/issuing bank 71 may then validate the token based payment card 21 for use in the proposed transaction, in the entire validation process may occur without contacting a card network. The blockchain hosted in whole or in part by acquiring bank 51/issuing bank 71 may approve or decline the token based payment card 21 for use in the proposed transaction, and, at step 316, the blockchain hosted in whole or in part by acquiring bank 51/issuing bank 71 may send a message to the UNode 504 (e.g., to POS device 41 of merchant 31, or to UNode 504's digital wallet) and/or the UNode 502 (e.g., to UNode 502's digital wallet) for viewing and/or confirmation. UNode 504 (e.g., POS device 41) may present an "approved" or "declined" message (e.g., on a display of POS device 41 (or another terminal communicatively coupled therewith), from within the UNode 504's digital wallet) that the cardholder can view, and/or within an interface of the cardholder 11's digital wallet (e.g., an interface of cardholder 11's mobile digital wallet application) as provided via the cardholder 11's smartphone display). In some embodiments, the cardholder 11 may be required to confirm the purchase in some manner (e.g., by selecting a button on the merchant 31's POS device 41 (or another terminal communicatively coupled therewith) in response to a notification, alert, or other option; by selecting a button selectable from within the UNode 504's digital wallet and/or the UNode 502's digital wallet; providing a signature via an interface of the UNode 504's digital wallet; providing a signature via an interface of UNode 502's digital wallet, etc.), including in any other manner desired for the given implementation). Additionally or alternatively, in some embodiments, as an enhanced layer of privacy, security, and protection against fraud, the payer may confirm by providing biometric information to payee. For example, merchant 31 may (e.g., upon cardholder's consent in response to merchant 31's request) scan cardholder 11's biometric feature (fingerprint, iris, face, voice, etc.) or may read such information from cardholder 11's digital wallet (or other component). In each case, merchant 31 may obtain such information utilizing its POS device 41 (or any other component or reader communicatively coupled with its UNode 504). After the merchant 31 receives the authorization (based on an "approval" from the acquiring bank 51/issuing bank 71), and/or once the merchant 31 receives the cardholder 11's confirmation and provides an indication of the confirmation directly or indirectly to the entity hosting the credit tokens, the entity hosting the credit tokens and/or the digital wallet may issue one or more commands to facilitate the transfer of the designated amount of credit tokens from the cardholder 11's digital wallet to the merchant 31's digital wallet (the transfer being processed through the blockchain).

For example where the issuing bank 71's INode 204 hosts the cardholder 11's digital wallet and/or the credit tokens, the INode 204 may issue a command to cause the transfer of the designated amount of credit tokens from the cardholder 11's digital wallet into the merchant 31's digital wallet (regardless of whether the merchant 31's digital wallet is hosted by the merchant 31's UNode 504 or the merchant 31's acquiring bank 51). During the transfer, issuing bank 71 may (or the blockchain hosted in whole or in part by the issuing bank 71 may) place a hold on a certain amount of funds (e.g., on a certain amount of credit tokens, debit tokens, or fiat currency that can be exchanged for such tokens) in the cardholder 11's account that is linked to or embodied by the digital wallet (e.g., in the amount of the purchase). Again, the blockchain that validated and/or processed the proposed transaction may record the transaction and then cause, or provide information relied upon for information to cause, updated credit token balances to be reflected in the cardholder 11's digital wallet and the merchant 31's digital wallet. Once the credit tokens are received into the merchant 31's digital wallet, merchant 31 may use the credit tokens in any manner desired (e.g., exchange for fiat cash, spend in another transaction with another network participant, hold in her digital wallet, move into a specific account held by her digital wallet, etc.).

In another example, where the cardholder 11's UNode 502 hosts the cardholder 11's digital wallet and/or the credit tokens, the UNode 502 may issue a command to cause the cardholder 11's digital wallet to issue a direct transfer of the designated amount of credit tokens from the cardholder 11's digital wallet into the merchant 31's digital wallet (regardless of whether the merchant 31's digital wallet is hosted by the merchant 31's UNode 504 or the merchant 31's acquiring bank 51). The blockchain that validated and/or processed the proposed transaction may record the transaction and then cause, or provide information relied upon for information to cause, updated credit token balances to be reflected in the cardholder 11's digital wallet and the merchant 31's digital wallet. Once the credit tokens are received into the merchant 31's digital wallet, merchant 31 may use the credit tokens in any manner desired (e.g., exchange for fiat cash, spend in another transaction with another network participant, hold in her digital wallet, move into a specific account held by her digital wallet, etc.).

In another example, again where the cardholder 11's UNode 502 hosts the cardholder 11's digital wallet and/or the credit tokens, the UNode 502 may, with or without the occurrence of step 314 and/or 316, issue a command to cause the cardholder 11's digital wallet to issue a direct transfer of the designated amount of credit tokens from the cardholder 11's digital wallet into the merchant 31's digital wallet (regardless of whether the merchant 31's digital wallet is hosted by the merchant 31's UNode 504 or the merchant 31's acquiring bank 51). The blockchain hosted in whole or in part by cardholder 11's bank (i.e., issuing bank 71) may record the transaction and then cause, or provide information relied upon for information to cause, updated credit token balances to be reflected in the cardholder 11's digital wallet and the merchant 31's digital wallet. Once the credit tokens are received into the merchant 31's digital wallet, merchant 31 may use the credit tokens in any manner desired (e.g., exchange for fiat cash, spend in another transaction with another network participant, hold in her digital wallet, move into a specific account held by her digital wallet, etc.). Although it is noted that UNode 502 may accomplish the foregoing without the occurrence of steps 314 and/or 316, the merchant 31 may require that steps 314 and/or 316 be completed, for enhanced security to ensure the cardholder has sufficient funds, before completing the proposed transaction. In some embodiments, however, in an effort to further lighten the computational burden of validating a transaction that is bound to fail, UNode 502 may first determine whether cardholder has sufficient funds based on a self-validation. If upon self-validation the UNode 502 determines that cardholder 11 has insufficient funds, the process may stop before the occurrence of steps 314 and/or 316 (and in some instances before step 312). However, if upon self-validation the UNode 502 determines that cardholder 11 does have sufficient funds, the process may proceed, if necessary, to steps 314 and/or 316.

Additionally, as an alternative to transferring tokens between cardholder 11's digital wallet and merchant 31's digital wallet, upon recognition that the acquiring bank 51 and issuing bank 71 are the same bank, cardholder 11 may simply return the designated amount of credit tokens (initiated by cardholder 11's UNode 502 if the cardholder 11's digital wallet is hosted at the UNode level 500 or by the issuing bank 71's INode 204 if the cardholder 11's digital wallet is hosted at the INode level 200) to the acquiring bank 51/issuing bank 71 and request that the acquiring bank 51/issuing bank 71 transfer the corresponding amount of fiat currency directly into merchant 31's bank account. This alternative lightens the computational burden even further because, inter alia, the token exchange between cardholder 11 and merchant 31 can be skipped yet the merchant 31 can still get paid out in real time (or near real-time). After the transaction is complete, the token and/or fiat balances of the cardholder 11 and merchant 31 may be simply reflected in their respective digital wallets.

In the foregoing examples, because the acquiring bank 51 and issuing bank 71 were determined to be the same bank, the traditional process carried for clearing and settlement (e.g., wherein, in part, a merchant (e.g., via their POS device) collects all approved authorizations for a given period of time (e.g. for entire day) and then send a batch of such approved authorizations for further processing by a card network in concert with the acquiring bank in the issuing bank) can be avoided. That is, the blockchain hosted by the acquiring bank 51/issuing bank 71 (or a consortium of banks where acquiring bank 51/issuing bank 71 is a member) can seamlessly validate a proposed transaction and allow credit tokens to be passed between cardholder 11's digital wallet (and/or linked account) and merchant 31's digital wallet (and/or linked account) without involving another governing entity (e.g., a card network). Additionally, as noted above, as an alternative to transferring tokens between cardholder 11's digital wallet and merchant 31's digital wallet, the acquiring bank 51/issuing bank 71 may (or the blockchain hosted in whole or in part by the acquiring bank 51/issuing bank 71 may) simply retrieve/receive the designated amount of tokens back from the cardholder and then immediately transfer the corresponding amount of fiat currency directly into merchant 31's bank account. Consequently, on account of merchant 31's early determination that it shares the same bank as cardholder 11, neither an authorization stage, an authentication stage, nor a clearing and settlement stage need involve a conventional card network of any kind.

Moreover, on account of the blockchain's concurrent knowledge of account balances (and in some instances knowledge of all or a portion of transactions involving an account that lead to the account balance) and token holdings of network participants, in some embodiments the process flow described above in connection with FIG. 4A may occur in real time (or near real time), thereby avoiding lag times commonly seen in conventional platforms. Thus, in some embodiments, a merchant 31 may receive actual payment in credit tokens, which it can then send directly to the issuing bank 71 in real time (or within certain designated period), and then receive funds from the issuing bank 71 in real time, thereby avoiding or reducing lag times experienced in traditional processes (e.g., waiting for 2-5 days before funds actually appear in one's account). Alternatively, in some embodiments, the exchange of tokens between cardholder 11's digital wallet and merchant 31's digital wallet can even be skipped, and the acquiring bank 51/issuing bank 71 can simply retrieve/receive the designated amount of tokens back from the cardholder and then immediately deposit the corresponding amount of fiat currency directly into merchant 31's bank account. Again, this allows the merchant 31 to receive funds from the issuing bank 71 in real time (or near real-time).

Figure 4B:
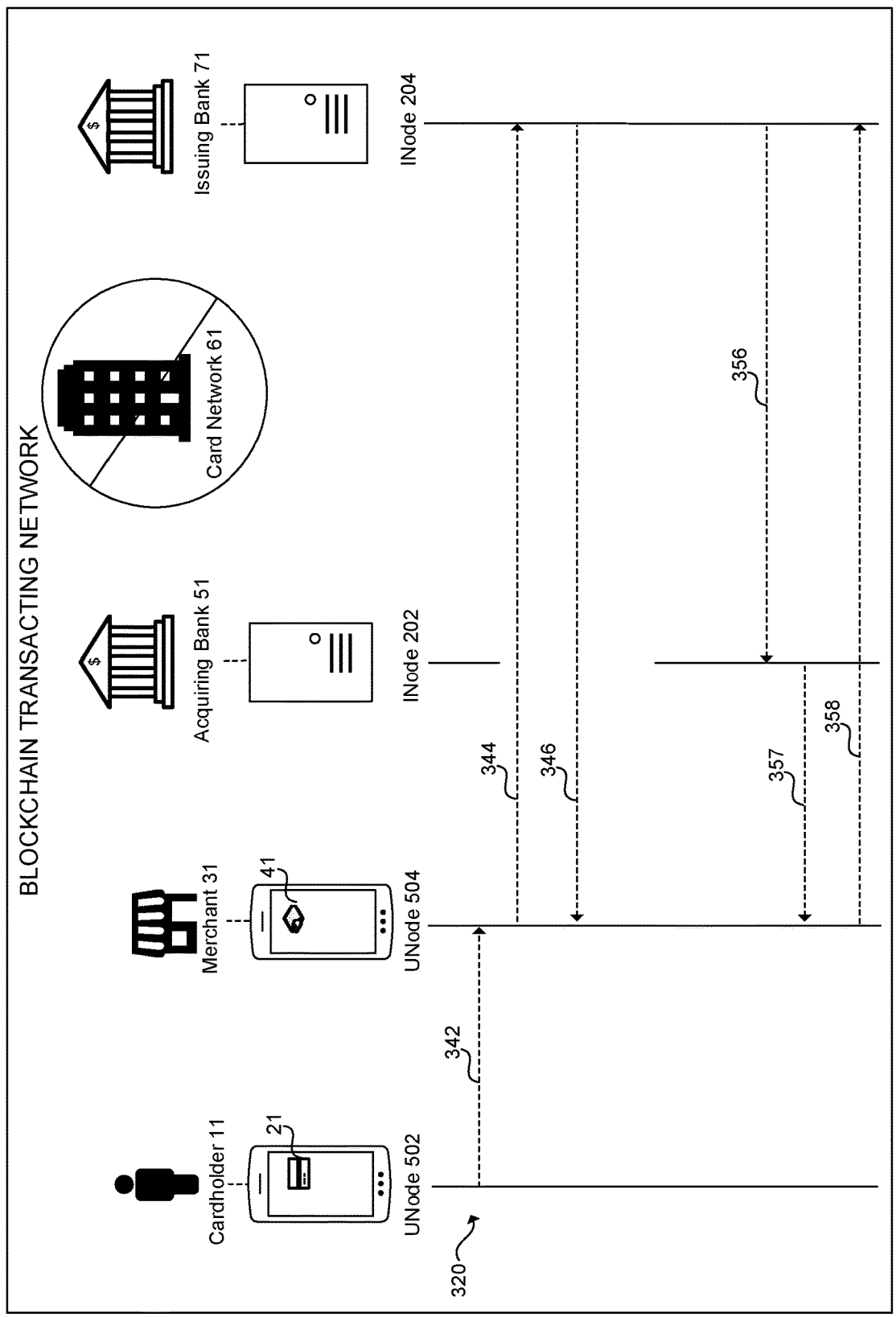
FIG. 4B illustrates elements and entities involved in another example payee-initiated token based payment card transactions, enabled by the blockchain transacting environment architectures (illustrated in FIGS. 2A-2C) in accordance with one or more embodiments of the present disclosure. In the depicted embodiment, the payee and payer hold bank accounts with different banks that may be domiciled in the same jurisdiction.

FIG. 4B illustrates elements and entities involved in another example payee-initiated token based payment card transactions, enabled by the blockchain transacting environment architectures (illustrated in FIGS. 2A-2C) in accordance with one or more embodiments of the present disclosure. FIG. 4B further depicts an example communication flow between such entities and elements in order to complete such a transaction in accordance with one or more embodiments of the present disclosure. As described in more detail below, the process flow depicted in FIG. 4B may be carried out in scenarios where: (i) the payee (e.g., the merchant 31 in the depicted example) initiates (hence, payee initiated) a credit token transfer by obtaining token based payment card details from the payer (e.g., the cardholder 11 in the depicted example) and communicating directly with the blockchain hosted in whole or in part by payer's bank (e.g., the cardholder 11's bank, i.e., issuing bank 71 in the depicted example) to validate the use of the token based payment card for the proposed transaction, and (ii) it is determined that, for the given transaction, the payer's bank (e.g., the cardholder 11's bank, i.e., issuing bank 71 in the depicted example) is different than the payee's bank (e.g., the merchant 31's bank, i.e., acquiring bank 51 in the depicted example).

As shown, the elements and entities involved include cardholder 11 who possesses token based payment card 21, merchant 31 who possesses POS device 41, acquiring bank 51 and issuing bank 71. Again, significantly, this entire process flow is accomplished without a card network (e.g., card network 60, depicted in FIG. 1).

As further shown in FIG. 4B, each of cardholder 11, the token based payment card 21, merchant 31, POS device 41, acquiring bank 51, and issuing bank 71 are associated with a node of a blockchain network.

Just as in FIG. 4A, cardholder 11 is a network participant on the blockchain network who possesses one or more computing devices operating as a node of the blockchain network, and which may further have access to, or even embody, cardholder 11's token based payment card 21. Indeed, in some embodiments, token based payment card 21 may be embodied, in whole or in part, on the node (e.g., as an electronic payment card, or an electronic counterpart to a physical payment card, e.g., a digital card stored on a smartphone).

Similarly, just as in FIG. 4A, Merchant 31 is a network participant on the blockchain network who possesses one or more computing devices operating as a node of the blockchain network, and which may further have access to, or even embody, merchant 31's point-of-sale device 41. Indeed, in some embodiments, POS device 41 may be embodied, in whole or in part, within merchant 31's node. In some embodiments, the POS device may comprise a scanner (e.g., a handheld scanner) capable of reading a QR code, a bar code, a serial number, or other electronic or physical object (such as a Bluetooth component/module and/or an IOT component/module that can sync with payer's digital wallet) that can be linked or built in to the merchant 31's digital wallet, which is further linked to the merchant 31's bank account with acquiring bank 51.

At step 342, cardholder 11 presents his/her token based payment card 21 to the merchant 31 for payment. POS device 41 acquires the token based payment card 21 details as the cardholder 11 presents the token based payment card 21 to the POS device 41. Said differently, UNode 502 presents token based payment card 21 details to UNode 504, for the purpose of transacting with UNode 504 using cardholder 11's account associated with token based payment card 21 to support the transaction. Once the details of the token based payment card 21 have been received, UNode 504 may, on the basis of those details, determine whether the merchant 31 and cardholder 11 share the same bank or hold accounts at different banks. That is, it may be determined that the issuing bank 71 (i.e, the bank that issued the blockchain based credit card 21 to cardholder 11, and with whom cardholder 11 holds an account) and the acquiring bank 51 (i.e., the bank with whom merchant 31 holds an account, the account wherein deposits may be made in connection with a payment card based transaction) are the same bank or are different banks. It may further be determined that the issuing bank 71 is a network participant operating as an INode on the same blockchain network (or another blockchain network connected thereto). Upon determining that acquiring bank 51 and issuing bank 71 are different banks, and that issuing bank 71 is associated with INode 204, UNode 504 may, at step 344, transmit the token based payment card 21 details directly to the cardholder 11's bank (i.e., issuing bank 71, associated with INode 204). The blockchain hosted in whole or in part by issuing bank 71 may validate the token based payment card 21 for use in proposed transaction. The blockchain hosted in whole or in part by issuing bank 71 may approve or decline the token based payment card 21 for use in the proposed transaction, and, at step 346, INode 204 may send a message to UNode 504 (or to INode 202, at step 356, who may forward the message to UNode 504, at step 357) concerning the same. Once merchant 31 (via UNode 504) receives confirmation from the cardholder 11 following the "approval" by the blockchain hosted in whole or in part by issuing bank 71, and/or once the merchant 31 receives the cardholder 11's confirmation and provides an indication of the confirmation directly or indirectly to the entity hosting the credit tokens, the entity hosting the credit tokens and/or the digital wallet may issue one or more commands to facilitate the transfer of the designated amount of credit tokens from the cardholder 11's digital wallet to the merchant 31's digital wallet. UNode 504 may, at step 358, send a confirmatory indication to INode 204 that the credit tokens have been received into the digital wallet of the UNode 504, and that the transaction is complete.

For example where the issuing bank 71's INode 204 hosts the cardholder 11's digital wallet and/or the credit tokens, the INode 204 may issue a command to cause the transfer of the designated amount of credit tokens from the cardholder 11's digital wallet into the merchant 31's digital wallet (regardless of whether the merchant 31's digital wallet is hosted by the merchant 31's UNode 504 or the merchant 31's acquiring bank 51). During the transfer, issuing bank 71 may (or the blockchain hosted in whole or in part by the acquiring bank 51/issuing bank 71 may) place a hold on a certain amount of funds (e.g., on a certain amount of credit tokens, debit tokens, or fiat currency that can be exchanged for such tokens) in the cardholder 11's account that is linked to or embodied by the digital wallet (e.g., in the amount of the purchase). Again, the blockchain that validated the proposed transaction may record the transaction and then cause, or provide information relied upon for information to cause, updated credit token balances to be reflected in the cardholder 11's digital wallet and the merchant 31's digital wallet. Once the credit tokens are received into the merchant 31's digital wallet, merchant 31 may use the credit tokens in any manner desired (e.g., exchange for fiat cash, spend in another transaction with another network participant, hold in her digital wallet, move into a specific account held by her digital wallet, etc.).

In another example, where the cardholder 11's UNode 502 hosts the cardholder 11's digital wallet and/or the credit tokens, the UNode 502 may issue a command to cause the cardholder 11's digital wallet to issue a direct transfer of the designated amount of credit tokens from the cardholder 11's digital wallet into the merchant 31's digital wallet (regardless of whether the merchant 31's digital wallet is hosted by the merchant 31's UNode 504 or the merchant 31's acquiring bank 51). The blockchain that validated the proposed transaction may record the transaction and then cause, or provide information relied upon for information to cause, updated credit token balances to be reflected in the cardholder 11's digital wallet and the merchant 31's digital wallet. Once the credit tokens are received into the merchant 31's digital wallet, merchant 31 may use the credit tokens in any manner desired (e.g., exchange for fiat cash from issuing bank and/or acquiring bank, spend in another transaction with another network participant, hold in her digital wallet, move into a specific account held by her digital wallet, etc.).

In another example, again where the cardholder 11's UNode 502 hosts the cardholder 11's digital wallet and/or the credit tokens, the UNode 502 may, with or without the occurrence of steps 342-358, issue a command to cause the cardholder 11's digital wallet to issue a direct transfer of the designated amount of credit tokens from the cardholder 11's digital wallet into the merchant 31's digital wallet (regardless of whether the merchant 31's digital wallet is hosted by the merchant 31's UNode 504 or the merchant 31's acquiring bank 51). The blockchain hosted in whole or in part by cardholder 11's bank (i.e., issuing bank 71) may record the transaction and then cause, or provide information relied upon for information to cause, updated credit token balances to be reflected in the cardholder 11's digital wallet and the merchant 31's digital wallet. Once the credit tokens are received into the merchant 31's digital wallet, merchant 31 may use the credit tokens in any manner desired (e.g., exchange for fiat cash, spend in another transaction with another network participant, hold in her digital wallet, move into a specific account held by her digital wallet, etc.). Although it is noted that UNode 502 may accomplish the foregoing without the occurrence of steps 342-358, the merchant 31 may require that steps 342-358 be completed, for enhanced security to ensure the cardholder has sufficient funds, before completing the proposed transaction. That is, the merchant 31 may require that validation occur via the blockchain hosted by the issuing bank (or, where issuing bank is part of a bank consortium, via the blockchain hosted by the bank consortium) to ensure that the payer has sufficient funds to support the proposed transaction. In some embodiments, however, in an effort to further lighten the computational burden of validating a transaction that is bound to fail, UNode 502 may first determine whether cardholder has sufficient funds based on a self-validation (i.e., checking the balance reflected in its digital wallet as maintained in the UNode 502 to determine if there are sufficient funds). If upon self-validation the UNode 502 determines that cardholder 11 has insufficient funds, the process may stop before the occurrence of steps 342-358. However, if upon self-validation the UNode 502 determines that cardholder 11 does have sufficient funds, the process may proceed, if necessary, to steps 342-358.

Moreover, on account of the fact that acquiring bank 51 and issuing bank 71 have access to the blockchain hosted in whole or in part by the acquiring bank 51 and/or the issuing bank 71 may (and/or that acquiring bank 51 and/or issuing bank 71 may issue and receive commands to and from one another within the blockchain transaction environment), the traditional process carried out for clearing and settlement (e.g., wherein, in part, a merchant (e.g., via their POS device) collects all approved authorizations for a given period of time (e.g. for entire day) and then send a batch of such approved authorizations for further processing by a card network in concert with the acquiring bank and/or the issuing bank) can be avoided. The merchant 31 simply collects the tokens from the cardholder 11, sends the tokens to either (i) the issuing bank 71 in exchange for fiat currency deposit into merchant 31's bank account, or (ii) the acquiring bank 51 who then sends the tokens to issuing bank (on behalf of the merchant 31) in exchange for fiat currency that then gets deposited into the merchant's bank account held by the acquiring bank. Consequently, on account of merchant 31's early determination that both INode 202 and INode 204 are equipped to engage in trusted communications and transmissions over the blockchain network, neither the authorization stage, authentication stage, nor clearing and settlement stage need to involve a card network of any kind. Indeed, validation and settlement may be accomplished (i) when merchant 31 is a client (e.g., an account holder, or registered member) of the blockchain hosted in whole or in part by cardholder 11's bank (issuing bank 71) and thus validation, processing, and recording (and/or settlement) may occur by the blockchain hosted in whole or in part by cardholder 11's bank (issuing bank 71) performing the validation, and/or (ii) when merchant 31 is a client (e.g., an account holder, or registered member) of the blockchain hosted by a bank consortium that includes cardholder 11's bank (issuing bank 71) and/or merchant 31's bank (acquiring bank 51), and thus validation (and/or settlement) may occur by the blockchain hosted in whole or in part by the bank consortium (or an agent of the bank consortium) performing the validation based on the information held in the hosted blockchain.

The scenario described above in connection with FIG. 4B may be carried out in instances where the merchant 31 wishes to communicate directly with the blockchain hosted in whole or in part by issuing bank 71 (for purposes of validation, processing, recording and/or receiving payment). In some cases, however, such direct communications may be less desirable, or even impossible, and it may be more beneficial for the merchant 31 to request that its own bank (i.e., acquiring bank 51) communicate with the blockchain hosted in whole or in part by issuing bank 71 on its behalf. Such scenarios may be desired in "foreign transactions" (i.e., transactions in which the issuing bank 71 and the acquiring bank 51 are domiciled in different countries (or states, territories, etc.)), and where certain fees may be avoided by involving merchant 31's acquiring bank 51. In such an example, the process flow depicted in FIG. 4C may be carried out.

Figure 4C:
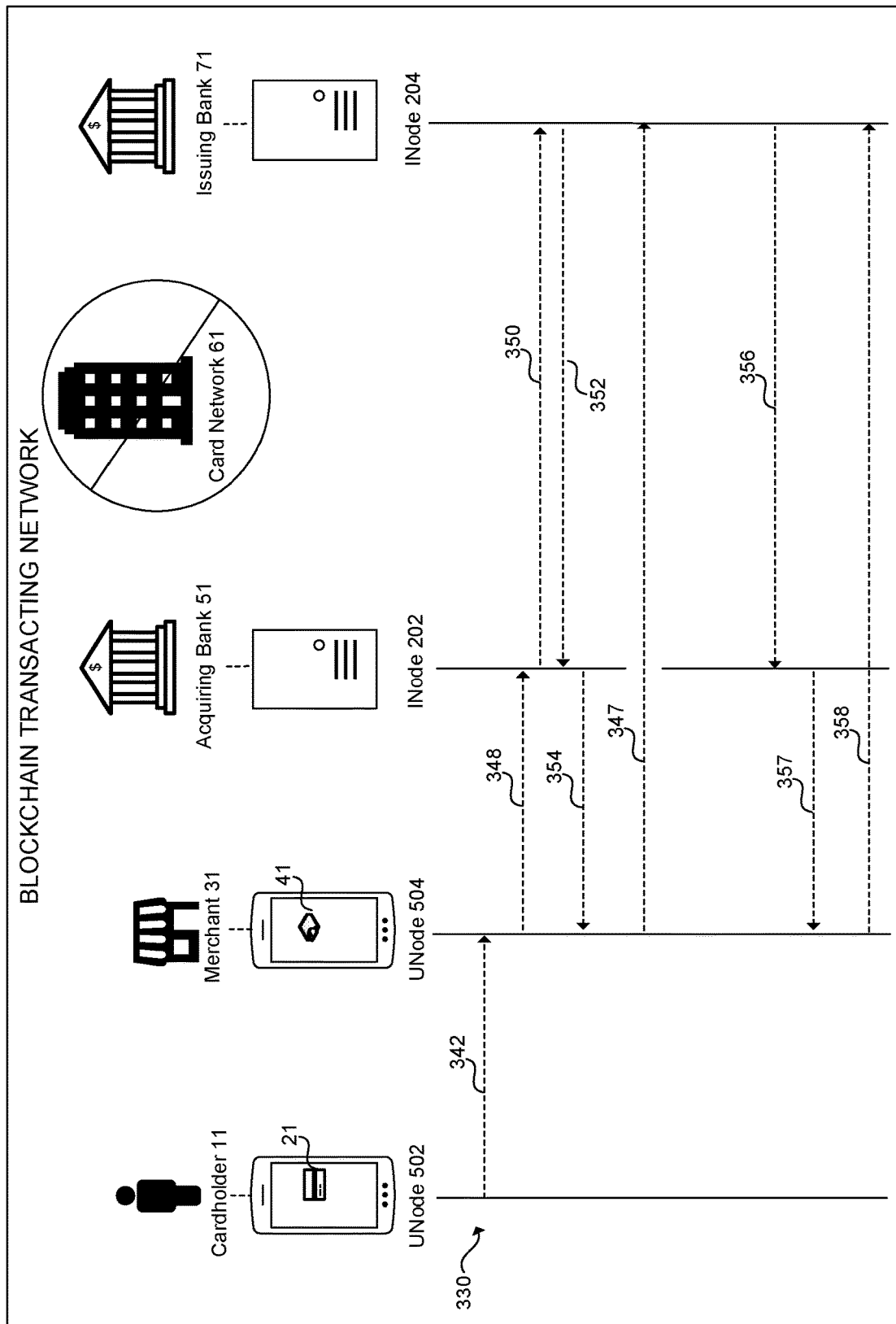
FIG. 4C illustrates elements and entities involved in another example payee-initiated token based payment card transactions, enabled by the blockchain transacting environment architectures (illustrated in FIGS. 2A-2C) in accordance with one or more embodiments of the present disclosure. In the depicted embodiment, the payee and payer hold bank accounts with different banks that may be domiciled in different jurisdictions.

FIG. 4C illustrates elements and entities involved in another example payee-initiated token based payment card transactions, enabled by the blockchain transacting environment architectures (illustrated in FIGS. 2A-2C) in accordance with one or more embodiments of the present disclosure. FIG. 4C further depicts an example communication flow between such entities and elements in order to complete such a transaction in accordance with one or more embodiments of the present disclosure. As described in more detail below, the process flow depicted in FIG. 4C may be carried out in scenarios where: (i) the payee (e.g., the merchant 31 in the depicted example) initiates (hence, payee initiated) a credit token transfer by obtaining token based payment card details from the payer (e.g., the cardholder 11 in the depicted example) and communicating indirectly with the payer's bank (e.g., the cardholder 11's bank, i.e., issuing bank 71 in the depicted example) by coordinating with the blockchain hosted in whole or in part by its own bank (e.g., the merchant 31's bank, i.e., acquiring bank 51 in the depicted example) to validate the use of the token based payment card for the proposed transaction, and (ii) it is determined that, for the given transaction, the payer's bank (e.g., the cardholder 11's bank, i.e., issuing bank 71 in the depicted example) is different than the payee's bank (e.g., the merchant 31's bank, i.e., acquiring bank 51 in the depicted example).

For brevity, steps 342, 356, 357, and 358 of FIG. 4C may be performed in the same manner as described in connection with FIG. 4B. However, unlike the case described in connection with steps 344 and 346 of FIG. 4B, in the process flow illustrated in FIG. 4C, at step 348, UNode 504 may transmit the token based payment card 21 details to acquiring bank 51 (associated with INode 202), who may then, at step 350, pass such details on to cardholder 11's bank (i.e., issuing bank 71, associated with INode 204). The blockchain hosted in whole or in part by issuing bank 71 may validate the token based payment card 21 for use in proposed transaction. The blockchain hosted in whole or in part by issuing bank 71 may approve or decline the token based payment card 21 for use in the proposed transaction, and, at step 352, INode 204 may send a message to INode 202, who may then, at step 354, forward the message to UNode 504, concerning the same. Once merchant 31 (via UNode 504) receives "approval" from the issuing bank 71, and/or once the merchant 31 receives the cardholder 11's confirmation and provides an indication of the confirmation directly or indirectly to the entity hosting the credit tokens, the entity hosting the credit tokens and/or the digital wallet may issue one or more commands to facilitate the transfer of the designated amount of credit tokens from the cardholder 11's digital wallet to the merchant 31's digital wallet.

For example where the issuing bank 71's INode 204 hosts the cardholder 11's digital wallet and/or the credit tokens, the INode 204 may issue a command to cause the transfer of the designated amount of credit tokens from the cardholder 11's digital wallet into the merchant 31's digital wallet (regardless of whether the merchant 31's digital wallet is hosted by the merchant 31's UNode 504 or the merchant 31's acquiring bank 51). During the transfer, issuing bank 71 may (or the blockchain hosted in whole or in part by the acquiring bank 51/issuing bank 71 may) place a hold on a certain amount of funds (e.g., on a certain amount of credit tokens, debit tokens, or fiat currency that can be exchanged for such tokens) in the cardholder 11's account that is linked to or embodied by the digital wallet (e.g., in the amount of the purchase). Again, the blockchain that validated the proposed transaction may record the transaction and then cause, or provide information relied upon for information to cause, updated credit token balances to be reflected in the cardholder 11's digital wallet and the merchant 31's digital wallet. Once the credit tokens are received into the merchant 31's digital wallet, merchant 31 may use the credit tokens in any manner desired (e.g., exchange for fiat cash, spend in another transaction with another network participant, hold in her digital wallet, move into a specific account held by her digital wallet, etc.).

In another example, where the cardholder 11's UNode 502 hosts the cardholder 11's digital wallet and/or the credit tokens, the UNode 502 may issue a command to cause the cardholder 11's digital wallet to issue a direct transfer of the designated amount of credit tokens from the cardholder 11's digital wallet into the merchant 31's digital wallet (regardless of whether the merchant 31's digital wallet is hosted by the merchant 31's UNode 504 or the merchant 31's acquiring bank 51). The blockchain that validated the proposed transaction may record the transaction and then cause, or provide information relied upon for information to cause, updated credit token balances to be reflected in the cardholder 11's digital wallet and the merchant 31's digital wallet. Once the credit tokens are received into the merchant 31's digital wallet, merchant 31 may use the credit tokens in any manner desired (e.g., exchange for fiat cash, spend in another transaction with another network participant, hold in her digital wallet, move into a specific account held by her digital wallet, etc.).

In another example, again where the cardholder 11's UNode 502 hosts the cardholder 11's digital wallet and/or the credit tokens, the UNode 502 may, with or without the occurrence of steps 342-358, issue a command to cause the cardholder 11's digital wallet to issue a direct transfer of the designated amount of credit tokens from the cardholder 11's digital wallet into the merchant 31's digital wallet (regardless of whether the merchant 31's digital wallet is hosted by the merchant 31's UNode 504 or the merchant 31's acquiring bank 51). The blockchain hosted in whole or in part by cardholder 11's bank (i.e., issuing bank 71) may record the transaction and then cause, or provide information relied upon for information to cause, updated credit token balances to be reflected in the cardholder 11's digital wallet and the merchant 31's digital wallet. Once the credit tokens are received into the merchant 31's digital wallet, merchant 31 may use the credit tokens in any manner desired (e.g., exchange for fiat cash, spend in another transaction with another network participant, hold in her digital wallet, move into a specific account held by her digital wallet, etc.). Although it is noted that UNode 502 may accomplish the foregoing without the occurrence of steps 342-358, the merchant 31 may require that steps 342-358 be completed, for enhanced security to ensure the cardholder has sufficient funds, before completing the proposed transaction. That is, the merchant 31 may require that validation occur via the blockchain hosted by the issuing bank (or, where issuing bank is part of a bank consortium, via the blockchain hosted by the bank consortium) to ensure that the payer has sufficient funds to support the proposed transaction. In some embodiments, however, in an effort to further lighten the computational burden of validating a transaction that is bound to fail, UNode 502 may first determine whether cardholder has sufficient funds based on a self-validation (i.e., checking the balance reflected in its digital wallet as maintained in the UNode 502 to determine if there are sufficient funds). If upon self-validation the UNode 502 determines that cardholder 11 has insufficient funds, the process may stop before the occurrence of steps 342-358. However, if upon self-validation the UNode 502 determines that cardholder 11 does have sufficient funds, the process may proceed, if necessary, to steps 342-358.

The foregoing scenario may be carried out such that the merchant 31 can settle the transaction with the issuing bank 71 in an efficient manner that does not involve a card network, but which also avoids or reduces foreign transaction fees by involving its acquiring bank when necessary or desirable to do so.

In still further embodiments, in the case where the issuing bank 71 is a foreign bank, merchant 31 may obtain validation directly from the blockchain hosted in whole or in part by the foreign bank (issuing bank 71), or directly from a blockchain hosted by a bank consortium of which either or both the foreign bank (issuing bank 71) and/or the merchant's bank (acquiring bank 51) are members. In some embodiments, merchant 31's bank (acquiring bank 51) may, optionally, only become involved in the process when merchant 31 requests to cash out one or more of its credit tokens from the foreign bank (issuing bank 71) through the merchant's bank (acquiring bank 51).

In still further embodiments, merchant 31 may prefer to be paid in local token currency rather than foreign token currency. For example, a European merchant 31 may prefer to be paid in European credit tokens rather than US credit tokens, and vice versa. Merchant 31's preferences may be based on additional time and/or fees that may be incurred if it (or the bank with whom it chooses to exchange) is required to exchange multijurisdictional currencies and/or tokens before it gets paid. In such situations, merchant 31 may, via its UNode or via a POS device connected thereto, present the cardholder 11 with one or more options in connection with the types of currency the cardholder 11 may use to complete the transaction. In some embodiments, merchant 31 only provides cardholder 11 with a single option, mandating that the cardholder 11 supply jurisdiction specific tokens that meet merchant 31's jurisdiction specific requirements. In some embodiments, merchant 31 may allow cardholder 11 to choose among a plurality of types of jurisdiction specific tokens or fiat currency (or fiat credit) with which to complete the payment. In connection with each type of jurisdiction specific token, merchant 31 may present different payment amounts that may be required. The different payment amounts may be based upon a given exchange rate provided by the issuing bank 71 (and/or by acquiring bank 51) and/or any associated fees for making the exchange with a particular jurisdiction specific token or fiat. In some embodiments, the different payment amounts may be based upon an exchange rate agreed upon by members of a bank consortium (e.g., members of a bank consortium that host the block chain needed for validation) that may be extended to cardholder 11 in connection with the transaction. In some embodiments, merchant 31 may via its UNode or via a POS device connected thereto, present the cardholder 11 with the amount of the transaction in the local currency (or the preferred currency), side-by-side with equivalent amount of the transaction in the issuing bank 71's jurisdiction specific currency with which cardholder 11 may select and/or complete the transaction, based on the exchange rate. Merchant 31 may also display, in the same manner, an indication of fees and/or processing costs associated with any exchanges of foreign-currency that may be required to complete the purchase and/or settle the transaction.

Upon cardholder 11 making its selection and confirming the transaction, acquiring bank 51 may collect the jurisdiction specific currency from issuing bank 71 and convert into local currency with the funds it receives, or provide merchant 31 the corresponding amount of issuing currency which it obtains from issuing bank. Alternatively, merchant 31 can send the foreign tokens directly to issuing bank 71 and collect issuing currency from issuing bank 71. The merchant 31 can then choose to keep the issuing currency (if it has some other use for such currency) or exchange such currency into its local currency through merchant 31's bank (acquiring bank 51).

It should be appreciated that, in accordance with the token based payment card transaction technologies of the present disclosure, a merchant 31 in the foregoing scenarios (discussed with reference to FIGS. 4A-4C) may initiate the transaction by, e.g., scanning a QR code or other code presented by cardholder 11, or by otherwise obtaining the token based payment card details of the cardholder 11 from the cardholder 11's digital wallet (e.g., via its UNode) (e.g., via Bluetooth® or other communication protocols and/or other IOT mechanisms). It should further be appreciated that the merchant 31 may seek validation for a proposed transaction directly from the blockchain hosted in whole or in part by issuing bank (i.e., cardholder 11's bank) if the merchant is a member of the issuing bank for validation and/or funding purposes (i.e., a non-account holding member of the issuing bank that has registered with the issuing bank for purposes of streamlined validation and/or funding purpose via the blockchain transacting environments disclosed herein). In the case where issuing bank and/or acquiring bank are members of a bank consortium, merchant 31 may seek validation for a proposed transaction directly from the blockchain hosted in whole or in part by any bank that is a member of the consortium if the merchant is a member of any bank in the consortium for validation and/or funding purposes (i.e., a non-account holding member of a bank within the consortium that has registered with such bank for purposes of streamlined validation and/or funding purpose via the blockchain transacting environments disclosed herein).

Additionally or alternatively, in some embodiments, as an enhanced layer of privacy, security, and protection against fraud, the a payer may confirm by providing biometric information to payee. For example, merchant 31 may (e.g., upon cardholder's consent in response to merchant 31's request) scan cardholder 11's biometric feature (fingerprint, iris, face, voice, etc.) or may read such information from cardholder 11's digital wallet (or other component). In each case, merchant 31 may obtain such information utilizing its POS device 41 (or any other component or reader communicatively coupled with its UNode 504).

Additionally or alternatively, in some embodiments, an enhanced layer of privacy, security, and protection against fraud, the a payer may confirm by providing biometric information to the blockchain through its own digital wallet. For example, cardholder 11 may (e.g., in response to merchant 31's request) scan cardholder 11's biometric feature (fingerprint, iris, face, voice, etc.) using its own digital wallet (and/or any other component of its UNode). In some embodiments the scanned information (or information derived therefrom) may be stored in the cardholder 11's digital wallet (and/or any other component of its UNode), e.g., for use in later transactions or other purposes. In some alternative embodiments, to achieve further enhanced security, the digital wallet (and/or any other component of its UNode) is configured to be prohibited from storing (e.g., in non-volatile memory) any scanned biometric information (or any information derived therefrom) within the digital wallet (and/or any other component of its UNode). In such embodiments, for enhanced security, the cardholder may be authenticated by the blockchain by scanning its biometrics through its own UNode device (in real-time or near real time, on a transaction by transaction basis) for authentication and/or final confirmation by the blockchain.

In some embodiments, as an enhanced security measure, multi-factor authentication or other security measures (e.g., a 2FA code) may be used, alone or in combination, with any of the foregoing privacy/security features.

Figure 4D:
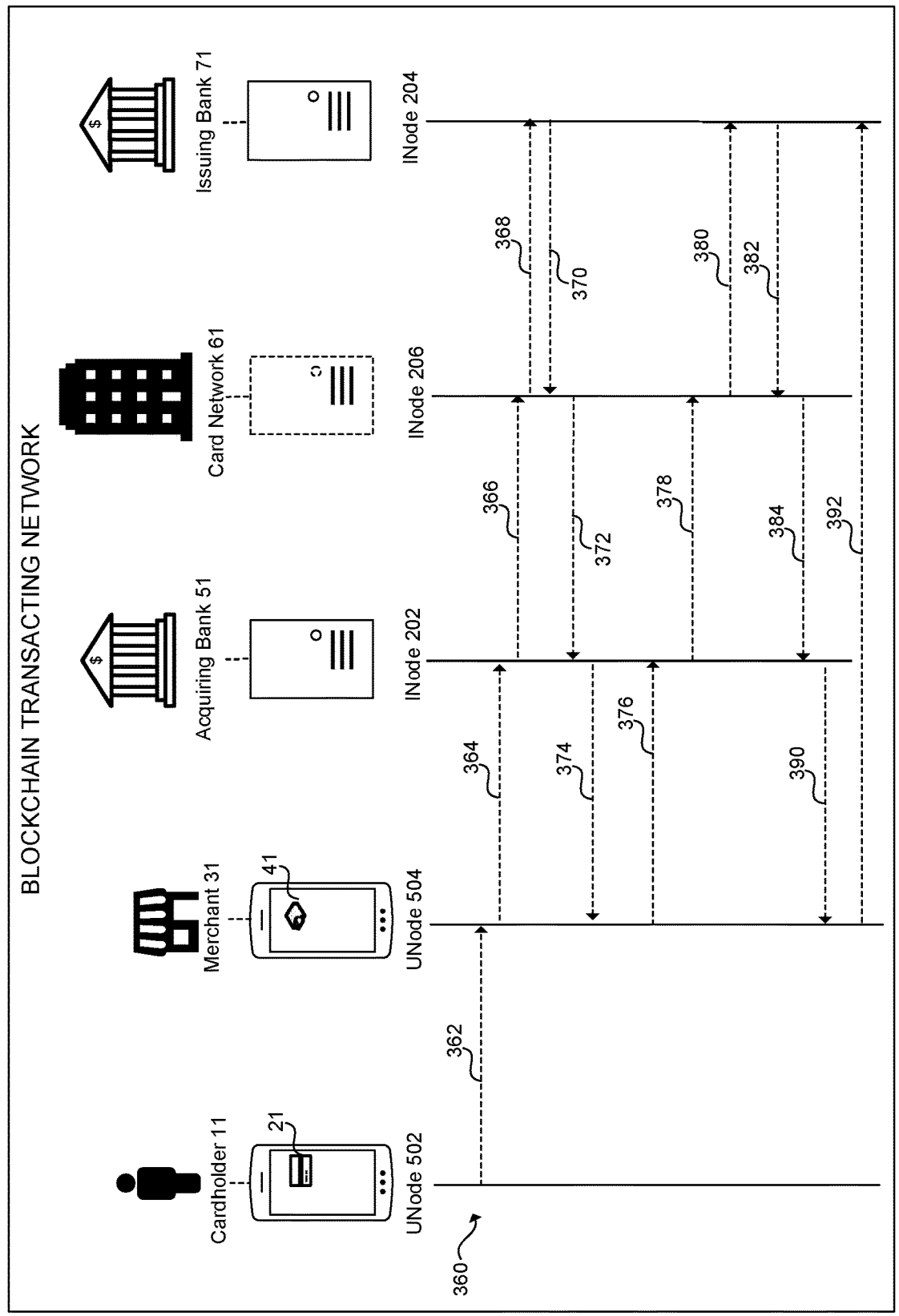
FIG. 4D illustrates elements and entities involved in another example payee-initiated token based payment card transactions in accordance with one or more embodiments of the present disclosure, and further depicts a communication flow between such entities and elements in order to complete such a card based transaction (in alternative to the flows depicted in connection with FIGS. 4A, 4B, and 4C) in accordance with one or more embodiments of the present disclosure.

FIG. 4D illustrates elements and entities involved in an example token based supported payment card transaction, and further depicts a communication flow between such entities and elements in order to complete such a card based transaction in accordance with one or more embodiments of the present disclosure. The process flow depicted in FIG. 4D may be carried out in scenarios where it is determined that, for a given transaction, the merchant's bank is not the same bank as the cardholder's bank, and/or that cardholder's bank and/or the merchant's bank are not configured or otherwise equipped to engage in secure and trusted communications and transmissions over the blockchain network (the latter scenario requiring the transaction to be supported by fiat holdings). FIG. 4D depicts a similar communications flow to that shown in FIG. 1, where this particular communications flow is only triggered after it is determined that, for a given transaction, the merchant's bank is not the same bank as the cardholder's bank, and that cardholder's bank and/or the merchant's bank are not configured or otherwise equipped to engage in secure and trusted communications, transmissions, or token based exchanges within the blockchain network environment.

At step 362, cardholder 11 presents his/her payment card 21 to the merchant 31 for payment (e.g., via POS device 41). POS device 41 acquires the payment card 21 details as the cardholder 11 presents the payment card 21 to the POS device 41. After acquiring the payment card 21 details, at step 364 the POS device 41 sends one or more such details to the acquiring bank 51. At step 366, acquiring bank 51 transmits one or more payment card 21 details to card network 61 (i.e., the card network sponsoring the issuing bank 71's issuance of token based and/or conventional card payment card 21 to cardholder 11, e.g., Visa®, Mastercard®, American Express®, etc.). The card network 61 and, at step 368, requests payment authorization from issuing bank 71 (cardholder's bank 71). The payment authorization request that card network 61 sends to issuing bank 71 may include one or more token based payment card 21 details such as, e.g., payment card number, payment card expiration date, billing address (for address verification system validation), payment card security code (e.g., CVV), and/or payment amount.

Upon receiving the payment card 21 details from card network 61, the issuing bank 71 verifies the validity of cardholder 11's payment card 21 using fraud protection tools such as the address verification service and/or card security codes such as CVV, CVV2, CVC2, CID, etc. the issuing bank 71 validates the payment card 21 number, checks the amount of available funds, matches the billing address to the one on file and validates CVV number. Issuing bank 71 approves or declines the transaction based on the aforementioned validation operations, and then, at step 370, sends a message indicating the same to the card network 61. Thereafter, at step 372, card network 61 passes the message to the acquiring bank 51. And finally, at step 374, acquiring bank 51 passes the message to the POS device 41 of merchant 31. The POS device 40 may present an "approved" or "declined" message that the cardholder 11 can view on a display of POS device 41 or cardholder 11's wallet. Once merchant 31 receives the confirmation from the cardholder 11 following the "approval" from issuing bank 71, issuing bank 71 places a hold in the amount of the purchase on cardholder 11's account. Merchant 31 may provide cardholder 11 with a receipt to complete the sale. Merchant 31's POS device 41 may collects all approved authorizations that occur using the scenario described in FIG. 4D, for a given period of time (e.g. for entire day), which it may later send in a batch for further processing.

At the end of the given time (e.g. the end of the day), at step 376 merchant 31 sends the batch of approved authorizations to acquiring bank 51 (or acquiring bank 51's acquiring processor). At step 378 acquiring bank 51 (or acquiring bank 51's acquiring processor) may route the batched information to card network 61 for settlement. At step 380, card network 61 forwards each approved transaction to the appropriate issuing bank 71 for each transaction in the batch. At step 382, issuing bank 71 withholds an interchange fee and then transfers the remaining funds to the card network 61. The card network 61 then, at step 384, distributes funds to the acquiring bank 51. Acquiring bank 51 will then, at step 390, disperse received funds into merchant 31's account after deducting its own fees. At step 392, acquiring bank 51 (and/or merchant 31) sends a confirmatory indication to issuing bank 71 that the transaction is complete. Issuing bank 71 may (or the blockchain hosted in whole or in part by the acquiring bank 51/issuing bank 71 may) then post the transaction information to cardholder 11's account. Cardholder 11 receives the statement and pays the bill.

As an alternative, it may be determined that the card network 61 is configured to engage in secure and trusted communications, transmissions, and/or token based exchanges within the blockchain transacting environment. In such scenarios a card network 61 may be associated with an INode (INode 206) and the blockchain validating the transaction may be hosted, in whole or in part, by the card network 61. Thereby, token based exchanges may occur even if, for one reason or another, UNode 502, UNode 504, INode 202 and INode 204 are not compatible to transact seamlessly without involvement of a card network 61.

Moreover, it should be noted that although the examples described with respect to FIGS. 4A-4D involve an individual presumably shopping in a merchant's store location, the examples should be equally understood to extend to the online shopping environment as well. For instance, in the context of an online sale, steps 312 and 342 (of FIGS. 4A-4C) may involve cardholder 11 inputting his payment card 21 details into a payment field on merchant 31's site (or on a third party payment processor's site) that provides an online proxy for a POS device. After acquiring the payment card 21 details via the payment card field, the process may proceed as described herein.

Moreover and additionally, in connection with the foregoing description, the embodiments of the present disclosure streamline the refund process as well. For example, in the event that the payer UNode in any of the examples shown in FIGS. 4A-4C need to seek a refund from the payee UNode for any reason (e.g., to return a product), the refunding of credit tokens and/or debit tokens to the payer UNode's digital wallet may be much quicker than the refunding of an amount of fiat currency access to the payer's traditional credit line of fiat currency. In particular, the refund process can simply follow one or more of the same steps in FIGS. 4A-4C except where the role of the merchant 31 and the cardholder 11 become reversed such that the UNode may receive an almost immediate refund in the form of tokens, which they can then immediately spend elsewhere or exchange for fiat cash. For example, referring to FIGS. 4A-4C, in the refund example the merchant 31 and UNode 504 may be understood to swap positions with the cardholder 11 and UNode 502 for purposes of the process flow diagram. Merchant 31 may operate as the cardholder 11 did in the original transaction, and cardholder may operate as the merchant 31 did in the original transaction. In other embodiments, where merchant 31/UNode 504 and cardholder 11/UNode 502 maintain their relative positions for purposes of the process flow diagram, a refund may be carried out by simply following one or more of the same steps illustrated in FIGS. 4A-4C but in the reverse order and/or where the communication flow is in the opposite direction. Indeed, any of the steps in FIGS. 4A-4C may be performed in any order to achieve a given transaction (whether an original transaction or a refund) as may be desired by the network and/or its participants.

In some embodiments, the refund is initiated by the merchant 31 sending tokens directly back to the cardholder 11 (via their respective digital wallets), together with a notice to the issuing bank 71 concerning the refund. In some embodiments, the issuing bank 71 may elect not to charge interest on credit tokens that are refunded in this manner. In some embodiments, the refund is initiated by merchant 31 sending the tokens directly to the issuing bank 71, together with a notice to the issuing bank 71 concerning the refund. The issuing bank 71 may then in turn replenish the digital wallet of the cardholder 11 with the corresponding amount of tokens. The notice from the merchant to the issuing bank 71 concerning the refund may be used by the issuing bank to differentiate between tokens that are being refunded to the cardholder 11 and tokens that the merchant spends in another transaction that happens to include the original cardholder 11 (such that the original tokens that the cardholder 11 sent to the merchant 31 in the first transaction are later sent back to the cardholder 11 from the merchant 31 as a second transaction). Issuing bank 71 may have an interest in such differentiation depending on how the issuing bank 71 imposes interest fees for different uses of tokens.

(2) Payer Initiated Token Based Payment Card Transactions

In some embodiments, the blockchain supported transaction systems, methods and process flows may be further streamlined where merchant 31 provides to cardholder 11 one or more transaction code(s) such as a QR code, bar code, etc. (e.g., via their UNode 504, or as printed on a receipt, or on a tag or sticker attached to an item, or provided on a terminal with a display of any kind) associated with a given transaction such that the cardholder 11 may scan (e.g., via a camera linked to their digital wallet interface or application made available through their UNode 502) or otherwise read (e.g., via Bluetooth® or other communication protocols and/or other IOT mechanisms) the one or more transaction code(s) and reduce and/or avoid the need for the POS device 41 (and/or the processor associated with the POS device 41) and/or various communications that might otherwise involve the merchant 31 (such as communications between the merchant 31 and the merchant 31's processor).

The transaction code(s) presented to the cardholder 11 may include information indicating one or more of: (i) the entity-agnostic token amount required to purchase one or more item(s), service(s), or other offering(s) that are the subject of a proposed transaction (the amount may or may not include taxes, transaction related fees, discounts, etc.); (ii) the entity-specific token amount required to purchase one or more item(s), service(s), or other offering(s) that are the subject of a proposed transaction (the amount may or may not include taxes, transaction related fees, discounts, etc.); (iv) the fiat-currency amount required to purchase one or more item(s), service(s), or other offering(s) that are the subject of a proposed transaction (the amount may or may not include taxes, transaction related fees, discounts, etc.); (v) the merchant 31's preferred form of payment for one or more item(s), service(s), or other offering(s) that are the subject of a proposed transaction; (vi) an identifier associated with the transaction networks the merchant 31 participates in, (vii) an identifier associated with the foreign and/or domestic banks or other financial institutions the merchant 31 holds accounts with, (viii) an identifier associated with blockchain consortiums (e.g., a bank consortium) that those entities identified in (vii) are a part; and/or (ix) the merchant 31's bank account details wherein funds (fiat funds or token funds) may be transferred in connection with the proposed transaction.

For transactions in such scenarios, once cardholder 11 receives the transaction code and after the amount of the transaction is obtained (either by the cardholder 11 entering the amount responsive to a prompt triggered at the cardholder 11's UNode 502 upon scanning the transaction code, or reading/syncing the cardholder 11's and merchant 31's UNode devices (such as via Bluetooth® or other communication protocols and/or other TOT mechanisms)), the amount of the transaction may be auto-populated based on the information acquired from the one or more transaction code(s) received, and/or the amount may be authorized and the transaction validated directly via the cardholder 11's UNode 502 (e.g., through a digital wallet application), and thereby reducing the involvement of the merchant 31's POS device 41 (or the processor associated with the POS device 41) and further streamlining the process. For example, the blockchain hosted by the issuing bank (or bank consortium where issuing bank is a member and/or where merchant's bank is a member) may validate and/or process the transaction based on any one or more of the details provided via the UNode 502 (e.g., the transaction amount, the wallet ID, the merchant 31's bank information, etc.). Upon validation by the relevant blockchain, the amount of tokens may be transferred (in real-time or near real-time) from cardholder 11's digital wallet (hosted by either the UNode 502 and/or INode 204) and/or bank account at issuing bank 71 into merchant 31's digital wallet (hosted by either the UNode 504 and/or INode 202) and/or account at acquiring bank 51, respectively.

In some embodiments, the merchant 31 may simply scan or read/sync the cardholder 11's biometric information (e.g., by merchant 31 scanning (e.g., via its digital wallet and/or POS device) cardholder 11's biometric information from cardholder 11's biometric features, or by reading/syncing the merchant 31's digital wallet (and/or POS device) with the cardholder 11's digital wallet application (or POS device)) for authorization and/or confirmation of the transaction directly via the cardholder 11's biometric information and/or UNode 502 (e.g., through a digital wallet application). For example, the blockchain hosted by the issuing bank (or bank consortium where issuing bank is a member and/or where merchant's bank is a member) may validate and/or process the transaction based on any one or more of the details provided via the UNode 502 (e.g., the transaction amount, the wallet ID, the merchant 31's bank information, biometric information, etc.). Upon validation by the relevant blockchain, the amount of tokens may be transferred (in real-time or near real-time) from cardholder 11's digital wallet (hosted by either the UNode 502 and/or INode 204) and/or bank account at issuing bank 71 into merchant 31's digital wallet (hosted by either the UNode 504 and/or INode 202) and/or account at acquiring bank 51, respectively.

Additionally or alternatively, in some embodiments, an enhanced layer of privacy, security, and protection against fraud, the a payer may confirm by providing biometric information to the blockchain through its own digital wallet. For example, cardholder 11 may (e.g., in response to merchant 31's request) scan cardholder 11's biometric feature (fingerprint, iris, face, voice, etc.) using its own digital wallet (and/or any other component of its UNode). In some embodiments the scanned information (or information derived therefrom) may be stored in the cardholder 11's digital wallet (and/or any other component of its UNode), e.g., for use in later transactions or other purposes. In some alternative embodiments, to achieve further enhanced security, the digital wallet (and/or any other component of its UNode) is configured to be prohibited from storing (e.g., in non-volatile memory) any scanned biometric information (or any information derived therefrom) within the digital wallet (and/or any other component of its UNode). In such embodiments, for enhanced security, the cardholder may be authenticated by the blockchain by scanning its biometrics through its own UNode device (in real-time or near real time, on a transaction by transaction basis) for authentication and/or final confirmation by the blockchain.

In some embodiments, as an enhanced security measure, multi-factor authentication or other security measures (e.g., a 2FA code) may be used, alone or in combination, with any of the foregoing privacy/security features.

In some embodiments, before validating the proposed transaction with the relevant blockchain, the cardholder 11's UNode 502 may perform a pre-validation operation wherein one or more components of the UNode first determines if the cardholder 11's digital wallet includes sufficient funds (e.g., on a pre-selected token based payment card 21 and/or on any token based payment card 21 held in the digital wallet that may be used to achieve a real time transfer of a sufficient number of tokens). In the event that the proposed transaction fails the pre-validation operation, the process may be discontinued without imposing the computational burden of a bound-to-fail validation request to the relevant blockchain. In the event that the proposed transaction passes the pre-validation operation, the process may continue.

Where the cardholder 11's digital wallet is hosted by UNode 502, the transfer may be reflected (in real-time or near real-time) in the token holdings hosted at the UNode 502. Where the cardholder 11's digital wallet is hosted by INode 204, the transfer may be reflected (in real-time or near real-time) in a viewable representation of the digital wallet provided at the UNode 502. Similarly, where the merchant 31's digital wallet is hosted by UNode 504, the transfer may be reflected (in real-time or near real-time) in the token holdings hosted at the UNode 504. Where the merchant 31's digital wallet is hosted by INode 202, the transfer may be reflected (in real-time or near real-time) in a viewable representation of the digital wallet provided at UNode 504.

Upon verifying that the amount deposited is the amount required for the proposed transaction, the transaction may be considered completed and merchant 31 may then generate a final receipt (electronic or physical) and deliver the product(s), service(s), or other offering(s) to the cardholder 11.

In some embodiments of the present disclosure, where token based payment card details are sent to a blockchain hosted in whole or in part by a consortium of financial institutions, one or more (or all) personal identifiable information (e.g., the name of the cardholder) are removed, encrypted, or otherwise made unviewable and/or inaccessible to all of the financial institutions of the consortium except, if at all, to the financial institution that issued the token based payment card to the cardholder and with whom the cardholder maintains an account.

It should further be noted that, in some embodiments, a payee that is paid in tokens of the present disclosure, may elect to spend the tokens elsewhere within the blockchain transacting environment instead of electing to cash out the tokens with the second bank. In this way, the spending power of the merchant may be realized immediately upon receiving the tokens from the cardholder (insofar as other payees are willing to receive such tokens), and the lag time experienced between the transaction timing and the actual receipt of cash in one's account in the traditional environment may be avoided. In such situations, any payee that receives the tokens in the blockchain transacting environment can, whenever desired, exchange the tokens for cash directly at the issuing bank 71 or indirectly through acquiring bank 51.

Figure 5:
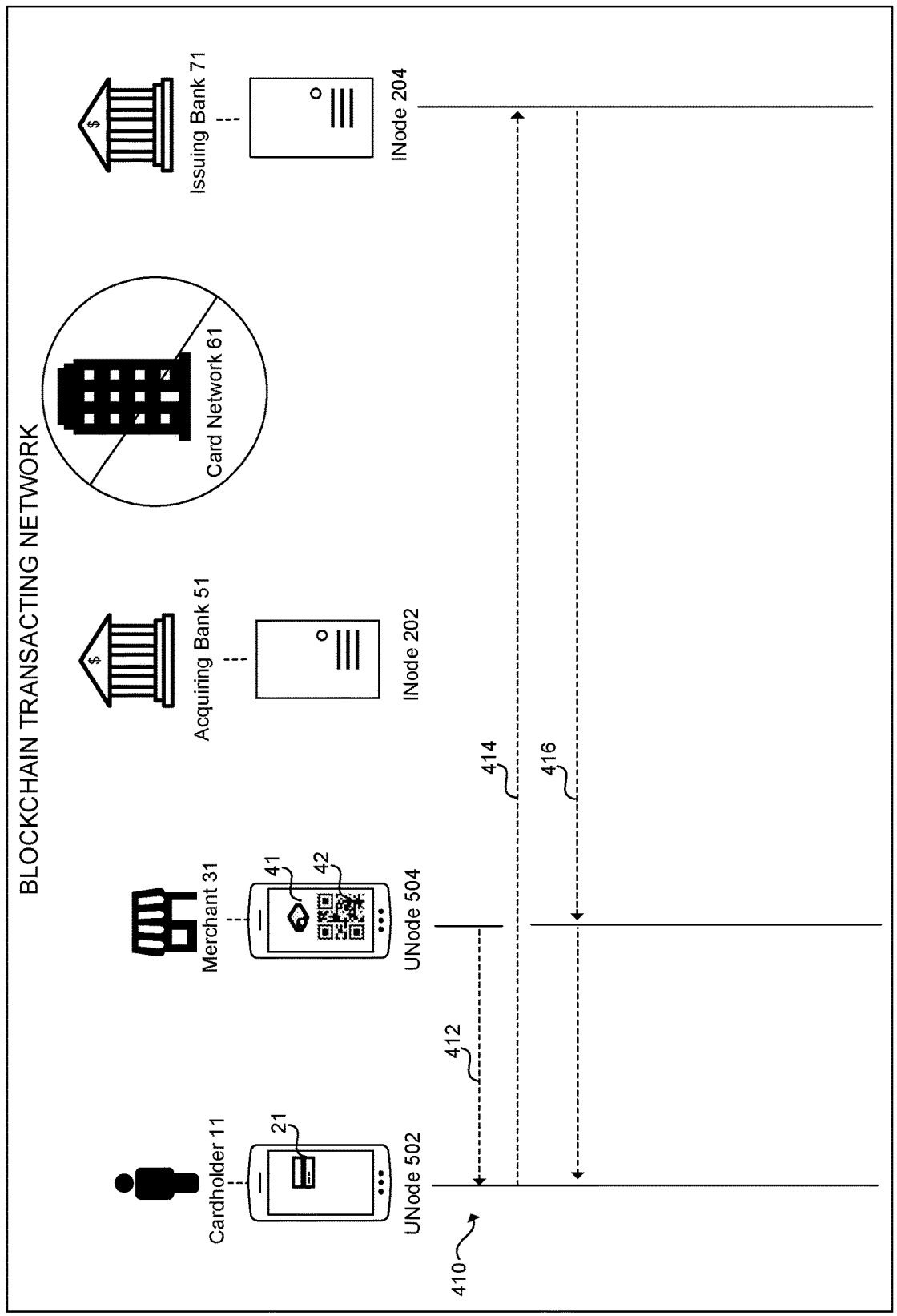
FIG. 5 illustrates elements and entities involved in an example payer-initiated token based payment card transactions, enabled by the blockchain transacting environment architectures (illustrated in FIGS. 2A-2C) in accordance with one or more embodiments of the present disclosure.

FIG. 5 illustrates elements and entities involved in an example payer-initiated token based payment card transactions, enabled by the blockchain transacting environment architectures (illustrated in FIGS. 2A-2C) in accordance with one or more embodiments of the present disclosure. FIG. 5 further depicts an example communication flow between such entities and elements in order to complete such a transaction in accordance with one or more embodiments of the present disclosure. As described in more detail below, the process flow depicted in FIG. 5 may be carried out in scenarios where: the payer (e.g., the cardholder 11 in the depicted example) initiates (hence, payer initiated) a credit token transfer by obtaining a transaction code from the payee (e.g., the merchant 31 in the depicted example), and/or communicating directly with the blockchain hosted in whole or in part by its own bank (e.g., the cardholder 11's bank, i.e., issuing bank 71 in the depicted example) or a directly with the blockchain hosted in whole or in part by any member of a bank consortium of which its own bank is a member, in each case to obtain approval or otherwise validate the use of the token based payment card for the proposed transaction for the benefit of the merchant 31.

As described in more detail below, the process flow depicted in FIG. 5 may be carried out in scenarios where it is determined that, for a given transaction, the merchant's bank is the same bank as the cardholder's bank.

As shown, the elements and entities involved include cardholder 11 who possesses token based payment card 21, merchant 31 who possesses POS device 41, acquiring bank 51 and issuing bank 71 (which in this example are the same bank). Significantly, this entire process flow is accomplished without communicating with a card network (e.g., card network 60, depicted in FIG. 1), and only involves a single bank.

As further shown in FIG. 5, each of cardholder 11, the token based payment card 21, merchant 31 (who generates and/or provides a transaction code 42 associated with one or more product(s), service(s), or other offering(s)) and who may also possesses POS device 41 POS device 41), and acquiring bank 51/issuing bank 71 are associated with a node of a blockchain transacting environment such as blockchain transacting environment 100 introduced in FIG. 2A.

Cardholder 11 is a network participant on the blockchain network who possesses one or more computing devices operating as a node of the blockchain network (UNode 502), and which may further have access to, or even embody, cardholder 11's token based payment card 21. Indeed, in some embodiments, token based payment card 21 may be embodied, in whole or in part, on the node (e.g., as an electronic payment card, or an electronic counterpart to a physical payment card). In some embodiments, the payment card may comprise a QR code, a barcode, a number, a mobile app, an RFID, another code or ID of any kind (e.g., with Bluetooth or IOT capabilities), or any other electronic or physical object that may be linked to the cardholder 11's digital wallet (which may be hosted by the UNode 502 and/or issuing bank 71).

Merchant 31 is a network participant on the blockchain network who possesses one or more computing devices operating as a node of the blockchain network, and which may further have access to, or even embody, merchant 31's POS device 41. As noted previously, in some embodiments, POS device 41 may be embodied, in whole or in part, within merchant 31's UNode 504 (i.e., an integrated POS device). In some embodiments, the POS device 41 may be a separate POS device, such as a card reader, linked to the merchant 31's digital wallet (which may be hosted by acquiring bank 51) in UNode 504 (i.e., a separate POS device).

In some embodiments a digital wallet is an electronic wallet stored in a computing device (e.g., a computer, or server) associated with the UNode connected to the bank account linked thereto. Merchant 31 may further generate and/or provide transaction code(s) 42 that may be made available to cardholder in connection with a given transaction such that the cardholder 11 may scan (e.g., via a camera linked to their digital wallet interface or application made available through their UNode 502) or otherwise receive (e.g., via transmission or syncing using a communications protocol or mechanism such as Bluetooth®, cellular, TOT, etc.) the one or more transaction code(s) 42, or and obtain information relevant to complete a given transaction. Such transaction code(s) 42 presented by the merchant 31 to the cardholder 11 may include information indicating one or more of: (i) the entity-agnostic token amount required to purchase one or more item(s), service(s), or other offering(s) that are the subject of a proposed transaction (the amount may or may not include taxes, transaction related fees, discounts, etc.); (ii) the entity-specific token amount required to purchase one or more item(s), service(s), or other offering(s) that are the subject of a proposed transaction (the amount may or may not include taxes, transaction related fees, discounts, etc.); (iv) the fiat-currency amount required to purchase one or more item(s), service(s), or other offering(s) that are the subject of a proposed transaction (the amount may or may not include taxes, transaction related fees, discounts, etc.); (v) the merchant 31's preferred form of payment for one or more item(s), service(s), or other offering(s) that are the subject of a proposed transaction; (vi) an identifier associated with the transaction networks the merchant 31 participates in, (vii) an identifier associated with the foreign and/or domestic banks or other financial institutions the merchant 31 holds accounts with, (viii) an identifier associated with blockchain hosted by a bank consortium that those entities identified in (vii) are a part; and/or (ix) the merchant 31's bank account details wherein funds (fiat funds or token funds) may be transferred in connection with the proposed transaction.

Such transaction code(s) 42 may be made available to cardholder 11 by merchant 31 in many forms. For example, a merchant may generate a transaction code 42 upon checking out a customer in a checkout line after the merchant 31 scans individual QR codes, barcodes, IOT related codes, RFID labels (or other codes) all of the product(s) a cardholder 11 has selected for purchase, for example. In such an example the transaction code 42 may comprise a QR code, a bar code, IOT related codes, RFID labels or other code that is shown on the reflects the entire purchase (e.g., the collection of items chosen for purchase by the user and brought to the checkout). The merchant 31 may present the transaction code 42 to the cardholder 11 via a display screen (e.g., a display screen on their POS device 41, or other screen) that the cardholder 11 may then utilize their UNode 502 to scan. In other embodiments, the merchant 31 may present the transaction code 42 to the cardholder 11 by printing out an initial receipt for the user that has the transaction code printed directly on it such that the cardholder 11 may then utilize their UNode 502 to scan. In other embodiments, the merchant 31's UNode 504 may communicate the transaction code 42 to cardholder 11's UNode 502 via transmission or syncing using a communications protocol or mechanism such as Bluetooth®, cellular, IOT, etc. to enable UNode 502's digital wallet to sync with or otherwise obtain the transaction code and/or details from UNode 504 (e.g., through a POS device 41, through merchant 31's digital wallet, or otherwise).

In FIG. 5, the node associated with cardholder 11 and token based payment card 21 is referred to as UNode 502. The node associated with merchant 31 and POS device 41 is referred to as UNode 504. The node associated with acquiring bank 51 is referred to as INode 202, and the node associated with issuing bank 71 is referred to as INode 204. The communication flow depicts a flow of information occurring between entities and/or elements of the blockchain network (via the blockchain network), in the course of completing a blockchain based payment card transaction over the blockchain network. During the course of completing a token based payment card transaction over the blockchain network, one or more elements of the blockchain network (e.g., UNode 502, Unode 504, INode 202/204) may operate on information it receives from another element or entity of the network, and then communicate such information (or information derived therefrom or reflecting determinations made thereon) to another element or entity of the network.

At step 412, merchant 31 presents a transaction code 42 to the cardholder 11, wherein the transaction code 42 corresponds to one or more product(s), service(s), and/or offering(s) corresponding to a particular purchase that the cardholder 11 desires to make Merchant 31 may present the transaction code 42 to the cardholder 11 in any manner as described above. The cardholder 11 scans (e.g., via its UNode 502), syncs, and/or otherwise obtains the transaction code and acquires the transaction related information provided therein. Such information may include, for example, one or more of: (i) the entity-agnostic token amount required to purchase the one or more item(s), service(s), or other offering(s) that are the subject of a proposed transaction (the amount may or may not include taxes, transaction related fees, discounts, etc.); (ii) the entity-specific token amount required to purchase the one or more item(s), service(s), or other offering(s) that are the subject of a proposed transaction (the amount may or may not include taxes, transaction related fees, discounts, etc.); (iv) the fiat-currency amount required to purchase the one or more item(s), service(s), or other offering(s) that are the subject of a proposed transaction (the amount may or may not include taxes, transaction related fees, discounts, etc.); (v) the merchant 31's preferred form of payment for the one or more item(s), service(s), or other offering(s) that are the subject of a proposed transaction; (vi) an identifier associated with the transaction networks the merchant 31 participates in, (vii) an identifier associated with the foreign and/or domestic banks or other financial institutions the merchant 31 holds accounts with, (viii) an identifier associated with the blockchain hosted by a bank consortium that those entities identified in (vii) are a part; and/or (ix) the merchant 31's bank account details wherein funds (fiat funds or token funds) may be transferred in connection with the proposed transaction.

Once the details of the transaction code 42 have been received at UNode 502, the cardholder 11 may be provided an indication of the details and confirm (via the digital wallet of the UNode 502) its desire to proceed with the proposed transaction. In some embodiments, because the blockchain hosted by the issuing bank (or by a consortium of banks of which issuing bank is a member) concurrently reflects the cardholder 11's token balances in the digital wallet of the cardholder 11's UNode 502, the UNode 502 may self-validate the amount of the proposed transaction itself and may cause the designated amount of tokens to be transferred from the cardholder 11's digital wallet into the merchant 31's digital wallet. In other embodiments, the merchant may require some additional validation from the blockchain hosted in whole or in part by cardholder 11's bank (issuing bank 71), in which case the UNode 502 may, at step 414, transmit one or more details of the proposed transaction to issuing bank 71's INode 204, and request an approval for the cardholder 11's use of the token based payment card 21 in connection with the proposed transaction. Based on the details transmitted, the blockchain hosted by issuing bank 71 (or hosted by a bank consortium of which issuing bank 71 is a member) may validate that the cardholder 11's token based payment card 21 may be used in connection with the proposed transaction. The details may include an address for merchant 31's UNode 504. The blockchain hosted in whole or in part by the issuing bank 71 may (e.g., via its INode 204), at step 416, transmit an indication of approval to UNode 504 and/or UNode 502. Upon receiving approval/confirmation, UNode 502 may issue a command to cause the cardholder 11's digital wallet to issue a transfer of the designated amount of credit tokens from the cardholder 11's digital wallet into the merchant 31's digital wallet (regardless of whether the merchant 31's digital wallet is hosted by the merchant 31's UNode 504 or the merchant 31's acquiring bank 51). Such a command may, in the case where the cardholder 11's credit tokens and/or digital wallet is hosted by UNode 502, cause a direct transfer of the designated amount of credit tokens from the cardholder 11's digital wallet into the merchant 31's digital wallet via their respective UNodes. Alternatively, such a command may, in the case where the cardholder 11's credit tokens and/or digital wallet is hosted by issuing bank 71's INode 204, cause an indirect transfer of the designated amount of credit tokens from the cardholder 11's digital wallet into the merchant 31's digital wallet, and involve issuing a command to the issuing bank 71 to cause the correct amount of tokens to be transferred from the cardholder 11's digital wallet to the merchant 31's digital wallet in real-time (or near real time).

The blockchain that validated the proposed transaction may record the transaction and then cause, or provide information relied upon for information to cause, updated credit token balances to be reflected in the cardholder 11's digital wallet and the merchant 31's digital wallet. Once the credit tokens are received into the merchant 31's digital wallet, merchant 31 may use the credit tokens in any manner desired (e.g., exchange for fiat cash, spend in another transaction with another network participant, hold in her digital wallet, move into a specific account held by her digital wallet, etc.).

Due at least to the issuing bank 71's immediate knowledge of cardholder 11, and/or the more comprehensive knowledge the blockchain hosted by the issuing bank 71 (or hosted by a bank consortium where issuing bank 71 is a member) may maintain in connection with the cardholder 11 (and the cardholders token and/or fiat holdings), the payer-initiated payment card transactions (that may occur in accordance with FIG. 5 and variations thereof) enable a more efficient process than that the payee-initiated payment card transactions (that may occur in accordance with FIGS. 4A-4D and variations thereof), a prospective payee (e.g., merchant 31) may desire to request that a prospective payer (e.g., cardholder) initiate the payment card transaction consistent with that described in connection with FIG. 5. To achieve this functionality, a prospective payee node (UNode 504) may be configured (e.g., via a digital wallet application or otherwise) to transmit a request to a prospective payer node (UNode 502) to initiate a payment card transaction. Such a request may itself include a transaction code, which may or may not be selectable by the cardholder 11 to initiate the payment card transaction. Additionally or alternatively, in some embodiments, as an enhanced layer of privacy, security, and protection against fraud, the payee may confirm by providing biometric information to payer (or vice versa). For example, cardholder 11 may (e.g., upon merchant 31's consent in response to cardholder 11's request) scan merchant 31's biometric feature (fingerprint, iris, face, voice, etc.) or may read such information from cardholder 11's digital wallet (or other component). In each case, cardholder 11 may obtain such information utilizing any component of its UNode (or any other component or reader communicatively coupled with its UNode 502).

Consistent with the foregoing, the traditional process for validating, processing, recording, clearing and settling may be avoided. Moreover, the involvement of a POS device at a merchant 31 may be reduced and/or entirely eliminated. Further still, on account of the blockchain's knowledge of account balances and token holdings of network participants, which are reflected in the cardholder 11's digital wallet, in some embodiments the process flow described above in connection with FIG. 5 may occur in real time, thereby avoiding lag times commonly seen in conventional platforms. Thus, in some embodiments, a merchant 31 may receive actual payment in credit tokens, reflected in its digital wallet in real time (or in near real time), which it can then send directly to the issuing bank 71 in real time (or within certain designated period), and then receive funds from the issuing bank in real time (or near-real time) if the same bank, or before cut off time if different banks, thereby avoiding or reducing lag times experienced in traditional processes. In some such embodiments, the transaction is only considered complete (and thereby allow the cardholder to, e.g., leave the store with the products) when the merchant 31 can confirm that the correct number of tokens has been deposited into their account and/or digital wallet. In some embodiments UNode 502's tokens may be sent or withdrawn by the same issuing bank 71/acquiring bank 51 and the same amount of fiat funds may be transferred to merchant 31's bank account (held at acquiring bank 51) in real time (or near real time) and merchant 31 may receive a notice of fiat money transfer indicating the transaction is complete.

It should be appreciated that, for all of the embodiments described in connection with FIGS. 2A-9, once merchant 31 receives credit tokens in its digital wallet, he may (i) complete the sale by generating final receipt, (ii) cash out or otherwise exchange for fiat-currency the tokens in real time or in batches directly by sending the credit tokens to the cardholder's bank (issuing bank 71), or (iii) cash out or otherwise exchange for fiat-currency the credit tokens in real time or in batches indirectly by sending the credit tokens to the merchant's bank (acquiring bank 51). In the case where the merchant 31 and cardholder 11 share the same bank, merchant 31 may cash out or otherwise exchange the credit tokens for fiat currency any time.

In situations where a merchant 31 receives credit tokens minted by a bank (issuing bank 71) that is domiciled in different jurisdiction than where the transaction took place, the merchant 31 may send the credit tokens to its own bank (acquiring bank 51), and the acquiring bank may exchange the credit tokens with the issuing bank 71 on behalf of merchant 31, and then allocate the fiat funds to the merchant 31's bank account. Alternatively, merchant 31 may elect to send the credit tokens directly to the foreign issuing bank 71 for exchange (together with the merchant 31's bank account information), and the foreign issuing bank 71 may in turn exchange the received credit tokens for fiat cash and may deposit the fiat cash directly into the merchant's bank account at the acquiring bank 51. Depending on fees that may be associated with either of the foregoing processes, one may be more favorable than the other.

In some embodiments, one or more of the elements depicted in FIGS. 2A-2E, FIGS. 4A-4C, and/or FIG. 5 may be configured to make any one of the determinations described herein. Moreover, in some embodiments, one or more of the elements depicted in FIGS. 2A-2E, FIGS. 4A-4C, and/or FIG. 5 may be configured to make any one or more additional determinations to enhance efficiencies, enhance rewards, lower interest, etc.

For example, in either the payer or payee initiated sequence, UNode 502 and/or 504 may be configured to automatically select (or prioritize or recommend selection) of one of multiple blockchain based payment cards in a cardholder's digital wallet based on any one or more of: (i) the balance in the cardholder's account that is linked to one blockchain based payment card relative to the others, and/or (ii) the number of bonus points that may be obtained by using one blockchain based payment card relative to the others, and/or (iii) the interest may be incurred by using one blockchain based payment card relative to the others, and/or (iv) the number of available debit tokens may be accessed by using one blockchain based payment card relative to the others, and/or (v) the impact on the cardholder's FICO score (or other credibility score) that may occur by using one blockchain based payment card relative to the others, and/or (vi) information associated with a transaction code for a proposed transaction (e.g., based on incentives associated therewith), and/or (vii) the entity-specific token preferences of the merchant 31, (viii) the entity-agnostic token preferences of the merchant 31, (ix) the entity-specific token preferences of a third party to whom the merchant 31 may owe payment for an unrelated transaction, and/or (x) the entity-agnostic token preferences of a third party to whom the merchant 31 may owe payment for an unrelated transaction, including those that would incur the least amount of fees, and/or (xii) a relationship between merchant 31 and a financial institution and/or a consortium of financial institutions, and/or (xiii) a relationship between cardholder 11 and a financial institution and/or a consortium of financial institutions, and/or (xiv) a relationship between merchant 31's bank and another financial institution and/or a consortium of financial institutions, and/or (xv) a relationship between cardholder 11's bank and a financial institution and/or a consortium of financial institutions, and/or (xvi) the jurisdiction-specific currency applicable to the given transaction (or preferred by the merchant's bank (acquiring bank) and/or the cardholder's bank (issuing bank) and/or a bank consortium of which either or both is a member, (xvii) the jurisdiction specific currency that would incur the least amount of fees (e.g., based on the location the transaction is deemed to take place), and/or (xviii) exchange rates applicable to the given transaction, including those that would incur the least amount of fees, and/or (xix) one or more balances in the merchant's one or more bank accounts that are linked to its digital wallet, (xx) the interest being incurred by balances in one or more of the merchant's bank accounts that are linked to its digital wallet (xxi) the impact on the merchant's FICO score (or other credibility score) that may occur by applying the received credit tokens to one or more of merchant's bank accounts and/or credit lines relative to the option of holding the credit tokens in a deposit account for use at a later time, and/or (xxii) the identity of the banks that minted the tokens held in the accounts associated with the various blockchain based payment cards in the cardholder's wallet, (xxiii) the relationship between the merchant's bank and the banks holding the accounts associated with the various blockchain based payment cards in the cardholder's wallet, (xxiv) information associated with a transaction code for a proposed transaction (e.g., based on incentives associated therewith) and/or (xxv) any other factor of significance to either or both of the cardholder (payer) and the merchant (payee).

In some embodiments, the selection or recommendation of the token based payment card for a particular transaction may be based on mutual input from both the cardholder 11's UNode 502 and merchant 31's UNode 504. For example, suppose the digital wallet of cardholder 11's UNode 502 hosted five different cards, one from Bank A which had a 1% interest applicable to Bank A-specific credit tokens, one from Bank B which had a 2% interest applicable to Bank B-specific credit tokens, and the other three of which—from Banks C, D, and E—had a 5%, 7%, and 12% applicable interest rate respectively. Suppose further that Bank B is merchant 31's acquiring bank, and as a way to incentivize participants to use Bank B's credit tokens, Bank B covers any transaction costs and provides free exchange of Bank B-specific credit tokens to merchant 31. Suppose further that Merchant 31 must pay a fee of 2% to exchange Bank A, C, D, or E specific tokens through each respective bank or through the acquiring bank (Bank B). In this scenario, UNode 502's digital wallet may automatically select and/or prompt cardholder 11 that use its Bank A-specific credit tokens will incur the lowest interest rate owed to Bank A for use of the tokens. However, UNode 502 and UNode 504 may exchange preference information such that UNode 504 may inform UNode 502 that, of the available token based payment card's in UNode 502's wallet, merchant 31 prefers Bank B-specific tokens and is willing to offer cardholder 11 a 1% discount on the proposed transaction of cardholder 11 will pay merchant 11 with Bank B specific tokens. The digital wallet of UNode 502 may prompt cardholder 11 to provide the proposed alternatives for payment—i.e., payment with Bank A-specific tokens at a 1% interest rate (which may only be applicable after a given grace period) with no discount, or payment with Bank B-specific tokens at a 2% interest rate (which may only be applicable after a given grace period) with a 1% discount off of the total sale price. Cardholder 11 may manually select, or may configure his/her digital wallet to automatically select (based on predefined rules), among the options presented via the digital wallet. The cardholder 11 may select to pay with the token based payment card associated with his Bank B-specific tokens, knowing that he can pay the balance off within the grace period, and therefore realize a 1% discount that he would not have otherwise realized if he had used Bank-A. With the intelligent card selection considerations of the present disclosure, payers and payees can conduct transactions with token funds (and similarly with fiat funds, applying the same to a simple fiat based credit card) that satisfy mutually beneficial interests of both the cardholder and the merchant. In some instances, only one digital wallet will have predefined preferences, or a user may configure their digital wallet application to not consider other factors beyond the factors identified specifically by the owner of the digital wallet, and in those instances it may be that the digital wallet identifies a single token based payment card to achieve the best (or near best) outcome for the cardholder based on the predefined preferences, and the digital wallet application will automatically select such token based payment card and may proceed with the transaction without displaying multiple options to the cardholder 11.

The foregoing is just one example to provide an illustration of a mutual selection/recommendation that drives the decision as to which token based payment card may be used for a given transaction. However, the foregoing is not meant to be a limiting example, and it should be appreciated that, upon reviewing the technology of the present disclosure, those skilled in the art will understand the wide range of considerations (e.g., including one or more of (i)-(xxv) above, and combinations and priorities of such considerations) that may be implemented to drive the decision as to which token based payment card may be used for a given transaction. The immense intelligence and advantages disclosed by the digital wallets of the present disclosure, and the great advantages of intelligently selecting which token based payment card to use for a given transaction where the selection is based on considerations relevant to either or both the cardholder 11 and/or the merchant 31, will be immediately appreciated by those of skill in the art upon reading the present disclosure.

In some embodiments, UNode 504 may, upon being given access or information to the cardholder's digital wallet, be configured to automatically recommend (or prioritize a recommendation) which of multiple blockchain based payment cards in a cardholder's digital wallet should be used, including based on any of (i)—(xxv) considerations noted above.

In another example, UNode 504 may be configured to, upon receiving credit tokens from a payer, automatically select (or prioritize) movement of one or more such credit tokens into an account (e.g., in the form of payment or otherwise) based on (i) the various balances in the merchant's accounts that are linked to its digital wallet relative to the others, (ii) the interest being incurred by balances in one or more of the merchant's accounts that are linked to its digital wallet (iv) the impact on the merchant's FICO score (or other credibility score) that may occur by applying the received credit tokens to one or more of merchant's credit lines relative to the option of holding the credit tokens in a deposit account for use at a later time.

In still further embodiments, merchant 31 may prefer to be paid in local token currency rather than foreign token currency. For example, a European merchant 31 may prefer to be paid in European Euro credit tokens rather than US USD credit tokens, and vice versa. Merchant 31's preferences may be based on additional time and/or fees that may be incurred if it (or the bank with whom it chooses to exchange) is required to exchange multijurisdictional currencies and/or tokens before it gets paid. In such situations, cardholder 11 may, via its UNode, skinny transaction code presented to it by the merchant 31, the transaction code providing information regarding one or more options in connection with the types of currency the cardholder 11 may use to complete the transaction. In some embodiments, merchant 31 only provides cardholder 11 with a single option, mandating that the cardholder 11 supply jurisdiction specific tokens that meet merchant 31's jurisdiction specific requirements. In some embodiments, merchant 31 may allow cardholder 11 to choose among a plurality of types of jurisdiction specific tokens with which to complete the payment. In connection with each type of jurisdiction specific token, merchant 31 may present different payment amounts that may be required. The different payment amounts may be based upon a given exchange rate provided by the issuing bank 71 and/or merchant's acquiring bank 51 and/or any associated fees for making the exchange with a particular jurisdiction specific token or fiat. In some embodiments, the different payment amounts may be based upon an exchange rate agreed upon by members of a bank consortium (where is a bank consortium that host the blockchain needed for validation) that may be extended to cardholder 11 in connection with the transaction. In some embodiments, merchant 31 may via its Unode or via a POS device connected thereto, present the cardholder 11 with the amount of the transaction in the local currency (or the preferred currency), side-by-side with equivalent amount of the transaction in the jurisdiction specific currency with which cardholder 11 may complete the transaction, based on the exchange rate. Merchant 31 may also display, in the same manner, an indication of fees and/or processing costs associated with any exchanges of foreign-currency that may be required to complete the purchase and/or settle the transaction.

Upon cardholder 11 making its selection and confirming the transaction, acquiring bank 51 may collect the jurisdiction specific currency from issuing bank 71 and convert into local currency with the funds it receives, or provide merchant 31 the corresponding amount of issuing currency which it obtains from issuing bank. Alternatively, merchant 31 can send the foreign tokens directly to issuing bank 71 and collect issuing currency from issuing bank 71. The merchant 31 can then choose to keep the issuing currency (if it has some other use for such currency) or exchange such currency into its local currency through merchant 31's bank (acquiring bank 51).

Additionally, it should be noted that in each of the examples described with respect to FIGS. 4A-5, a pre-validation operation may be conducted before proceeding to validate the token based payment card for the proposed transaction with the blockchain. That is, before validating the proposed transaction with the relevant blockchain, the cardholder 11's UNode 502 may perform a pre-validation operation (either on its own initiation or in response to a request by the merchant 31's UNode 504 and/or POS device 41). In such a pre-validation operation, one or more components of the UNode first determines if the cardholder 11's digital wallet includes sufficient funds (e.g., on a pre-selected token based payment card 21 and/or on any token based payment card 21 held in the digital wallet that may be used to achieve a real time transfer of a sufficient number of tokens). Because, in general, each users digital wallet has information related to the user's balances, this pre-validation authorization may eliminate one or more step that would otherwise result in a waste of time and waste of computational resources. For example, in the event that the proposed transaction fails a pre-validation operation at the UNode, the process may be discontinued without imposing the computational burden of a bound-to-fail validation request to the relevant blockchain hosted by the INode (or a collection of INodes in the bank consortium scenario). In the event that the proposed transaction passes the pre-validation operation, on the other hand, the process may continue as described (e.g., by seeking validation and processing from the blockchain).

Additionally, with reference to all of FIGS. 2A-5, issuing bank 71 may provide one or more incentives to cardholders 21 in connection with the token based payment cards 21 (and/or the tokens loaded to the token based payment cards 21). Such incentives may be based on how the tokens are used by cardholder 21. For example, in the case where an issuing bank fills a cardholder 11's digital wallet with an amount of credit tokens (after approving the cardholder 11's application for a credit line linked to a token based payment card 21, for example), the issuing bank 71 may provide one or more incentives in connection with the cardholder 11's use of such credit tokens. For example, the cardholder 11 may (i) spend the credit tokens with a merchant selling goods, services, or other offering, (ii) take a cash advance against the credit tokens by exchanging the credit tokens for fiat currency, (iii) request a balance transfer such that the credit tokens are used to pay off higher interest tokens or other balances on the cardholders other accounts, or (iv) pay off the balance for the token based payment card (i.e., return the tokens to the issuing bank). For each of the foregoing, issuing bank 71 may impose the same or different introductory and post-introductory interest rates (or no interest rate at all), offer different bonus point arrangements, offer different cash back (or "token back") arrangements, offer different sky mile arrangements, or offer any other different reward arrangements.

With reference to FIGS. 4A-5, although INodes are illustrated with a symbolic server while UNodes are illustrated with a symbolic smartphone, none of these illustrations are intended to be limiting, and it should be understood that any INode may comprise any one or more computing devices, and any UNode may comprise any one or more computing devices. That is, a UNode may comprise any one or more computing devices, including but not limited to: smartphone, desktop, server, smartwatch, audiovisual terminal, netbook, tablet, PDA, computing terminal, and/or other computing device. Similarly, an INode may comprise any one or more computing devices, including but not limited to: smartphone, desktop, server, smartwatch, audiovisual terminal, netbook, tablet, PDA, computing terminal, and/or other computing device.

It should further be noted that, in some embodiments, additional privacy and/or fraud protection measures may be taken to avoid, theft, unauthorized use, or any kind of misuse of any one or more elements of the present disclosure. For example, a device embodying a UNode (e.g., a smartphone) may include (as part of the digital wallet mobile application or other application) a preliminary access code requirement that demands that a user provide the device with a correct access code before exercising one or more features of the digital wallet application and/or other features of the UNode. Such access codes may be in the form of a biometric input and related application (e.g., via a fingerprint application, retinal recognition application, facial recognition application, voice recognition application, and the like), an additional password that a user must input via a keypad or touchscreen or other mechanism (e.g., a pass code, a Personal Identification Number (PIN) code, a pattern, and the like).

In some embodiments, such privacy and/or fraud protection measures may be extended to enable a user's face, fingerprint, voice or other biometric feature to act as a proxy for a wallet address and enable such users to transact in the environments of the present disclosure. For example, if a merchant's POS device (or UNode, if they happen to be separate devices) may scan a cardholder's face, fingerprint, voice or other biometric feature—any and all of which may be stored on the blockchain hosted by the issuing bank or the blockchain hosted by a bank consortium of which the issuing bank is a member—and may be linked to the user's wallet ID such that the POS device need only scan a user's biometric input in order to initiate a transaction validation. In various embodiments of the present disclosure, biometrics and/or other passcodes validation via the blockchain, the payer's digital wallet and/or a payee's POS device (and/or their respective UNodes in each case) may be implemented in connection with the digital wallet application to prevent electronic or manual credit card imprints/skimming, Card Not Present (CNP) fraud, counterfeit card fraud, card ID theft, mail non-receipt card fraud, assumed identity fraud, doctored card fraud, altered card fraud, fake card fraud, phishing fraud, fraud conducted by data breaches, and/or other types of fraud.

Figure 6:
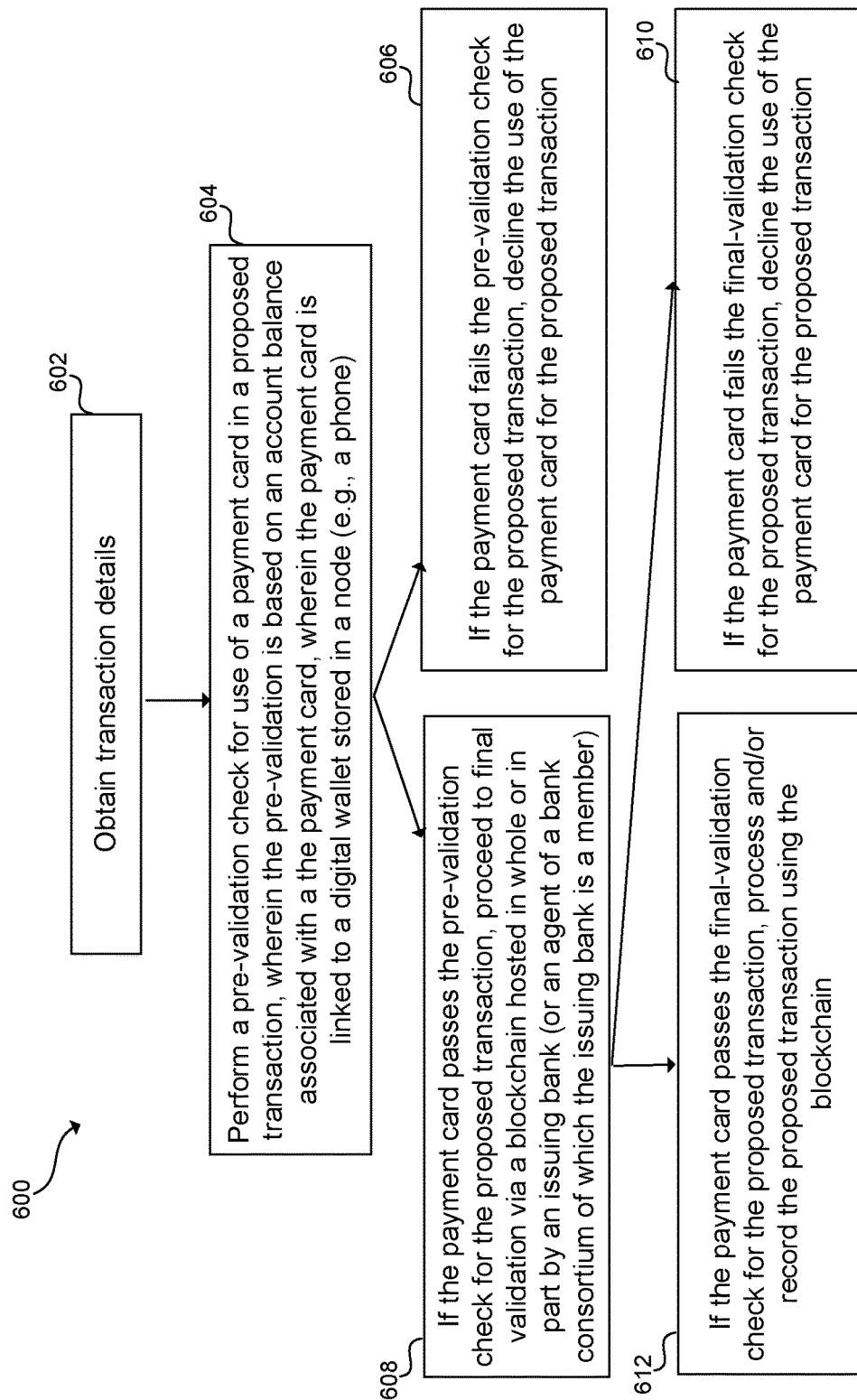
FIG. 6 illustrates an operational flow diagram illustrating an example method that may be implemented to in accordance with one or more embodiments of the present disclosure.

FIG. 6 illustrates an example method 600 that may be implemented in accordance with one or more embodiments of the present disclosure.

At operation 602, method 600 may include obtaining transaction details. At operation 604, method 600 may include performing a pre-validation check for use of a payment card in a proposed transaction, wherein the pre-validation is based on an account balance associated with a the payment card, wherein the payment card is linked to a digital wallet stored in a node (e.g., a smart phone). At operation 606, method 600 may include, if the payment card fails the pre-validation check for the proposed transaction, declining the use of the payment card for the proposed transaction. At operation 608, method 600 may include, if the payment card passes the pre-validation check for the proposed transaction, proceeding to a final validation via a blockchain hosted in whole or in part by an issuing bank (or an agent of a bank consortium of which the issuing bank is a member). At operation 610, method 600 may include, if the payment card fails the final-validation check for the proposed transaction, declining the use of the payment card for the proposed transaction. At operation 612, method 600 may include, if the payment card passes the final-validation check for the proposed transaction, processing and/or recording the proposed transaction using the blockchain.

Figure 7:
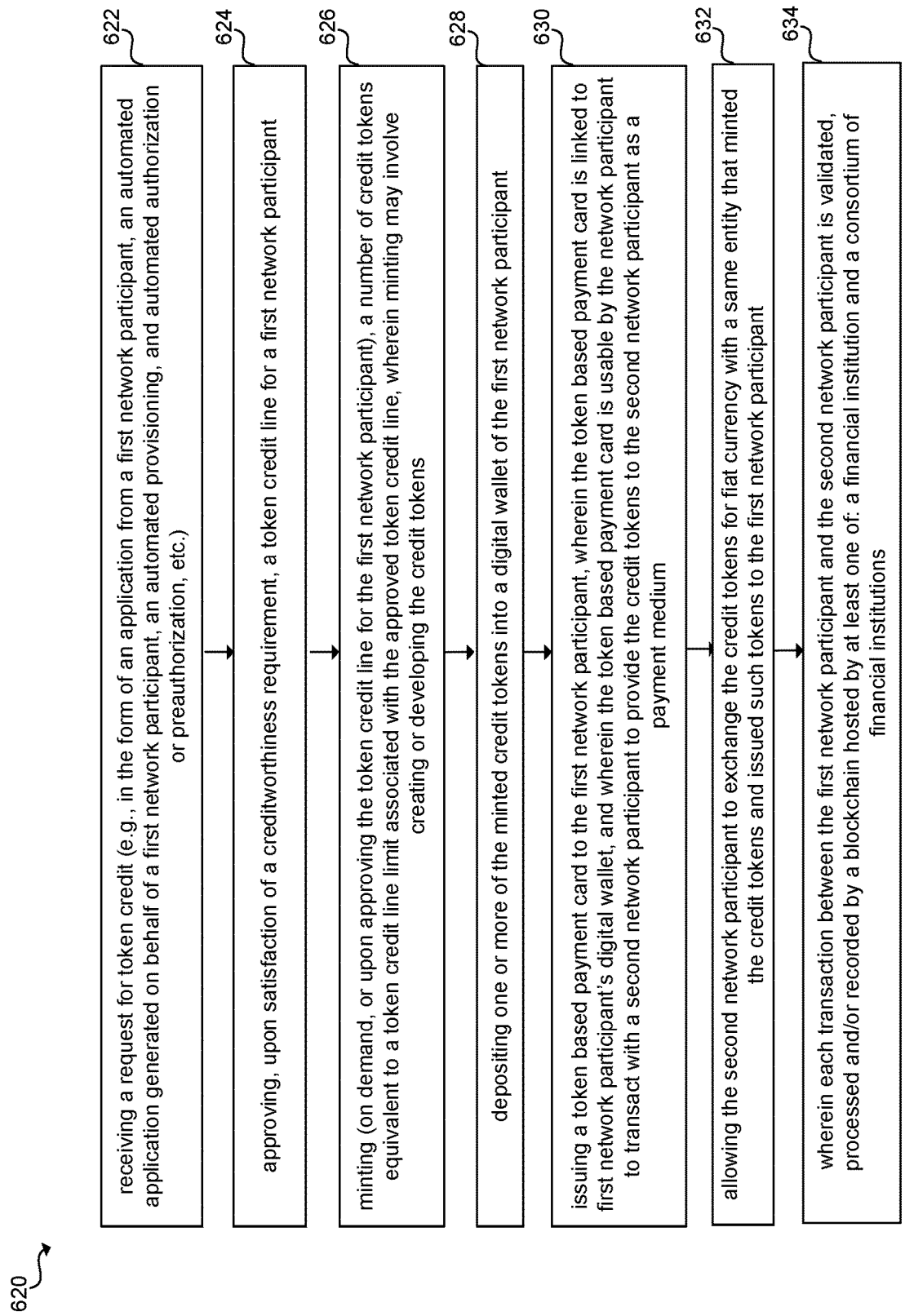
FIG. 7 illustrates an operational flow diagram illustrating an example method that may be implemented to in accordance with one or more embodiments of the present disclosure.

FIG. 7 illustrates an operational flow diagram illustrating an example method that may be implemented to in accordance with one or more embodiments of the present disclosure. At operation 622, method 620 may include receiving a request for token credit (e.g., in the form of an application from a first network participant, an automated application generated on behalf of a first network participant, an automated provisioning, and automated authorization or preauthorization, etc.). At operation 624, method 620 may include approving, upon satisfaction of a creditworthiness requirement, a token credit line for a first network participant. At operation 626, method 620 may include minting (on demand, or upon approving the token credit line for the first network participant), a number of credit tokens equivalent to a token credit line limit associated with the approved token credit line, wherein minting may involve creating or developing the credit tokens. At operation 628, method 620 may include depositing one or more of the minted credit tokens into a digital wallet of the first network participant. At operation 630, method 620 may include issuing a token based payment card to the first network participant, wherein the token based payment card is linked to first network participant's digital wallet, and wherein the token based payment card is usable by the network participant to transact with a second network participant to provide the credit tokens to the second network participant as a payment medium. At operation 632, method 620 may include allowing the second network participant to exchange the credit tokens for fiat currency with a same entity that minted the credit tokens and issued such tokens to the first network participant. At operation 634, method 620 may include wherein each transaction between the first network participant and the second network participant is validated, processed and/or recorded by a blockchain hosted by at least one of: a financial institution and a consortium of financial institutions.

Figure 8:
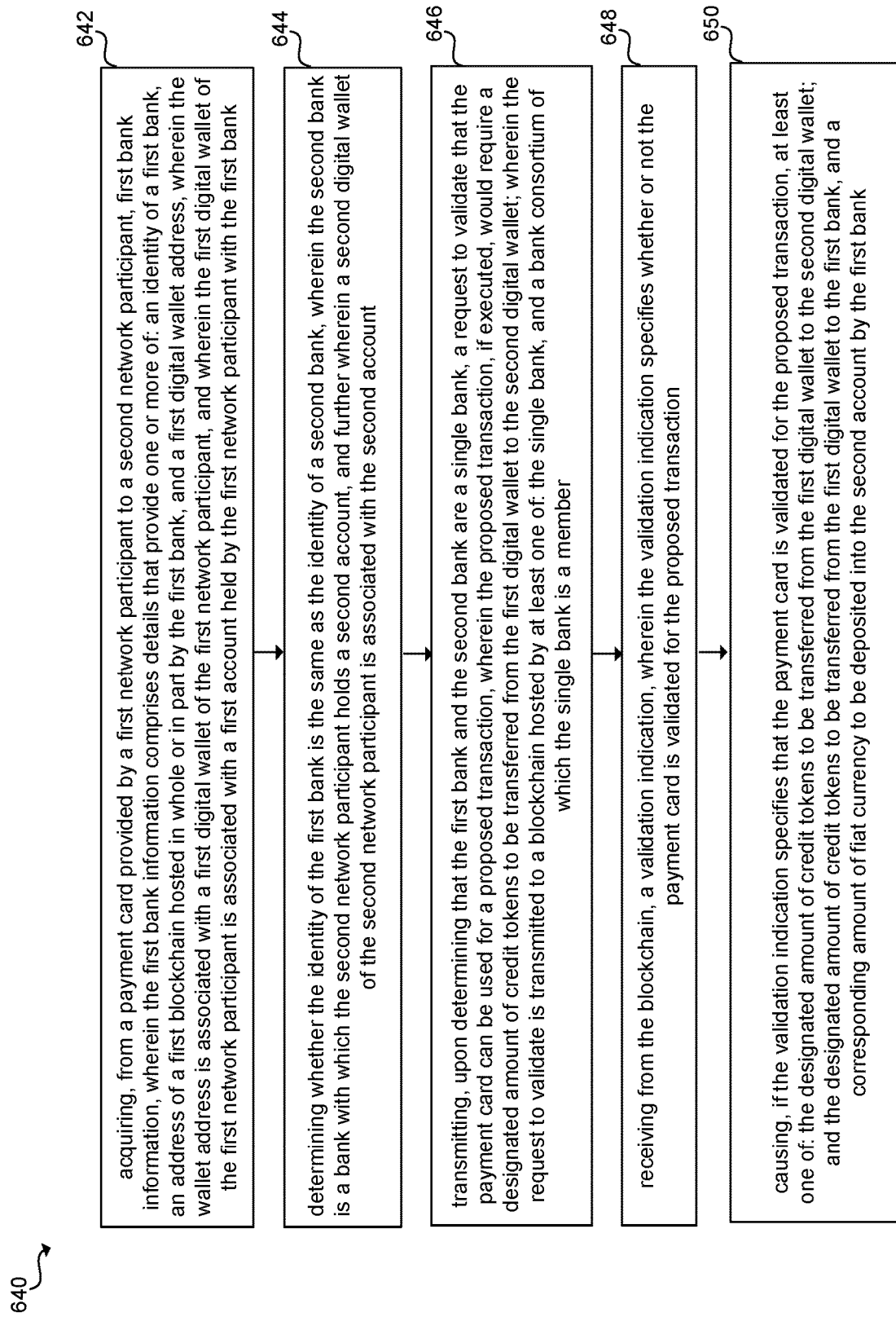
FIG. 8 illustrates an operational flow diagram illustrating an example method that may be implemented to in accordance with one or more embodiments of the present disclosure.

FIG. 8 illustrates an operational flow diagram illustrating an example method that may be implemented to in accordance with one or more embodiments of the present disclosure. At operation 642, method 640 may include acquiring, from a payment card provided by a first network participant to a second network participant, first bank information, wherein the first bank information comprises details that provide one or more of: an identity of a first bank, an address of a first blockchain hosted in whole or in part by the first bank, and a first digital wallet address, wherein the wallet address is associated with a first digital wallet of the first network participant, and wherein the first digital wallet of the first network participant is associated with a first account held by the first network participant with the first bank. At operation 644, method 640 may include determining whether the identity of the first bank is the same as the identity of a second bank, wherein the second bank is a bank with which the second network participant holds a second account, and further wherein a second digital wallet of the second network participant is associated with the second account. At operation 646, method 640 may include transmitting, upon determining that the first bank and the second bank are a single bank, a request to validate that the payment card can be used for a proposed transaction, wherein the proposed transaction, if executed, would require a designated amount of credit tokens to be transferred from the first digital wallet to the second digital wallet; wherein the request to validate is transmitted to a blockchain hosted by at least one of: the single bank, and a bank consortium of which the single bank is a member. At operation 648, method 640 may include receiving from the blockchain, a validation indication, wherein the validation indication specifies whether or not the payment card is validated for the proposed transaction. At operation 650, method 640 may include causing, if the validation indication specifies that the payment card is validated for the proposed transaction, at least one of: the designated amount of credit tokens to be transferred from the first digital wallet to the second digital wallet; and the designated amount of credit tokens to be transferred from the first digital wallet to the first bank, and a corresponding amount of fiat currency to be deposited into the second account by the first bank.

Figure 9:
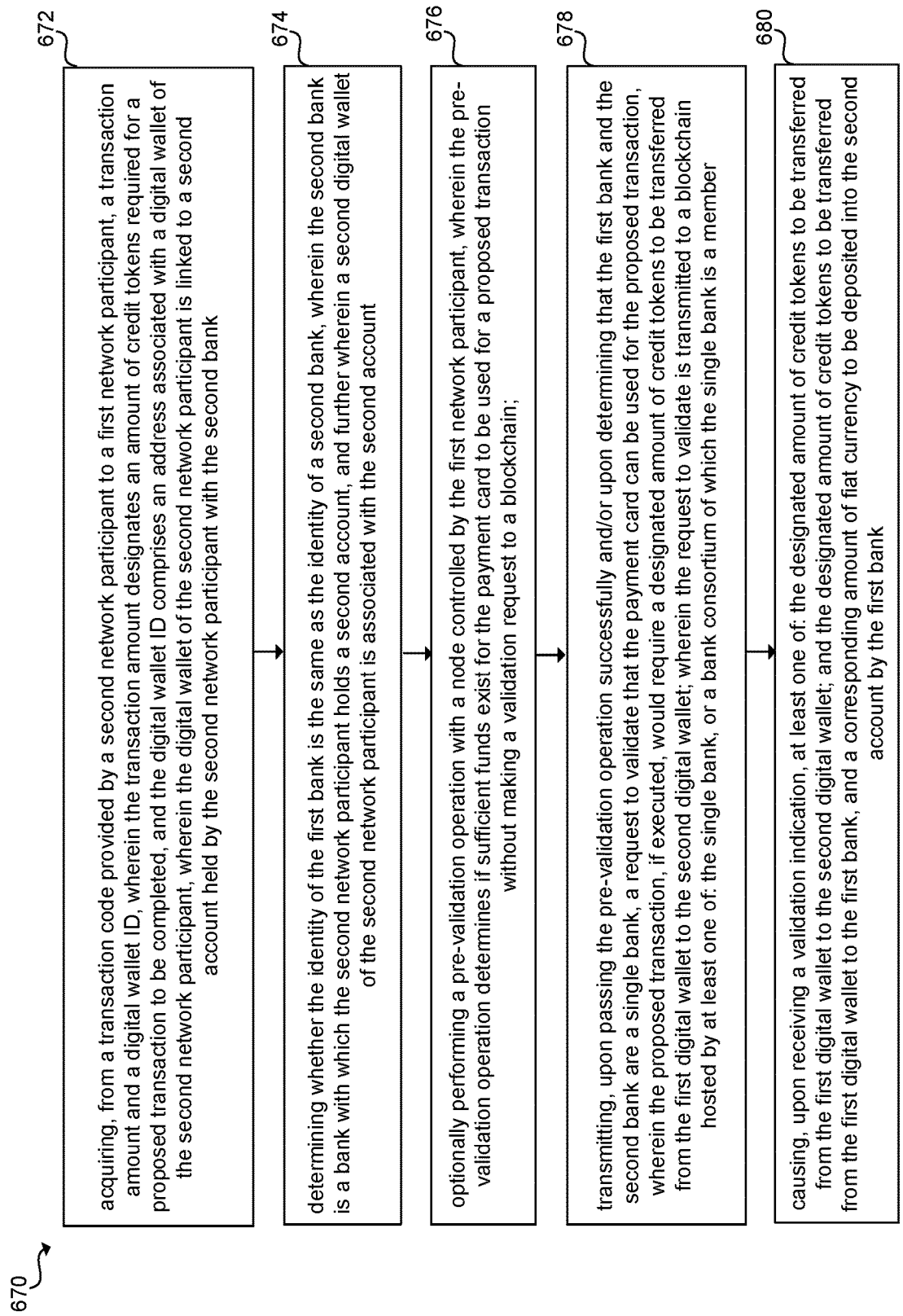
FIG. 9 illustrates an operational flow diagram illustrating an example method that may be implemented to in accordance with one or more embodiments of the present disclosure.

FIG. 9 illustrates an operational flow diagram illustrating an example method that may be implemented to in accordance with one or more embodiments of the present disclosure. At operation 672, method 670 may include acquiring, from a transaction code provided by a second network participant to a first network participant, a transaction amount and a digital wallet ID, wherein the transaction amount designates an amount of credit tokens required for a proposed transaction to be completed, and the digital wallet ID comprises an address associated with a digital wallet of the second network participant, wherein the digital wallet of the second network participant is linked to a second account held by the second network participant with the second bank. At operation 674, method 670 may include determining whether the identity of the first bank is the same as the identity of a second bank, wherein the second bank is a bank with which the second network participant holds a second account, and further wherein a second digital wallet of the second network participant is associated with the second account. At operation 676, method 670 may include optionally performing a pre-validation operation with a node controlled by the first network participant, wherein the pre-validation operation determines if sufficient funds exist for the payment card to be used for a proposed transaction without making a validation request to a blockchain. At operation 678, method 670 may include transmitting, upon passing the pre-validation operation successfully and/or upon determining that the first bank and the second bank are a single bank, a request to validate that the payment card can be used for the proposed transaction, wherein the proposed transaction, if executed, would require a designated amount of credit tokens to be transferred from the first digital wallet to the second digital wallet; wherein the request to validate is transmitted to a blockchain hosted by at least one of: the single bank, or a bank consortium of which the single bank is a member. At operation 680, method 670 may include causing, upon receiving a validation indication, at least one of: the designated amount of credit tokens to be transferred from the first digital wallet to the second digital wallet; and the designated amount of credit tokens to be transferred from the first digital wallet to the first bank, and a corresponding amount of fiat currency to be deposited into the second account by the first bank.

Figure 10:
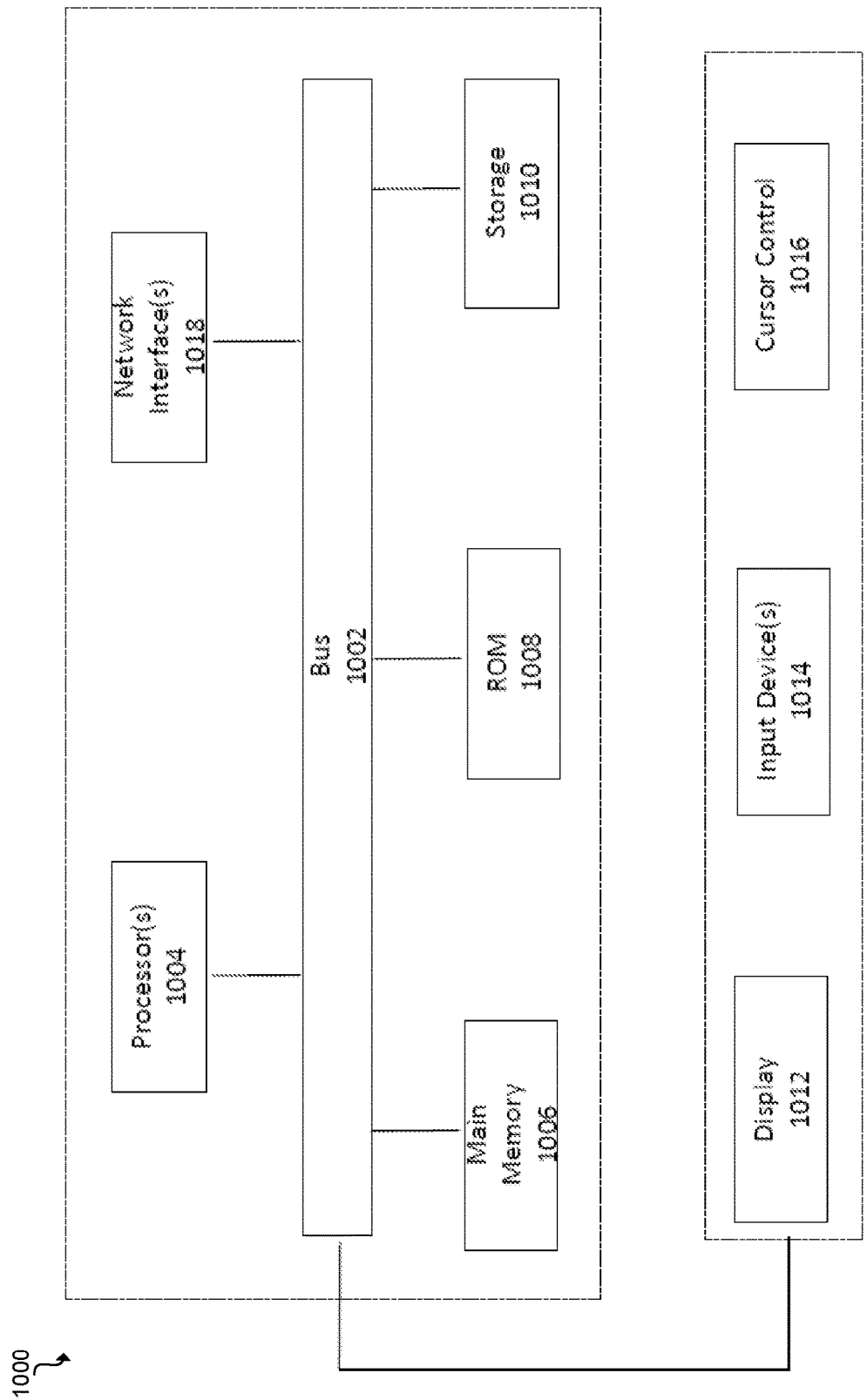
FIG. 10 is an example computing device that may be used to implement various features of embodiments described in the present disclosure.

FIG. 10 depicts a block diagram of an example computer system 1000 in which various of the embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions. For enhanced security, in some embodiments storage at a UNode is embodied in ROM only.

The computer system 1000 may be coupled via bus 1002 to a display 1012, such as a liquid crystal display (LCD) (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. In some embodiments, the same direction information and command selections as cursor control may be implemented via receiving touches on a touch screen without a cursor (e.g., via a touch enabled smartphone).

The computing system 1000 may include a user interface component to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++, Golang. A software component may be compiled and linked into an executable program, installed in a dynamic link library, or may be written in an interpreted programming language such as, for example, GoLang, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

The computer system 1000 also includes a communication interface 1018 coupled to bus 1002. Network interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, network interface 1018 may be a local area network (LAN) card to provide a data communication connection to a compatible LAN (or WAN component to communicated with a WAN). Wireless links may also be implemented. In any such implementation, network interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although various embodiments of the present disclosure are discussed herein in the context of blockchains, it should be understood that all such embodiments can be equally applied to distributed ledger technologies, centralized solution or any modifications or variations thereon. For example, to the extent an embodiment is described in the context of a blockchain network, it should be appreciated that the embodiment may more generally be applied in a distributed ledger network or a centralized solution.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

We claim:

1. A system, comprising:
   one or more processors; and
   one or more memory devices storing instructions which, when executed by the one or more processors, cause the system to perform operations of:

receiving, at a first participating financial institution ("PFI"), a request for token credit;

approving, by the first PFI upon satisfaction of a creditworthiness requirement, a token credit line for a first network participant;

minting, at the first PFI upon approving the token credit line for the first network participant, a number of credit tokens equivalent to a token credit line limit associated with the approved token credit line;

depositing, responsive to a command issued by the first PFI, one or more of the minted credit tokens into a digital wallet of the first network participant;

issuing, by the first PFI, a token based payment card to the first network participant, wherein the token based payment card is linked to first network participant's digital wallet, and wherein the token based payment card is usable by the first network participant to transact with a second network participant to provide the credit tokens to the second network participant as a payment medium, and wherein the first PFI and second PFI are part of a consortium of a plurality of PFIs that are connected to the nodes of a blockchain via one of a PFI account and a PFI digital wallet, wherein the blockchain is hosted on a node controlled by one of a card network and a payment processing entity;

receiving, at the first PFI, a request by the second network participant to exchange for fiat currency an amount of credit tokens the second network participant received from the first network participant, wherein a credit token received by the second network participant from the first network participant comprises a receipt sufficient for the first PFI to execute a direct settlement with the second PFI via the blockchain, without communicating with a third party card network legacy system;

wherein each transaction conveying credit tokens from the digital wallet of the first network participant to the digital wallet of the second network participant is validated, processed and recorded by the blockchain, wherein validation, processing, and recording by the blockchain occur responsive to one or more commands sent from one or more of the first PFI and the second PFI through the one of the PFI account, the PFI digital wallet, and the PFI API.

2. The system of claim 1, wherein the one or more memory devices store instructions which, when executed by the one or more processors, further cause the system to perform operations of:

monitoring the first network participant's use of the credit tokens;

deferring, upon a first network participant's use of one or more of the credit tokens, an interest fee for such usage until a predetermined grace period has elapsed.

3. The system of claim 1, wherein the one or more memory devices store instructions which, when executed by the one or more processors, further cause the system to perform operations of:

monitoring a lost/stolen status of first network participant's digital wallet;

restricting, upon determining that the status of the first network participant's digital wallet is lost/stolen, the transferability of the unused credit tokens earlier deposited in the first network participant's digital wallet.

4. The system of claim 1, wherein the digital wallet of the first network participant is only linked to the token based payment card issued by the first PFI and is not linked to any other payment cards.

5. The system of claim 1, wherein the digital wallet of the first network participant is linked to a plurality of payment cards, the plurality of payment cards including the token based payment card issued by the first PFI.

6. The system of claim 5, wherein the digital wallet of the first network participant is configured to select a payment card among a plurality of payment cards for use in a proposed transaction, wherein the automatic selection is based on one or more of: a user selection, a predefined preference of the first network participant, and a recommendation from the second network participant.

7. The system of claim 5, wherein the plurality of payment cards includes at least one token based credit card, and at least one token based debit card.

8. The system of claim 5, wherein the first network participant's digital wallet is configured to host, transfer and receive one or more of: entity specific tokens, entity agnostic tokens, tokens associated with a first jurisdiction, and tokens associated with a second jurisdiction.

9. The system of claim 1, wherein the token based payment card is configured to operate as both token based debit card and a token based credit card.

10. The system of claim 1, wherein the one or more memory devices store instructions which, when executed by the one or more processors, further cause the system to perform operations of:

receiving, from the first network participant, a bill payment for a prior usage of the credit tokens;

replenishing the digital wallet of the first network participant with additional credit tokens corresponding to the amount of the bill payment, minted credit tokens into a digital wallet of the first network participant.

11. The system of claim 1, wherein the one or more memory devices store instructions which, when executed by the one or more processors, further cause the system to perform operations of:

allowing the second network participant to refund the credit tokens to the first network participant by one or more of:

transferring the received credit tokens from the digital wallet of the second network participant to the digital wallet of the first network participant, and transferring the received credit tokens to the PFI, whereupon the PFI replenishes the first digital wallet with an amount of credit tokens corresponding to the amount of credit tokens received from the second network participant.

12. The system of claim 1, wherein the one or more memory devices store instructions which, when executed by the one or more processors, further cause the system to perform operations of:

allowing the second network participant to execute a payment to a third network participant using the credit tokens received from the first network participant.

13. The system of claim 1, wherein the one or more minted credit tokens are configured with one or more spending incentives defined by credit token payback terms.

14. The system of claim 13, wherein the spending incentives include one or more of:

a first interest rate applicable after a credit token is used by the first network participant for a purchase within a predetermined timeframe;

a second interest rate applicable after a credit token is used by the first network participant for a cash advance within a predetermined timeframe;

a third interest rate applicable after a credit token is used by the first network participant for a balance transfer within a predetermined timeframe.

15. The system of claim 1, wherein the one or more minted credit tokens are jurisdiction specific credit tokens; wherein the jurisdiction specific credit tokens are exchangeable for local fiat currency, and are exchangeable for foreign currency at a predetermined exchange rate.

16. A method, comprising:
receiving, at a first participating financial institution ("PFI"), a request for token credit;
approving, by the first PFI upon satisfaction of a creditworthiness requirement, a token credit line for a first network participant;
minting, at the first PFI upon approving the token credit line for the first network participant, a number of credit tokens equivalent to a token credit line limit associated with the approved token credit line;
depositing, responsive to a command issued by the first PFI, one or more of the minted credit tokens into a digital wallet of the first network participant;
issuing, by the first PFI, a token based payment card to the first network participant, wherein the token based payment card is linked to first network participant's digital wallet, and wherein the token based payment card is usable by the first network participant to transact with a second network participant to provide the credit tokens to the second network participant as a payment medium, and wherein the first PFI and second PFI are part of a consortium of a plurality of PFIs that are connected to the nodes of a blockchain via one of a PFI account, a PFI digital wallet, and a PFI application programming interface ("API"), wherein the blockchain is hosted on a node controlled by one of a card network and a payment processing entity
receiving, at the first PFI, a request by the second network participant to exchange for fiat currency an amount of credit tokens the second network participant received from the first network participant, wherein a credit token received by the second network participant from the first network participant comprises a receipt sufficient for the first PFI to execute a direct settlement with the second PFI via the blockchain, without communicating with a third party card network legacy system;
wherein each transaction conveying credit tokens from the digital wallet of the first network participant to the digital wallet of the second network participant is validated, processed and recorded by the blockchain, wherein validation, processing, and recording by the blockchain occur responsive to one or more commands sent from one or more of the first PFI and the second PFI through the one of the PFI account, the PFI digital wallet, and the PFI API.

17. The method of claim 16, further comprising:
monitoring the first network participant's use of the credit tokens;
deferring, upon a first network participant's use of one or more of the credit tokens, an interest fee for such usage until a predetermined grace period has elapsed.

18. The method of claim 17, further comprising:
receiving, from the first network participant, a bill payment for a prior usage of the credit tokens;
replenishing the digital wallet of the first network participant with additional credit tokens corresponding to the amount of the bill payment, minted credit tokens into a digital wallet of the first network participant.

19. The method of claim 17, further comprising:
allowing the second network participant to execute a payment to a third network participant using the credit tokens received from the first network participant.

20. The method of claim 17, wherein the one or more minted credit tokens are configured with one or more spending incentives defined by credit token payback terms.

21. The method of claim 17, wherein the one or more minted credit tokens are jurisdiction specific credit tokens; wherein the jurisdiction specific credit tokens are exchangeable for local fiat currency, and are exchangeable for foreign currency at a predetermined exchange rate.

22. The method of claim 17, further comprising:
allowing the second network participant to refund the credit tokens to the first network participant by one or more of: transferring the received credit tokens from the digital wallet of the second network participant to the digital wallet of the first network participant, and transferring the received credit tokens to the first PFI whereupon the first PFI replenishes the first digital wallet with an amount of credit tokens corresponding to the amount of credit tokens received from the second network participant.

23. The method of claim 16, further comprising:
monitoring a lost/stolen status of first network participant's digital wallet;
restricting, upon determining that the status of the first network participant's digital wallet is lost/stolen, the transferability of the unused credit tokens earlier deposited in the first network participant's digital wallet.

24. The method of claim 16, wherein the digital wallet of the first network participant is only linked to the token based payment card issued by the first PFI and is not linked to any other payment cards.

25. The method of claim 16, wherein the digital wallet of the first network participant is linked to a plurality of payment cards, the plurality of payment cards including the token based payment card issued by the first PFI.

26. The method of claim 25, wherein the digital wallet of the first network participant is configured to select a payment card among a plurality of payment cards for use in a proposed transaction, wherein the automatic selection is based on one or more of: a user selection, a predefined preference of the first network participant, and a recommendation from the second network participant.

27. The method of claim 26, wherein the token based payment card is configured to operate as both token based debit card and a token based credit card.

28. The method of claim 26, wherein the plurality of payment cards includes at least one token based credit card, and at least one token based debit card.

29. The method of claim 26, wherein the first network participant's digital wallet is configured to host, transfer and receive one or more of: entity specific tokens, entity agnostic tokens, tokens associated with a first jurisdiction, and tokens associated with a second jurisdiction.

* * * * *